US010377392B2

(12) United States Patent  (10) Patent No.: US 10,377,392 B2
Bis et al.  (45) Date of Patent: Aug. 13, 2019

(54) AUTORACK RAILROAD CAR HAVING CONVERTIBLE DECK STRUCTURE

(71) Applicant: National Steel Car Limited, Hamilton (CA)

(72) Inventors: Tomasz Bis, Ancaster (CA); James Wilfred Forbes, Campbellville (CA)

(73) Assignee: National Steel Car Limited (CA)

( * ) Notice: Subject to any disclaimer, the term of this patent is extended or adjusted under 35 U.S.C. 154(b) by 325 days.

(21) Appl. No.: 15/209,436

(22) Filed: Jul. 13, 2016

(65) Prior Publication Data

US 2018/0015934 A1  Jan. 18, 2018

(51) Int. Cl.
  *B61D 3/04*  (2006.01)
  *B61D 3/00*  (2006.01)
  *B61D 3/02*  (2006.01)
  *B61D 3/18*  (2006.01)
  *B60P 3/08*  (2006.01)

(52) U.S. Cl.
  CPC ............... *B61D 3/04* (2013.01); *B60P 3/08* (2013.01); *B61D 3/005* (2013.01); *B61D 3/02* (2013.01); *B61D 3/18* (2013.01)

(58) Field of Classification Search
  CPC ... B61D 3/02; B61D 3/04; B61D 3/18; B61D 3/187; B61D 3/005; B60P 3/08
  See application file for complete search history.

(56) References Cited

U.S. PATENT DOCUMENTS 401,529 A    4/1889  Zurcher
425,380 A    4/1890  Judson
459,896 A    9/1891  Macmillan
774,205 A   11/1904  Scott
(Continued)

FOREIGN PATENT DOCUMENTS

CA   2034125   8/1991
CA   2191673   5/1997
JP   4-143161  9/2008

OTHER PUBLICATIONS

"Automotive Vehicle Transportation", The Car and Locomotive Cyclopedia of American Practices, Section 1, Sixth ed., Simmons-Boardman Books, Inc., Omaha, pp. 7-24.

(Continued)

*Primary Examiner* — Zachary L Kuhfuss
(74) *Attorney, Agent, or Firm* — Hahn Loeser & Parks LLP

(57) ABSTRACT

An autorack railroad car has decks that are movably reconfigurable between tri-level and bi-level configurations. They are also movable to permit greater vertical clearance room for loading the main deck. The decks may be constrained to a single degree of freedom of motion, namely in the vertical direction, by guides that run along the vertical side posts of the car. The decks may include a passive counterbalance transmission linking the mid-level and upper level decks, such that the decks counterbalance each other when the decks are moved between the various positions. There is a separate, independent drive provided to move the decks. The drive may include scissor jacks. More than one scissor jack may share a common drive axis and shafting arrangement. The drive is operable from a trackside accessible drive distribution point. A secondary lock system is provided to prevent the decks from moving inopportunely.

48 Claims, 44 Drawing Sheets

(56) References Cited

U.S. PATENT DOCUMENTS

| | | |
|---|---|---|
| 1,083,831 A | 2/1914 | Holdaway et al. |
| 1,229,374 A | 6/1917 | Youngblood |
| 1,514,211 A | 11/1924 | Hester |
| 1,713,898 A | 5/1929 | Gilpin |
| 1,735,617 A | 11/1929 | Nystrom |
| 1,841,066 A | 1/1932 | Simning |
| 1,894,534 A | 1/1933 | Dolan |
| 2,009,149 A | 7/1935 | Pierce |
| 2,056,218 A | 10/1936 | Stout |
| 2,147,014 A | 2/1939 | Demarest |
| 2,223,746 A | 12/1940 | Stoner |
| 2,432,228 A | 12/1947 | De Lano |
| 2,517,811 A | 8/1950 | Torburn |
| 2,659,318 A | 11/1953 | Steins et al. |
| 2,929,339 A | 3/1960 | Schueder |
| 2,959,262 A | 11/1960 | Parker et al. |
| 3,017,840 A | 1/1962 | Fairweather |
| 3,099,230 A | 7/1963 | De Podesta |
| 3,119,350 A | 1/1964 | Bellingher et al. |
| 3,173,382 A | 3/1965 | Ryan |
| 3,179,067 A | 4/1965 | Beck |
| 3,205,836 A | 9/1965 | Wojcikowski |
| 3,221,669 A | 12/1965 | Baker |
| 3,230,900 A | 1/1966 | Ruprecht |
| 3,240,167 A | 3/1966 | De Podesta |
| 3,370,552 A | 2/1968 | De Podesta et al. |
| 3,405,661 A | 10/1968 | Erickson |
| 3,503,340 A | 3/1970 | Warren |
| 3,516,706 A | 6/1970 | Bruce |
| 3,547,049 A | 12/1970 | Sanders |
| 3,709,154 A | 1/1973 | Peisner et al. |
| 3,714,905 A | 2/1973 | Barber |
| 3,815,517 A | 6/1974 | Przybylinski |
| 3,854,425 A | 12/1974 | Allen |
| 3,895,587 A | 7/1975 | Bell |
| 3,927,621 A | 12/1975 | Skeltis et al. |
| 3,995,563 A | 12/1976 | Blunden |
| 4,084,516 A | 4/1978 | Ravani et al. |
| 4,116,135 A | 9/1978 | Jaekle et al. |
| 4,119,042 A | 10/1978 | Naves et al. |
| 4,119,043 A | 10/1978 | Naves et al. |
| 4,149,472 A | 4/1979 | Naves et al. |
| 4,437,410 A | 3/1984 | Stoller, Sr. et al. |
| 4,667,604 A | 5/1987 | Baker |
| 4,671,714 A | 6/1987 | Bennett |
| 4,677,918 A | 7/1987 | Baker et al. |
| 4,701,086 A | 10/1987 | Thorndyke |
| 4,759,669 A | 7/1988 | Robertson et al. |
| 4,786,222 A | 11/1988 | Blodgett |
| 4,870,914 A | 10/1989 | Radwill |
| 4,881,859 A | 11/1989 | Ehrlich |
| 4,913,061 A | 4/1990 | Youngblood |
| 4,924,780 A | 5/1990 | Hart |
| 4,929,132 A | 5/1990 | Yeates et al. |
| 4,936,227 A | 6/1990 | Baker et al. |
| 4,944,234 A | 7/1990 | Hesch |
| 4,966,081 A | 10/1990 | Dominguez et al. |
| 5,037,255 A | 8/1991 | Bullock et al. |
| 5,042,395 A | 8/1991 | Wackerle et al. |
| 5,106,246 A | 4/1992 | Chance |
| 5,140,912 A | 8/1992 | Hesch |
| 5,286,149 A | 2/1994 | Seay et al. |
| 5,320,046 A | 6/1994 | Hesch |
| 5,362,345 A | 11/1994 | Stettler et al. |
| 5,383,406 A | 1/1995 | Vanolo et al. |
| 5,392,717 A | 2/1995 | Hesch et al. |
| 5,511,491 A | 4/1996 | Hesch et al. |
| 5,601,033 A | 2/1997 | Ehrlich et al. |
| 5,601,034 A | 2/1997 | Tao et al. |
| 5,622,115 A | 4/1997 | Ehrlich et al. |
| 5,657,698 A | 8/1997 | Black, Jr. et al. |
| 5,645,228 A | 11/1997 | Ehrlich et al. |
| 5,730,578 A | 3/1998 | Smidler |
| 5,743,192 A | 4/1998 | Saxton et al. |
| 5,746,137 A | 5/1998 | Hawthorne et al. |
| 5,752,798 A | 5/1998 | Smidler |
| 5,765,486 A | 6/1998 | Black, Jr. et al. |
| 5,782,187 A | 7/1998 | Black, Jr. et al. |
| 5,794,537 A | 8/1998 | Zaerr et al. |
| 5,832,836 A | 11/1998 | Ehrlich et al. |
| 5,857,414 A | 1/1999 | Thoman et al. |
| 5,979,335 A | 11/1999 | Saxton et al. |
| 6,138,579 A | 10/2000 | Khattab |
| 6,244,801 B1 | 6/2001 | Klag et al. |
| 6,283,040 B1 | 9/2001 | Lewin |
| 6,446,561 B1 | 9/2002 | Khattab |
| 6,551,039 B1 | 4/2003 | Forbes |
| 6,559,016 B2 | 12/2003 | Forbes |
| 6,659,016 B2 | 12/2003 | Forbes |
| 6,821,065 B2 | 11/2004 | Forbes |
| 6,895,866 B2 | 5/2005 | Forbes |
| 7,047,889 B2 | 5/2006 | Forbes |
| 2017/0217448 A1* | 8/2017 | Huck .................. B61D 3/02 |
| 2017/0217449 A1* | 8/2017 | Huck .................. B61D 3/02 |

OTHER PUBLICATIONS

"Road and Rail", The Newsletter of Wabash National Corporation, Summer 1996, Issue 7.

Rownd et al., "Improved Ride Quality for Transportation of Finished Automobiles by Rail", Technology Digest, Association of American Railroads Research and Test Department, Sep. 1996.

Rownd et al., "Over-the-Road Tests Demonstrate Improved Ride Quality for Transportation of Finished Automobiles by Rail", Technology Digest, Association of American Railroads Research and Test Department, Sep. 1996.

Burnett et al., "Improved Vehicle Dynamics Model for Tri-Level Auto-Rack Railcars", Technology Digest, Association of American Railroads Research and Test Department, Sep. 1997.

Rownd et al., "Evaluation of End-of-Car Cushioning Designs Using the Toes Model", Technology Digest, Association of American Railroads, Jun. 1999.

Photographs.

* cited by examiner

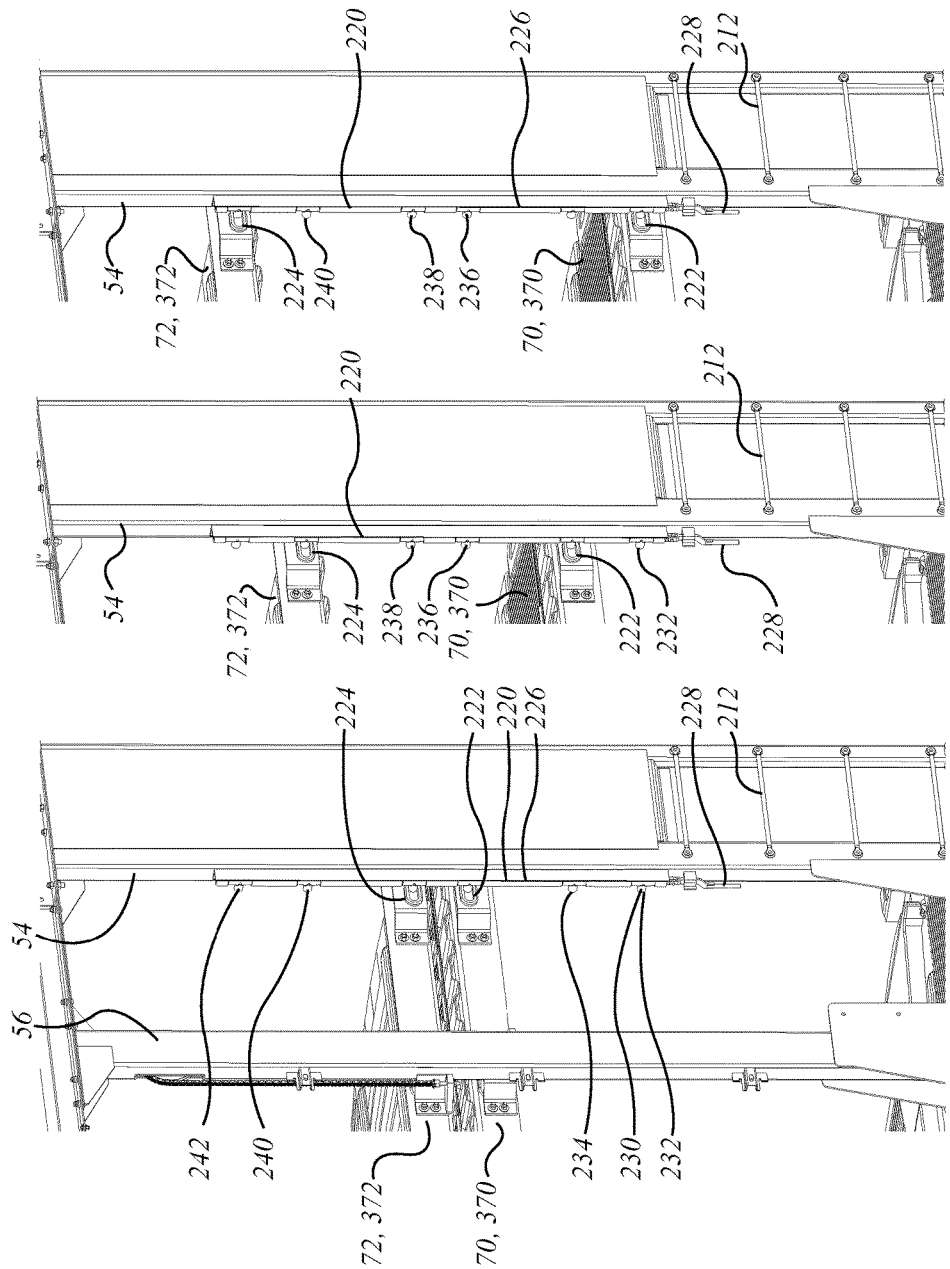

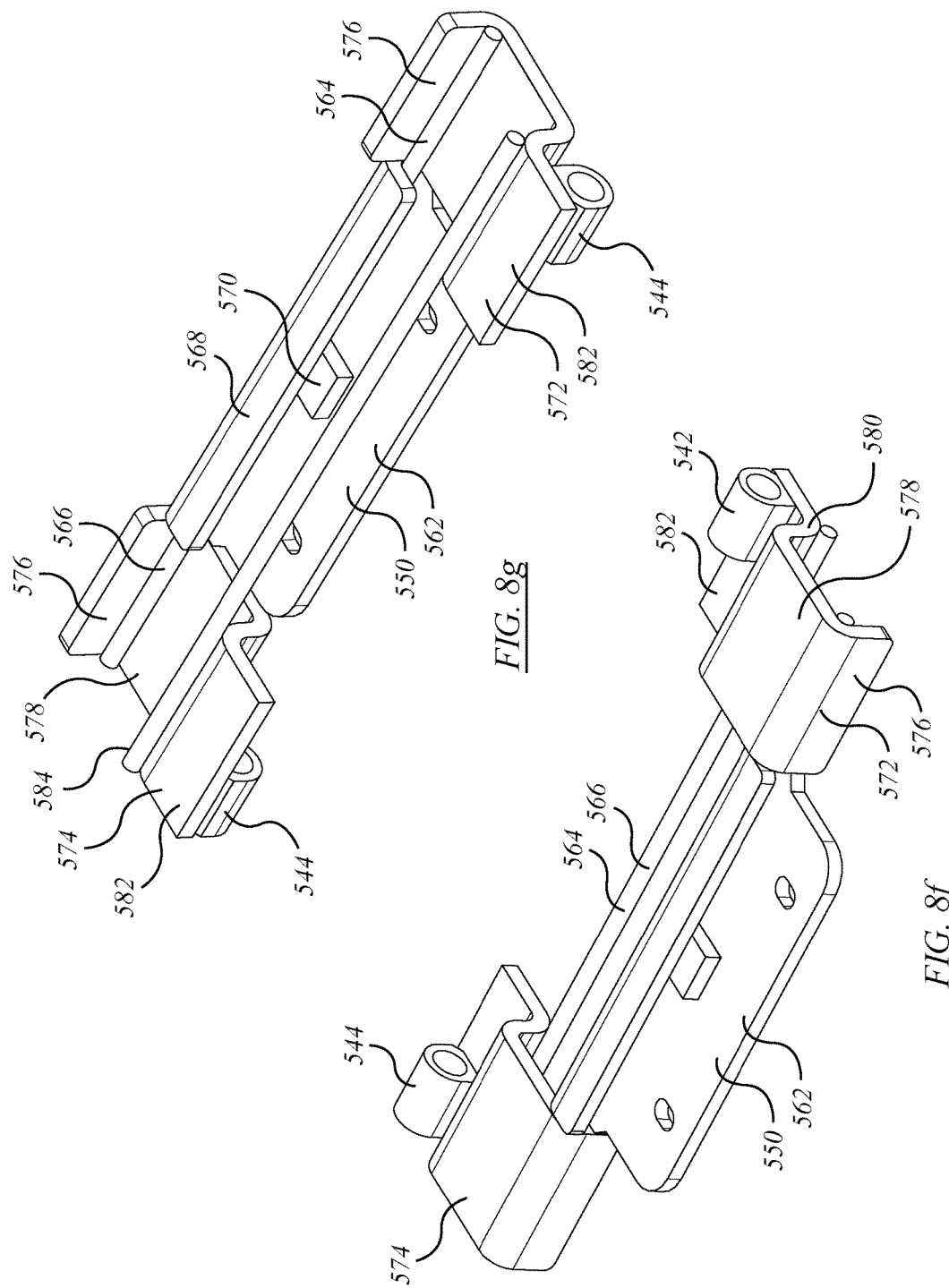

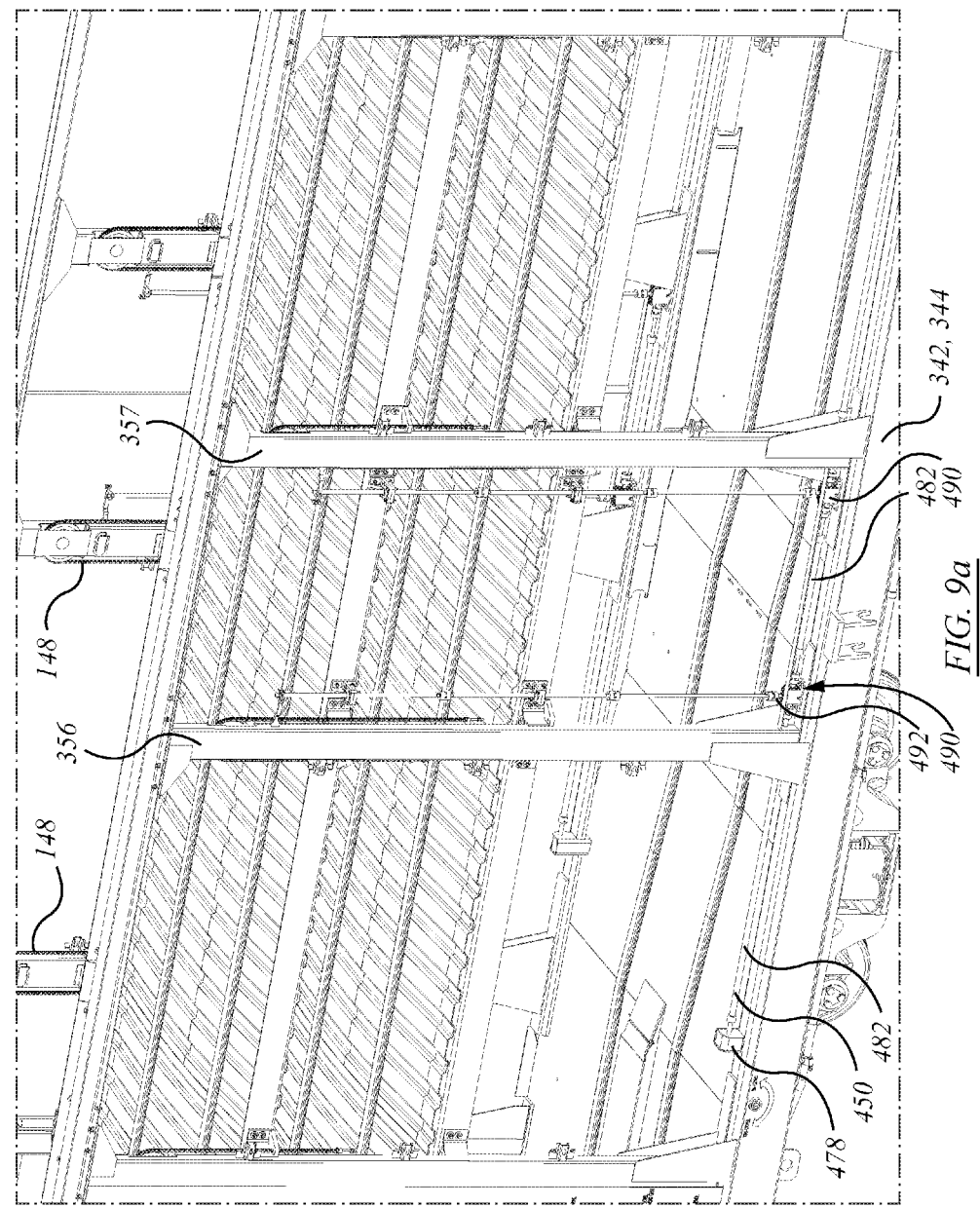

AUTORACK RAILROAD CAR HAVING CONVERTIBLE DECK STRUCTURE

FIELD OF THE INVENTION

This invention relates to the field of railroad freight cars, and, in particular to the field of railroad freight cars for carrying automotive vehicles, this kind of car being referred to in the industry as an "autorack" car.

BACKGROUND

Modern autorack cars, which is to say autorack cars built since about 1975, have typically had the structure of a flat car underframe covered by a surface defining a main deck for supporting automotive vehicles. Most typically an upstanding elevated-deck supporting framework is mounted to the underframe. Since about 1975 the framework has usually been enclosed within, or used also to support, a large, rather barn-like housing with end doors, the better to discourage thieves and vandals. This superstructure is typically referred to collectively as the "rack" or "racks" of the autorack. Most typically the framework structure includes a series of vertical posts spaced along the sides of the car, and one or two additional decks spaced upwardly from the main deck upon which respective second and third layers of automotive vehicles may be transported. That is, the rack may be a bi-level rack (i.e., a single elevated deck spaced upwardly above the main deck of the underframe) or a tri-level rack (two upper decks rather than one). The framework typically includes an array of sideposts spaced along the car, with diagonal bracing or shear web panels between the posts, as may be. The cars tend to be as tall as permitted under AAR Plate 'J', namely 19'-0" or plate 'K', namely 20'-2" maximum height above Top of Rail. This housing may tend to have gable ends and bridge plates that are moved to an extended position to span the gap between cars during loading and unloading. Those ends, when open to permit circus loading of the cars, i.e., sequential loading of the automotive vehicles by driving in one end, and out the other on arrival. Although other kinds of doors are known, most typically radial arm doors are mounted at the gable ends and are movable between open and closed positions to govern loading and unloading of the cars. The racks are typically replaced twice during the economic life of the autoack car underframe. That is, the old rack is removed from the underframe and replaced with a new set of racks.

Autorack cars are usually found in either a bi-level configuration (i.e., the main deck, plus a single upper deck suspended above the main deck) or in a tri-level configuration (i.e., the main deck and two decks suspended one above the other upwardly of the main deck).

SUMMARY OF THE INVENTION

In an aspect of the invention there is a deck height adjustment drive transmission, for an autorack railroad car having a first height-adjustable deck and a second height-adjustable deck mounted thereabove. The deck height adjustment drive transmission has a first array of threaded output shafts mounted to drive motion of the first height-adjustable deck; and a second array of threaded output shafts mounted to drive motion of the second height-adjustable deck.

In a feature of that aspect of the invention, the transmission has an input, the input being track-level accessible. In another feature, the track level input includes first and second input ports. The first input port is mounted on one side of the autorack railroad car, and the second input port is mounted on a second, opposite, side of the autorack railroad car. Each of the input ports is accessible for operation by trackside personnel; and each of the ports is independently operable to drive the transmission. In a further feature, the transmission is connected to drive the output shafts of the first array and the output shafts of the second array at the same time. In another feature, the threaded output shafts of the first array are of opposite hand to the threaded output shafts of the second array. In still another feature, the first and second input ports are linked by shafting to a common gearbox. The gearbox has an output connected to drive the first and second arrays of output shafts, and the gearbox has an output torque limiter.

In still another feature, there is a combination of the deck height adjustment transmission and a deck counterbalance apparatus, the counterbalance apparatus is mounted to react the weight of the height-adjustable decks, and the deck height adjustment transmission is free of deck weight static loading. In another feature, the drive transmission includes an array of riser shafts mounted to drive the first array of threaded output shafts. In a further feature, each riser shaft of the array of risers shafts is mounted to drive a corresponding one of the first output shafts and one of the second output shafts. The input shaft and the output shaft are of opposite hand. The respective riser shafts and first and second output shafts are mounted in series. In yet another feature, the transmission has at least one distribution shaft running along the car, the distribution shaft having an array of off-takes spaced apart along the car to drive members of the first and second arrays of output shafting.

In another aspect of the invention there is an autorack railroad car having a first height-adjustable deck and a second height-adjustable deck. The second height-adjustable deck overlies the first height-adjustable deck. It includes an height adjustment drive transmission having the features of the previous aspect of the invention. In further features of this aspect of the invention, the autorack railroad car includes the further features of the previous aspect of the invention. In another feature, the railroad car has a deck counterbalance apparatus to react the weight of the height-adjustable decks against each other such that the deck height adjustment transmission is free of deck weight static loading. In a further feature, the counterbalance apparatus links the first height-adjustable deck to the second height-adjustable deck. The weight of the first height-adjustable deck is opposed to the weight of the second height-adjustable deck. In another feature, the counterbalance apparatus includes a set of chains. The set of chains has at least first, second, third, and fourth chains. Each of the chains has first and second ends. Each of the chains passes over a respective idler. The first end of each chain is mounted to the first height-adjustable deck and the second end of each chain is mounted to the second height-adjustable deck.

In another feature, the drive transmission includes an array of riser shafts mounted to drive the first array of threaded output shafts. In yet another feature, each riser shaft of the array of risers shafts is mounted to drive a corresponding one of the first output shafts and one of the second output shafts. The input shaft and the output shaft are of opposite hand. Respective ones of the riser shafts, the first output shafts, and the second output shafts are mounted in series. In another feature, the transmission has at least one distribution shaft running along the car. The distribution shaft has an array of off-takes spaced apart along the car to drive members of the first and second arrays of output shafting.

In another aspect of there is an autorack railroad car. It has a fixed main deck; a first movable deck and a second movable deck. It has a deck drive transmission. The first and second movable decks both overlie the main deck. The second movable deck overlies the first movable deck. The main deck is a depressed center deck. An array of posts is mounted along left and right hand sides of, and stands upwardly of, the main deck. The first and second movable decks are supported by the posts. The first and second decks are counterbalanced against each other. The deck drive transmission includes upstanding drive shafts. The upstanding drive shafts include threaded rod portions operably connected to impose displacement upon at least one of the first and second movable decks.

In a feature of that aspect of the invention, the decks are constrained to a single degree of freedom of motion, that degree of freedom is up-and-down translation. In another feature, the decks are counterbalanced against each other. In another feature, the decks have a drive transmission having trackside access.

In another aspect of the invention, there is an autorack railroad car. It has a fixed-position main deck and at least a first movable deck overlying the main deck. There is a deck drive transmission. The first movable deck is constrained to motion in a single degree of freedom of upward and downward translation relative to the main deck.

In a feature of that aspect, the autorack car includes a second movable deck overlying the first movable deck. The second movable deck also is constrained to a single degree of freedom of upward and downward translation relative to the main deck. In another feature, the first and second movable decks are counterbalanced against each other. In still another feature, the autorack railroad car has a second movable deck, the second movable deck overlying the first movable deck. There is an array of posts mounted along left and right hand sides of, and standing upwardly of, the main deck. The first and second movable decks are supported by the posts. The first and second decks are movable throughout a range of motion. The first and second decks are counterbalanced against each other. The deck drive transmission occupying a constant space envelope during motion of the decks throughout the range of travel.

In another aspect of the invention, there is an autorack railroad car. It has a main deck; a first movable deck; and a second movable deck. It has a deck drive transmission. The first and second movable decks both overlie the main deck. The second movable deck overlies the first movable deck. An array of posts is mounted along left and right hand sides of, and stands upwardly of, the main deck. The first and second movable decks are supported by the posts. The first and second decks are movable throughout a range of motion. The first and second decks are counterbalanced against each other. The deck drive transmission occupies a constant space envelope during motion of the decks throughout the range of travel.

In a feature of that aspect, the drive transmission includes upstanding threaded rods connected to threaded followers mounted to the first and second movable decks. In another feature, the array of posts includes a first post and a second post next adjacent thereto. The array of posts includes a third post adjacent to the second post, the second post is between the first post and the third post. The drive transmission includes a first upstanding shaft mounted between the second post and the third post. The autorack car includes a wheel chock storage space between the first post and the second post. In another feature, a shear transfer member is mounted between the second post and the third post. An enclosure member is mounted between the first post and the second post, the enclosure member defining an outside surface of the autorack railroad car. The wheel chock storage space is defined inboard of the enclosure member.

In another aspect of the invention there is an autorack railroad car having decks convertible between a bi-level and a tri-level configuration. The convertible decks of the railroad car have a range of motion in a single degree of freedom in linear translation upward and downward.

In another aspect of the invention there is a roller-mounted adjustable-height deck for an autorack railroad car.

In a feature of that aspect, the deck has a decking array extending cross-wise between first and second lengthwise extending margins. There are deck carriages spaced along the lengthwise extending margins. The carriages have rollers mounted thereto. In another feature, the carriage has a vertical height drive input. In a further feature, the carriage has a lengthwise motion inhibitor as well as at least one roller-mounted to inhibit cross-wise motion of the adjustable weight deck. In still another feature, the deck has first and second lengthwise extending side beams running along the first and second margins. Each of the first and second side beams has a first leg underlying the decking array, and a second leg defining a vertical leg extending away from the first leg to form an angle. In another feature, the deck carriages are mounted to the vertical leg. In still another feature, the decking array has a raised central crown, and a vertical height rise measured from the margins thereof to the crown. The vertical leg has a greater vertical extent than the vertical height rise. In another feature there is an autorack railroad car having the roller-mounted adjustable-height deck noted above, and any of the other, further, or additional features thereof.

In another aspect there is an autorack railroad car having a rack structure and at least a first adjustable-height deck mounted between members of the rack structure. The first adjustable-height deck has rollers mounted to engage the rack structure.

In a feature of that aspect, the rollers are constant contact rollers. In another feature, the first adjustable-height deck has carriages mounted along left and right hand margins thereof, and the rollers are mounted to the carriages. In a further feature, the rollers define a first degree of freedom restraint, and the carriages also have a second degree of freedom restraint. In still another feature, the carriages have a displacement input drive connected thereto. In a yet further feature, the carriages are connected to a counterbalance transmission. In still another feature, the autorack railroad car is convertible between bi-level and tri-level positions. In a further feature, the railroad car has a second adjustable height deck mounted upwardly of the first adjustable-height deck. In another feature, the first and second adjustable height decks are both mounted upwardly of a main deck, and the first and second adjustable-height decks are movable between bi-level and tri-level conditions. In another feature, the first and second adjustable-height decks are counterbalanced against each other.

In another feature, the autorack railroad car has a first drive transmission connected to apply drive directly to the first and second decks; and a second drive transmission connected to counterbalance the first and second adjustable-height decks against each other. The second drive transmission is separate from the first drive transmission. In another feature, the railroad car has a first drive transmission connected to drive the first and second adjustable height decks simultaneously in opposite directions. In another feature, the rack structure includes an array of sidewall posts. The rollers co-operate with the posts. The sidewall posts function as guides; and the rollers function as guide followers riding along the posts.

In another aspect of the invention, a convertible deck autorack railroad car has a first height-adjustable deck and a drive transmission operable to move the first height-adjustable deck. The height-adjustable deck has decking and a first beam running along a side margin of the decking. The beam has a flange underlying the margin of the decking, and a web standing upwardly of the flange outboard of the margin of the decking.

In a feature of that aspect, the railroad car has a second height-adjustable deck, the first and second height-adjustable decks is mounted one above the other, and the second height-adjustable deck has decking and a second beam running along a side margin of the decking thereof, the second beam having a flange underlying the side margin of the decking of the second deck, and a web standing downwardly of the flange of the second beam. In another feature, the first and second height-adjustable decks are counterbalanced against each other. In another feature the first decking has a vertical crown height relative to the side margins thereof, and the web of the first beam has a vertical depth that exceeds the vertical crown height. In a further feature, the first height-adjustable deck is carried on carriages mounted to the upstanding web of the first beam, the web having a vertical depth at least as great as the carriages. In another feature, the first beam is an angle iron of open section.

In an aspect of the invention there is an autorack railroad car deck assembly for mounting to a framework of a rack of an autorack railroad car. The deck assembly has a first suspended deck and a second suspended deck. The second suspended deck is suspended above the first suspended deck. The first and second suspended decks are movable relative to each other. A counterweight transmission connects the first and second suspended decks. A drive transmission, separate from the counterweight transmission, is operable to move the first and second suspended decks.

In a feature of that aspect of the invention, the decks are movable between a first position in which they are upwardly closely adjacent, and a second position in which they are upwardly distantly apart. In another feature, the counterweight transmission includes at least one pulley and at least one flexible draft member run over the pulley. The flexible draft member has a first end mounted to the first suspended deck. The flexible draft member having a second end mounted to the second suspended deck. In another feature, the assembly includes at least two such pulleys and at least two such flexible draft members, the first flexible draft member being fed left-handed over the first pulleys, and the second flexible draft member being fed right-handed over the second pulley. In another feature, the drive transmission includes at least one screw mounted to drive the first and second suspended decks in opposite directions. In a further feature, at least one screw is mounted to drive a scissor jack. In a still further feature, the assembly includes a plurality of the scissor jacks driven from a common shaft. In yet another feature, the first and second suspended decks are constrained to move only in vertical translation. In still another feature, the deck assembly includes stops positioned to support the suspended decks when the decks are not being moved relative to each other. In another feature, there is an autorack railroad car incorporating any combination of features of the foregoing deck assemblies.

In another aspect of the invention there is an autorack railroad car deck assembly that includes at least one scissor jack operable to convert the deck assembly from a bi-level configuration to a tri-level configuration.

In a feature of that aspect of the invention, the deck assembly includes a plurality of the scissor jacks and a common drive connected to operate the scissor jacks from a single input. In a further feature, the drive has a trackside accessible manually operable input. In another feature, the assembly includes at least a first scissor jack and a second scissor jack for mounting on one side of the railroad car, and a common shaft linking the first and second scissor jacks. In another feature, the deck assembly has a first suspended deck and a second suspended deck. The second suspended deck is suspended above the first suspended deck. The first and second suspended decks are movable relative to each other. A counterweight transmission connects the first and second suspended decks. The at least one scissor jack is a component of a drive transmission, that drive transmission being separate from the counterweight transmission. In another feature, the decks are movable between a first position in which they are upwardly closely adjacent, the first position corresponding to the bi-level configuration; and a second position in which they are upwardly distantly apart, the second position corresponding to the tri-level configuration. In another feature, the counterweight transmission includes at least one pulley and at least one flexible draft member run over the pulley, the flexible draft member having a first end mounted to the first suspended deck, and the flexible draft member having a second end mounted to the second suspended deck. In still another feature, the first and second suspended decks are constrained to move only in vertical translation. In yet another feature, the deck assembly includes stops positioned to support at least one of the suspended decks when the decks are not being moved relative to each other. In another feature, there is a drive transmission, and said drive transmission including a torque limiter. In still another feature, there is a deck level indicator. The deck level indicator is visible from trackside. In still another feature there is an autorack railroad incorporating any of the combinations of features of the foregoing deck assemblies.

These and other aspects and features of the invention may be understood with reference to the description which follows, and with the aid of the illustrations.

BRIEF DESCRIPTION OF THE FIGURES

The description is accompanied by a set of illustrative Figures in which:

FIG. 2d is an enlarged detail of FIG. 2a;

FIG. 3c is a detail showing a deck securement apparatus of the autorack railroad car of FIG. 1a or 6a in the bi-level configuration;

FIG. 3d shows the detail of FIG. 3c in the lower deck loading configuration;

FIG. 3e shows the detail of FIG. 3c in the tri-level configuration;

FIG. 4 is a perspective view of a detail of the rigging of the deck assembly of FIG. 3a;

FIG. 5a shows a view of a deck level indicator of the car of FIG. 1a; and

FIG. 6a is a perspective view of an alternate embodiment of autorack rail car to that of FIG. 1a;

FIG. 7a is an end view of the autorack railroad car of FIG. 6a;

FIG. 8f shows the upper deck bridge plate fitting of FIG. 8d in a storage position;

FIG. 8g shows the fitting of FIG. 8e in isolations;

FIG. 9a is a partial perspective view of the autorack railroad car of FIG. 6a, with side panels removed to reveal features of the structure and deck drive transmission;

FIG. 10b is an enlarged detail of the drive transmission of FIG. 10a;

FIG. 10c is an enlarged detail of the drive transmission of FIG. 10a;

FIG. 11b is an exploded view of the elements of FIG. 11a;

FIG. 12b is an assembled view of the features of FIG. 12a;

DETAILED DESCRIPTION

Figure 1A:
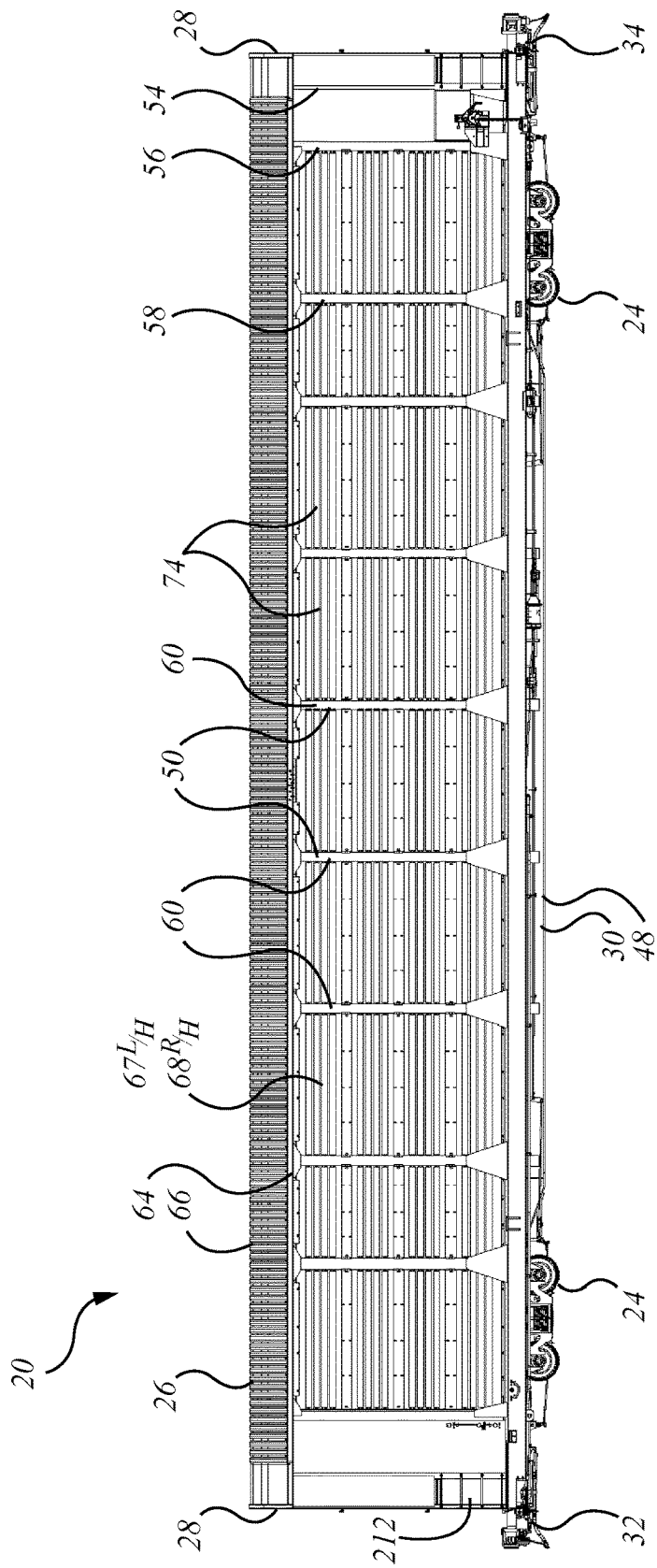
FIG. 1a is a general arrangement, side view of an autorack railroad car according to an aspect of the invention.
Figure 1B:
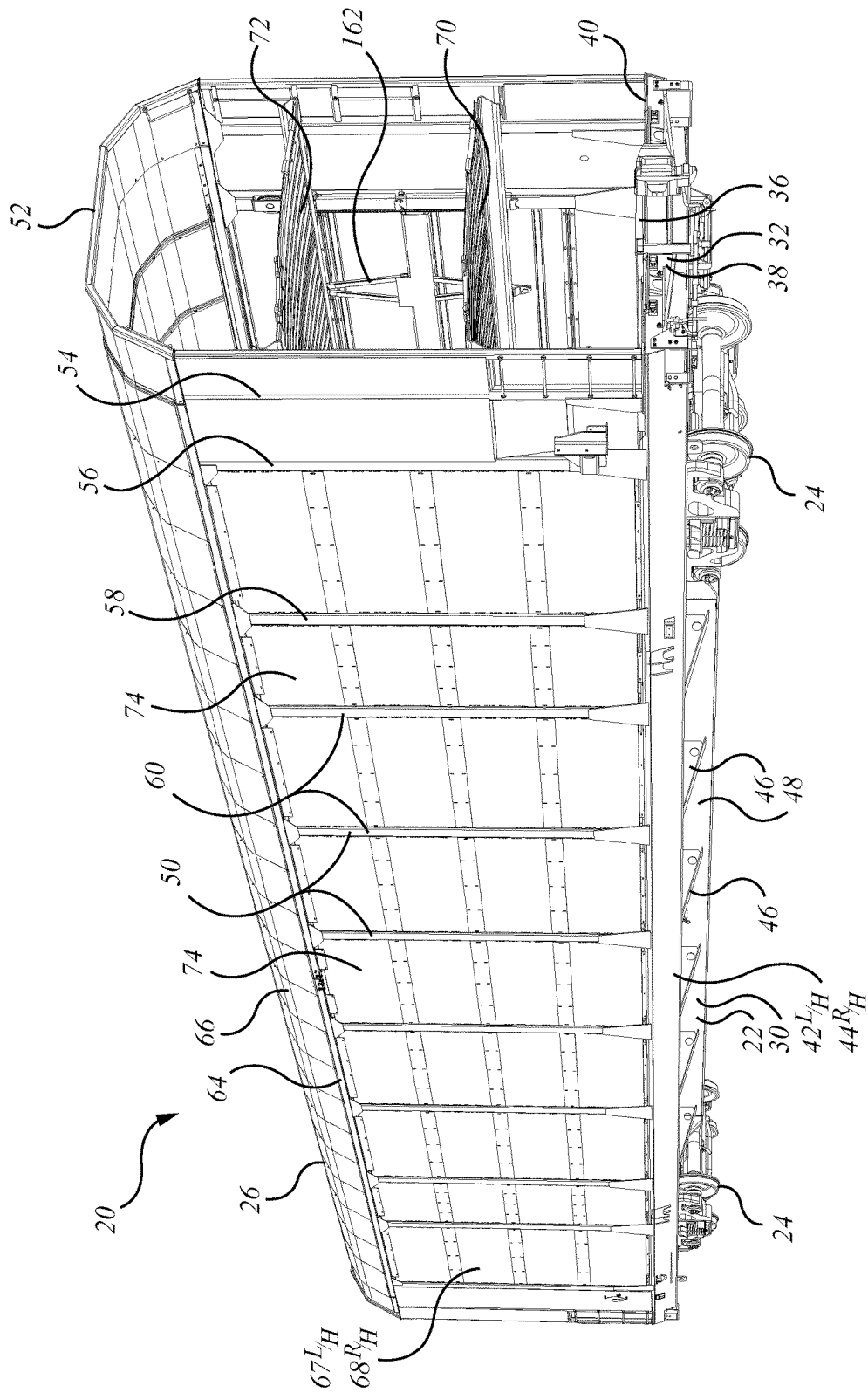
FIG. 1b is a perspective view of the autorack railroad car of FIG. 1a with end doors removed.
Figure 1C:
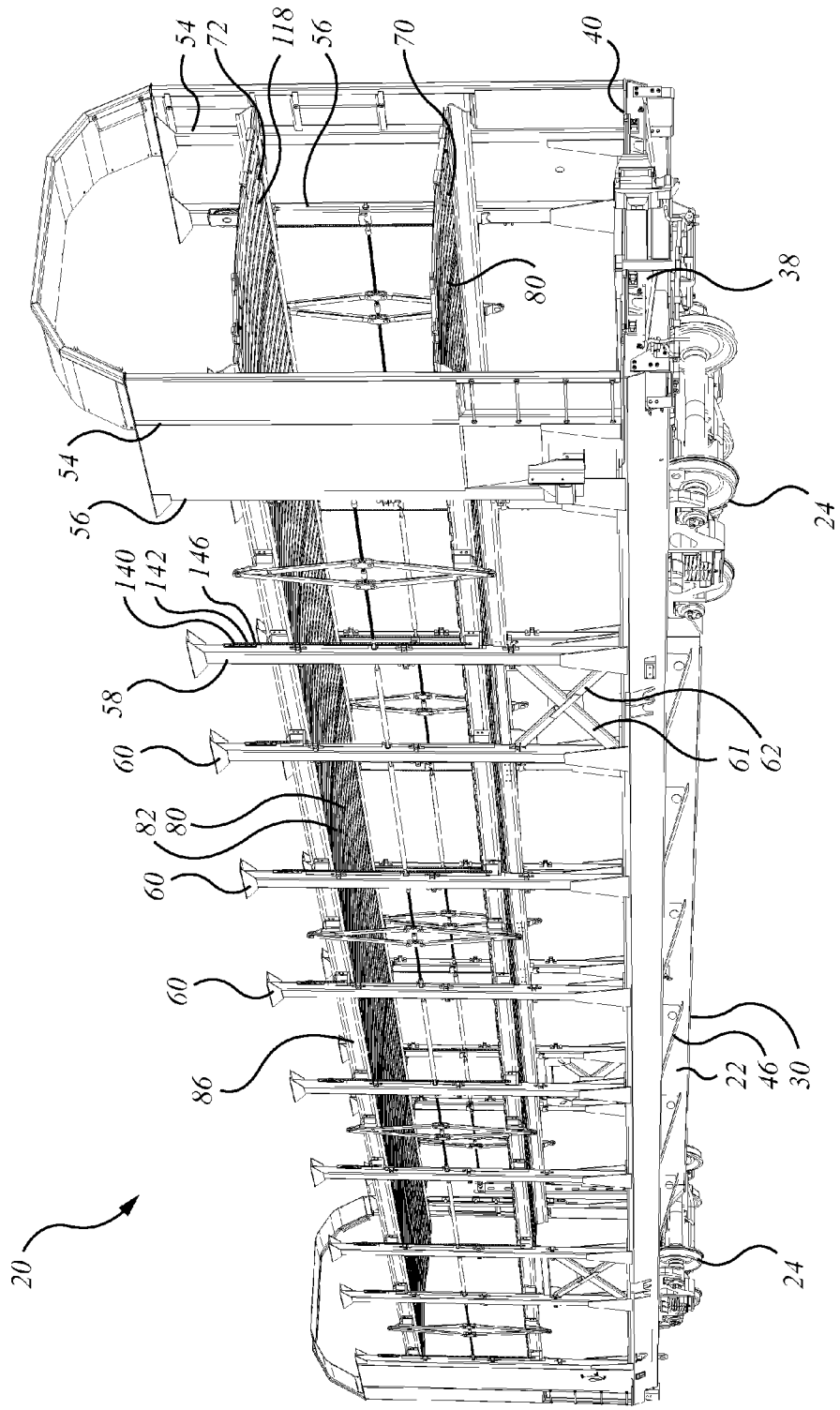
FIG. 1c shows the autorack railroad car of FIG. 1b with housing side panels and roof panels removed to show internal structure.

The description that follows, and the embodiments described therein, are provided by way of illustration of an example, or examples, of particular embodiments of the principles, aspects or features of the present invention. These examples are provided for the purposes of explanation, and not of limitation, of those principles and of the invention. In the description, like parts are marked throughout the specification and the drawings with the same respective reference numerals. The drawings may be taken as being to scale unless noted otherwise.

The terminology used in this specification is thought to be consistent with the customary and ordinary meanings of those terms as they would be understood by a person of ordinary skill in the railroad industry in North America. The Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record, (for example, earlier publications by persons not employed by the USPTO or any other Patent Office), demonstrating how the terms are used and understood by persons of ordinary skill in the art, or by way of expert evidence of a person or persons of at least 10 years' experience in the railroad industry in North America or in other former territories of the British Empire and Commonwealth.

In terms of general orientation and directional nomenclature, for railroad cars described herein the longitudinal or lengthwise direction is defined as being coincident with the rolling direction of the railroad car, or railroad car unit, when located on tangent (that is, straight) track. In the case of a railroad car having a center sill, be it a stub sill or a straight-through center sill, the longitudinal direction is parallel to the center sill, and parallel to the top chords and side sills, as may be. Unless otherwise noted, vertical, or upward and downward, are terms that use top of rail, TOR, as a datum. In the context of the car as a whole, the terms cross-wise, lateral, or laterally outboard, or transverse, or transversely outboard refer to a distance or orientation relative to the longitudinal centerline of the railroad car, or car unit, or of the centerline of a centerplate at a truck center. The term "longitudinally inboard", or "longitudinally outboard" is a distance taken relative to a mid-span lateral section of the car, or car unit. The directions correspond generally to a Cartesian frame of reference in which the x-direction is longitudinal, the y-direction is lateral, and the z-direction is vertical. Pitching motion is angular motion of a railcar unit about a horizontal axis perpendicular to the longitudinal direction. Yawing is angular motion about a vertical axis. Roll is angular motion about the longitudinal axis. Given that the railroad car described herein may tend to have both longitudinal and transverse axes of symmetry, a description of one half of the car may generally also be intended to describe the other half as well, allowing for differences between right hand and left hand parts. In this description, if used, the abbreviation kpsi stands for thousands of pounds per square inch.

In this discussion it may by understood that persons of ordinary skill in the art are familiar with the Rules and Standards of the Association of American Railroads (the AAR), which govern interchange service in North America. This specification or the accompanying illustrations may refer to standards of the Association of American Railroads (AAR), such as to AAR plate sizes. To the extent necessary or appropriate, those references are to be interpreted in a manner consistent with the Rules and Standards as extant on the earliest of the date of filing of this application or the date of priority of the earliest application from which this application claims priority, as if they formed part of this specification on that date.

Also for the purposes of the present discussion, it may be taken as a default that the structure of the car is of all-welded mild steel fabrication except as otherwise shown in the illustrations or indicated in the text. This need not necessarily be the case. Other materials, such as aluminum or stainless steel might be used. The rack structure may also be taken as being of steel fabrication, although, again, aluminum or stainless steel might be used, and the side web panels of the car, which may be made of mild steel, stainless steel, or aluminum might also be made from plastic composite material, which may be reinforced composite. The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than".

In FIGS. 1a-1e, an autorack railroad car is shown generally as 20. It has an underframe, or underframe assembly, indicated generally as 22, that is carried upon railroad car trucks 24 for rolling motion in a longitudinal or lengthwise direction along railroad tracks. Underframe 22 is surmounted by an overspanning housing structure indicated generally as 26, and which may be referred to as "the rack" or "racks" of the car. The ends of housing structure 26 are open to permit loading and unloading of automotive vehicles. Ingress and egress of those vehicles is governed by a pair of end doors, 28, such as may be radial arm doors or may be multiply-folding doors, movable between open and closed positions.

Underframe 22 has a center sill 30. Center sill 30 is a "straight through" center sill that runs substantially along the entire length of the car between first and second ends 32, 34 at which strikers 36 are mounted. The main deck 40 extends to either side of the center sill to the sides of the car at side sills 42, 44. The term "straight through" is used in distinction to stub center sills such those as used in, e.g., grain cars, where the center sill at each end of the car is truncated inboard of the center plate to leave a "stub", namely the center plate and draft sill assembly. In a straight through center sill, the center sill extends from one truck center to the other. The outboard portions of the center sill may be identified as the draft sills 38 in which the draft gear and couplers are mounted. Draft sills 38 are extensions of center sill 30 that extend longitudinally outboard of (and often include) the truck center to the striker 36.

Side sills 42, 44 run lengthwise along either side of underframe assembly 22, and are structurally connected to center sill 30 by an array of laterally extending structural members which may include cross-bearers 46 and cross-ties (not shown). A cross-bearer is a beam having a first end connected to the center sill at a connection that is intended to be capable of transmitting a bending moment, such that the cross-bearer is also a cantilever that has its root, or built-in end at the center sill. The second end or distal end or transversely outboard end of each cross-bearer is connected to the associated side sill running along that side of the car. The side sills are themselves beams, typically of hollow or open section, formed with an upper flange, a lower flange, and a medial portion that functions as a web to carry shear between the upper and lower flanges. Side sills may sometimes have a somewhat C-shaped section, with the open part of the C facing toward the center sill and the webs of the cross-bearer and cross-ties extending into the C and forming a connection.

Main deck 40 typically extends across the car from side sill to side sill and from end to end of the car, and provides a driving pathway for wheeled vehicles, i.e., the lading for this kind of car. Main deck 40 is supported by side sills 42, 44, center sill 30, cross-bearers 46 and such cross-ties as may be, and may form the top flange of one or more of them. In the example illustrated, for example, main deck 40 forms, or is substantially flush with, the top cover plate (i.e., top flange) of center sill 30, over most or all of its length e.g., excluding draft sills 38. The main deck may also form the top flange of the cross-bearers 46 and cross-ties (if any). The main deck is open at the ends (i.e., the curbs defined by the side sills only run along the sides) such that wheeled vehicles may be end-loaded. The main deck 40 may be carried at a lower level in the mid-car regions and a somewhat higher level over trucks 24.

The framework of, or that is defined by, housing structure 26 includes an array, or a series, of upstanding posts 50, that are spaced along the left and right hand sides of the car, that is, along, and standing upwardly of, side sills 42 and 44 respectively. There is an end framing structure, indicated as 52, that extends upwardly from the ends of the end sill, and which defines the shape of the gable end. Next inboard is "the first post" or "No. 1 post", an upright side post 54 that runs between the side sill and the top chord at the station of the first lateral underframe cross-members. Next inboard are posts 56, (the "No. 2 post") mounted at the ends of the next adjacent lateral frame (i.e., next outboard of the truck center), and posts 58, mounted near the ends of the second lateral frame member inboard of the truck center. Several further posts 60 are mounted further inboard at the ends of the respective cross-bearers 46 that extend laterally of central portion 48 of center sill 30. Diagonal shear bracing 61, 62 is mounted between main posts 58 and next longitudinally inboard posts 60. Longitudinally running left and right top chords 64 run along, and tie together, the tops of all of posts 54, 56, 58, and 60 as may be. The roof structure 66 is mounted atop top chords 64 and restrains them in the lateral direction, and provides a lateral shear connection between the left and right hand side walls 67, 68 of the car. The roof structure includes a framework of lateral frames and longitudinal stringers (not shown). This framework and the longitudinal stringers form a truss structure that cooperates with the truss structure of the sidewall posts. The framework defined by the post array skeleton of housing structure 26 may support one or more elevated decks, such as a second or mid-level deck 70, and a third or upper deck 72. The entire structure includes sidewall panels 74 that are mounted between the various posts, and that may tend to act as shear panels between those posts and between the side sills 42, 44 and the respective top chords 64. Sidewall panels 74 are mounted on cleats 76.

When the replaceable rack structure of posts and braces and top chords is in place, the high longitudinal members act as chords of a truss more than 10 ft. distant from the side sills. This deep truss structure aids in providing the car with the resistance to vertical bending required when carrying lading in service. As noted above, the underframe is intended to define, and to be, permanent structure of the autorack car, whereas the racks may have roughly one third the life of the underframe. That is, the underframe may have a first set of racks when new, and two sets of replacement racks during the car's lifetime.

The rack structure of the elevated deck or decks includes a set of deck panels, or deck panel assemblies, of which a representative one is indicated as deck panel assembly 80. Other than as noted, assembly 80 is symmetrical about the longitudinal vertical (i.e., x-z) centerline plane of the rack, and spans the open space between the left and right hand sidewall support structure of car 20. It may also be noted that deck panel assembly 80 may be manufactured in different lengths, and a set of deck panels 80 is installed to define a full length deck of car 20, be it deck 70 or deck 72. As may be appreciated, each of deck panels 80 may be replaced as an individual module if damaged or corroded, or in need of replacement or repair for whatever reason. Deck panel assembly 80 includes a main, or first, decking panel 82, first and second, (or left and right) side beams or rails 84, 86, first and second, or left and right, upper longitudinally running members 88, 90; a vehicle placement securement fitting, or fitting array.

Main decking panel 82 may include a central portion 104 and left and right hand edge or margin portions 106, 108. Main decking panel 82 may have an upper surface 112 which defines a roadway, or pathway, or track 114 over which wheeled vehicles may be conducted in the lengthwise direction (or x-direction) in the normal procedure of loading and unloading vehicles in autorack cars. Main decking panel 82 may also have an underside, or downwardly facing surface 116 that faces toward the next lower deck, be it the middle deck (in the case of an upper decking panel) or the railroad car main deck 40 of underframe 22. As installed, main decking panel 82 is spaced upwardly from the next lower deck by a distance commensurate with the carrying of another layer of vehicles on the deck therebelow. Main decking panel 82 may have an undulating form, with up-and-down undulations or corrugations in the vertical direction made to increase its effective depth of section and therefore its second moment of area for resistance to bending. The undulations may run generally cross-wise, namely in the lateral, transverse, left-to-right, or y-direction. The undulations run in the direction generally cross-wise to the lengthwise running direction of main decking panel 82 generally, and also of pathway 114. The undulations may have the form of corrugations 118.

Central portion 104 may be formed as a single section, or may be formed by welding two left and right halves together. In that context, the left and right halves may be identical, but reversed and welded together along a central seam. Central portion 104 may be formed on a curvature such that it has an arcuate crown 120, of which the crest is at, and runs along, the longitudinally running centerline. The downwardly and outwardly sloped margins or edges of central portion 104 meet, and are joined to, left and right hand margin portions 106, 108. The junction of these components may be formed by welding. Margin portions 106 and 108 are oriented horizontally. That is, if decking panel 82 is placed on a flat surface, margin portions 106 and 108 will lie in a common horizontal plane, which central portion 104 deviates convexly arcuately away from that plane.

Side beams, or rails, 84, 86 run in the lengthwise direction along margin portions 106, 108. Each side beam 84, 86 has a first leg 122 that extends substantially horizontally, a second leg 124 that extends substantially vertically, and a roll-formed closure leg 126 which is folded to return to first leg 122, and thereby form a closed hollow section. While the section may be round or square or rectangular, in the embodiment illustrated it is triangular. First leg 122 functions as a horizontal flange, and second leg 124 functions as a vertical shear web. First leg 122 overlaps, and is welded to, a respective one of margin portion 106 or 108. In the case of mid-level deck 70, first leg 122, and beam 84 or 86 more generally, is mounted to the underside of margin 106 or 108. In the case of upper level deck 72, first leg 122 (and beam 84 or 86 more generally) is mounted to the upper side of margin 106 or 108 as the case may be. The corrugations of margins 106, 108 extend upwardly or downwardly away from first leg 122. The ends of portions 106, 108 terminate inboard well clear of second leg 124, and are offset laterally inboard relative to flange 126.

Longitudinally running members 88 and 90 are mounted to the upwardly facing surfaces of the corrugations, symmetrically to either side of the centerline of crown 120. Members 88 and 90 may have the form of open structural section members, and in one form may be inverted channels or top-hat sections with the toes of the legs mated to surfaces 112 of the successive corrugations. Members 88 and 90 may function as upper, longitudinal flanges of deck panel assembly 80. They may also function as upstanding guideways, or curbs, for wheeled vehicles being conducted along deck panel assembly 80. To the extent that the open section faces downward, and is self-draining, it is not a place where moisture, dirt, or other material may tend to collect. Wheel track gratings or sheets 92 are placed laterally outboard of longitudinally running members 88 and 90.

As shown and discussed in U.S. Ser. No. 13/666,830 filed Nov. 1, 2012, (which is to any extent necessary or helpful understood to be incorporated herein by reference), securement fittings may be provided that have the form of a locking rail spaced laterally outboard from member 90 (or 88, as may be). Securement fittings may be placed on both sides of the centerline of deck panel assembly 80. Hinge fittings 94 and 96 may mate with corresponding hinge fitting of adjacently placed movable decks or bridge plates, as may be.

Movable mounting bracket assemblies 98 are provided. Mounting bracket assemblies 98 may also be termed carriages, or shoes, that are formed to mate with their respective mounting posts in a sliding, translational relationship, and thereby to define a motion restraint or motion governor. Mounting bracket assemblies 98 define the mounting interfaces at which deck panel assembly 80 (of deck assembly 70 or 72, as may be) is connected to the side post array, and thus suspending it in an overhead spanning position relative to any lower deck or decks.

Mounting bracket assemblies 98 may include fittings such as mounting plates 130, which may be substantially rectangular with chamfered corners and which may define a mounting foot of deck panel assembly 80. Mounting plates 130 may be welded to side beams 84 and 86, as indicated. Mounting bracket assemblies 98 may also include one or more guides 134. Each guide 134 may have the form of an angle bracket, or angle iron 134, and may include horizontal gussets or webs 136 running as stiffeners between the legs of the angle and plate 130. Each assembly 98 could have two such guides 134, spaced to seat about the inside face and walls such one of the respective posts as may be. However, it may also be noted that the mounting of a single guide 134 on a first plate 130, and a corresponding opposed guide 134 on the next adjacent plate 130 mounted to another post (such as the next adjacent post) will yield a pair of guides restricting motion in the degree of freedom of the +x and −x directions. Since the width of the deck assembly, be it 70 or 72, is bracketed laterally by posts on either side of the car, motion in the horizontal degree of freedom in the +y and −y-directions is also constrained, leaving deck assemblies 70 and 72 with only a single translational degree of freedom, namely in the z-direction. The various posts may be provided with a friction reducing coating or surface or treatment, such an UHMW polymer, such as a Nylon™ surface or skin, indicated generally as 138, which may extend around such of the surfaces of the post as may define the sliding interface between assemblies 98 and such posts as may be. As shown, a pair of assemblies 98 on upper deck assembly 72 have opposed angle irons 134 that straddle two adjacent posts; whereas another pair of assemblies 98 have opposed angle irons that nest between a pair of adjacent posts. The choice may be arbitrary, and, in any case, where mid-level deck 70 and upper level deck 72 have several pairs of such guides along their lateral margins along the length of the car, the orientations may alternate, the next result being that each deck is constrained to translation along a single degree of freedom, in this case the vertical direction.

Deck assemblies 70 and 72 may have substantial weight. To ease their motion, a transmission may be provided in the nature of a counterbalance transmission, indicated generally as 140. Counterbalance transmission 140 may have the form of a chain-and-pulley arrangement, or assembly, indicated generally as 142. This arrangement may include a pulley or sheave, or gear, or idler, or wheel, 144 such as may be mounted to a respective one of the posts at some level higher than the uppermost position of upper deck 72, i.e., as deployed in the tri-level configuration when deck 72 is vertically distantly spaced apart from deck assembly 70. Wheel 144 may, for example, be mounted at the top of its respective post, adjacent to top chord 64. Wheel 144 may be a toothed wheel, i.e., a gear, but need not be. Wheel 144 may be an idler, That is, a non-driven member. Assembly 142 may also include a flexible draft member, or suspension member, or tension member 146, such as may have the form of a wire or cable or belt, or chain, 148. Chain 148 may have a first end 150 mounted to the first suspended deck assembly, i.e., mid-level deck assembly 70; and a second end 152 attached to the second suspended deck assembly, namely upper-deck assembly 72. The connection at one or the other ends may be adjustable. It may be more convenient for the connection to upper deck assembly 72 to be the adjustable connection.

Figure 1D:
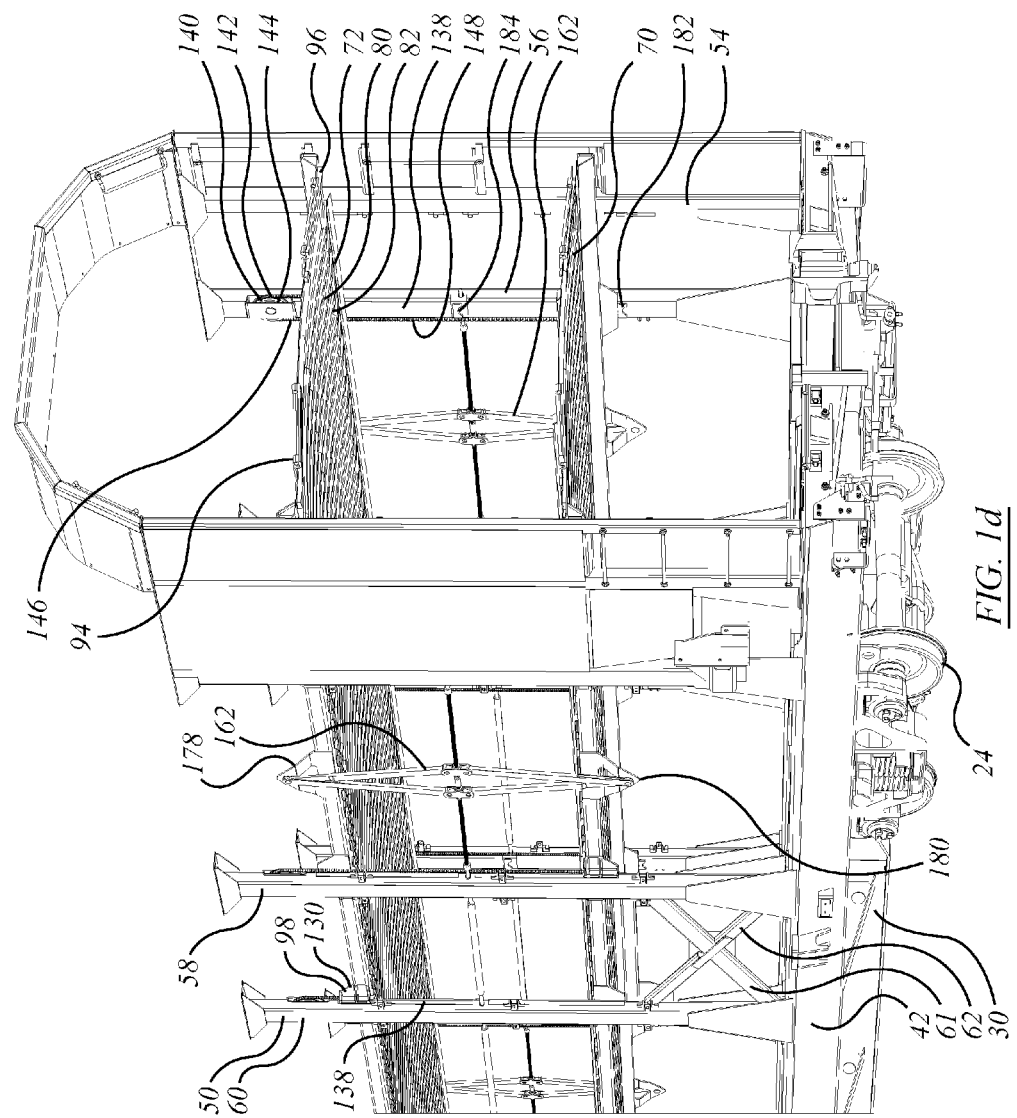
FIG. 1d is an enlarged detail of the autorack railroad car structure of FIG. 1c in the tri-level configuration.
Figure 1E:
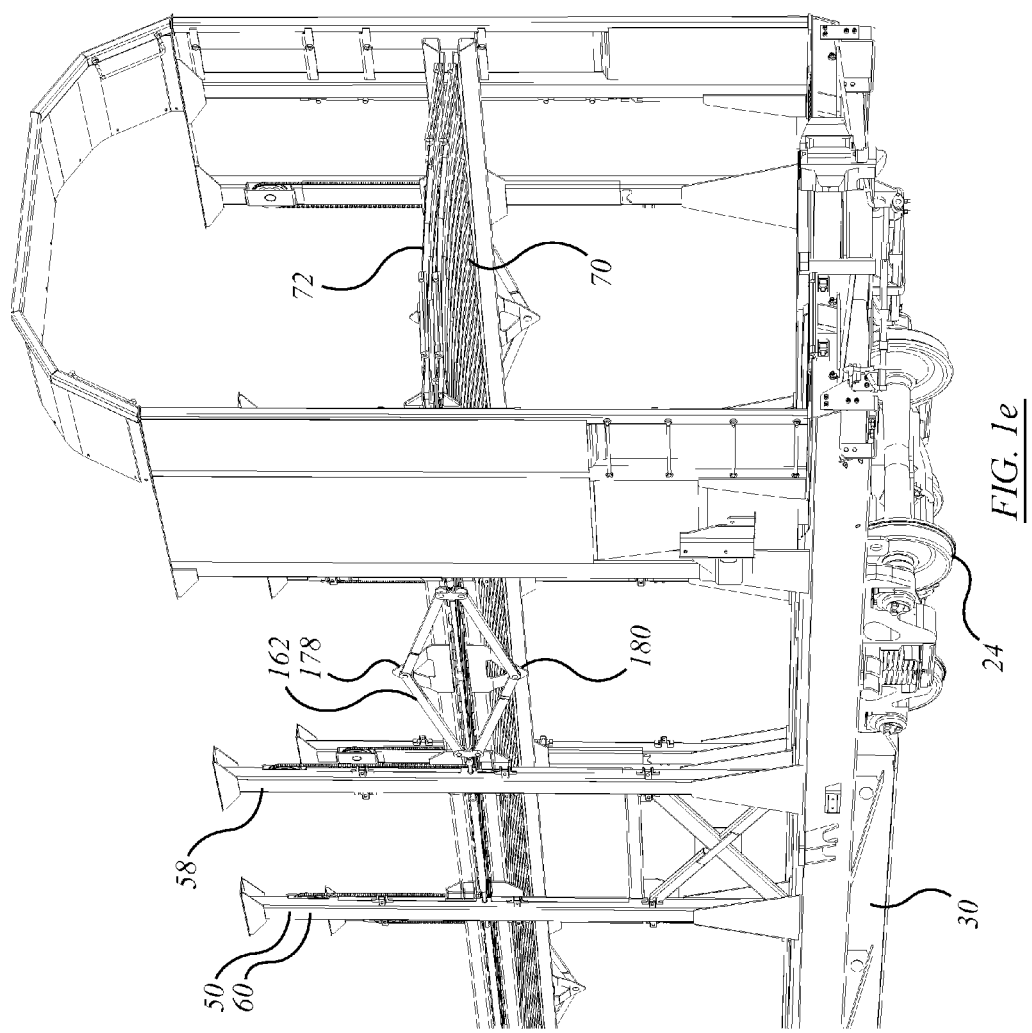
FIG. 1e shows a corresponding an enlarged detail of the autorack railroad car structure of FIG. 1d in the bi-level configuration.

As may be understood from, for example, FIG. 1d, there may be several such assemblies 142 mounted along the car from the various posts. They may be mounted from the same posts to which the guide assemblies, or mounting bracket assemblies 98, are also mounted, although this is not necessarily so. Some of chains 148 may be fed right-handed (or clockwise) over their pulleys (i.e., wheels 144), and some may be fed left-handed, or counter-clockwise. In one embodiment, the orientation may vary alternately clockwise and counter-clockwise (or left-hand and right-hand) along the car to obtain a balanced or symmetrical arrangement. The designation of left-hand and right-hand is arbitrary. Left hand may be associated with counter-clockwise rotation of the respective wheel 144 when upper level deck 72 is rising, right hand may be associated with clockwise rotation under the same condition. Each end of tension member 146 is mounted to an associated one of assemblies 98 on a side of assembly 98 that includes a mounting bracket angle iron 134. As so mounted, and considering the effect of an array of such assemblies mounted along opposites sides of car 20, as mid-level deck 70 moves in one direction (i.e., upwardly or downwardly), upper-level deck 72 moves in the opposite direction (i.e., downwardly or upwardly). Inasmuch as mid-level deck 70 and upper level deck 72 have substantially the same weight of structural elements, the two decks counterbalance each other through the medium of counterbalance transmission 140. The net force required to move the decks from one position to another is intended to be small, that is, zero or substantially zero. Counterbalance transmission 140 may be termed a passive transmission: It is not directly driven, but merely moves in response to a driving motion imposed upon the deck assemblies by other means. It is a passive, or slave, system. In the embodiment shown, each post from the No. 1 post at one end of the car to the No. 1 post at the other end of the car has a passive counterbalance transmission 140. Inasmuch as there are 10 such posts along each side of the car, the weight of the decks is thus spread between 20 points.

Car 20 has a second transmission 158, which may be a deck drive train, or drive transmission, indicated generally as 160. Drive transmission 160 is an active, or positively driven, transmission. Transmission 160 may include a scissor jack, or scissor jacks, 162 such as may be mounted along the sides of car 20. In the embodiment shown, there are six such scissor jacks, there being three on the left hand side of the car and three on the right hand side. Each side has one set of scissor jacks mounted centrally between the middle pair of posts (i.e., then No. 5 post and No. 6 post). There is also a scissor jack at each corner of the car, mounted between the No. 1 and No. 2 posts.

Scissor jack 162 may include first and second threaded yokes 164, 166 that are matingly engaged to a threaded rod or shaft 168. Threaded shaft 168 has a first portion with Acme threads of one hand for engaging the mating threads of the same hand of yoke 164, and a second portion of threads of the opposite hand for engaging the mating threads of that same opposite hand of yoke 166. Rotation of shaft 168 in one direction drives yokes 164, 166 toward each other; rotation in the other direction drives them apart. Symmetrically mounted first and second upper and lower strut pairs 170, 172, and 174, 176 extend from yokes 164, 166 to upper and lower deck carrier plate fittings 178, 180 respectively. The approach of yokes 164, 166 together will then separate fittings 178, 180 (and so therefore deck assemblies 70, 72), whereas the spreading of yokes 164, 166 apart will draw them together. In the embodiment illustrated shaft 168 runs horizontally and is mounted at the level of the bi-level position. When yokes 164,166 are at their most proximate, the deck assemblies are at their most distant, in their tri-level, spaced apart condition or position.

Car 20 also has stops, or abutments 182, 184 mounted to the respective posts. When suspended deck assemblies 70 and 72 reach the fully separated condition or position, mid-level deck assembly 70 will stop on lower abutments 182. It may be noted that abutment 182 has a large radius upper crown, and is fit in place on assembly, such that each deck assembly will, as manufactured, bottom out on the abutments (be they 182 or 184) at the same position. It may also be noted that each of abutments 182 and 184 may have a lip, or lead-in, or trap, such that when plate 130 descends into engagement with abutments 182 or 184, as may be, plate 130 may then tend to be urged snug against whichever post of array 50, as seen in the engagement of mid-level deck assembly 70 in FIG. 2d. Scissor jack 162 has a torque limiter 186 that prevents shaft 168 from being over-driven once this abutting condition has occurred. In essence, torque limiter 186 is an automatically disengaging clutch or coupling. Similarly, in the other direction, when the bi-level position is reached, upper-level deck assembly 72 bottoms out on upper abutments 184. Again, torque limiter 186 prevents shaft 168 from being over-driven. Car 20 may have more than one scissor jack 162 on each side. To the extent that several such scissor jacks are mounted on the same side, they are linked by interconnecting torque drives, or shafts 168 that are carried through bushings mounted in the various side posts on a common drive axis. As noted, there may be, for example, three or four such scissor jacks 162 per side.

Transmission 160 has an input section that includes a track level input interface 190, which may have the form of a key or socket 192 such as may be engaged by a powered external drive (not shown) such as a drill or rotating shaft. Alternatively, as the need may arise, the external drive may be driven by a hand crank or wheel or other apparatus mounted to engage socket 192. Interface 190 may be located near the No. 2 post, and may be accessible from trackside by yard personnel. A mechanical transmission is shown. It is also possible to make multi-port hydraulic transmissions. However, the range of travel might tend to imply large cylinders or reservoirs, or both, and extensive hydraulic piping. Hydraulic systems may tend to develop leaks, which may be undesirable, and which may require a higher level of maintenance. A shaft-driven transmission does not require hydraulic lines, and is unlikely to be prone to dripping hydraulic fluid.

Input interface 190 drives a transmission distributor 194 that carries torque to both sides of car 20. (There may be a key or socket 192 on each end of distributor 194, so that the drive can be operated from either side of the car, or both at the same time.) Torque distributor 194 may have the form of a laterally extending shaft 196 that passes through the draft sill longitudinally outboard of the main bolster. At either end of shaft 196 there is a drive gear 198 and a further transmission member in the form of a chain 200 that drives a pinion 202 with a smaller number of teeth. A further transmission member in the nature of a quarter-turn twisted drive chain 204 carries the transmission upward to the height of the input end gear 206 of the torque shafts of the various scissor jacks 162. Twisted drive chain 204 and end gear 206 are housed in a predominantly vertically oriented generally square or rectangular sectioned guard, or cowling, or shroud 210. As may be understood, turning socket 192 in a first direction (e.g., counter-clockwise) will cause suspended deck assemblies 70 and 72 to spread apart; motion in the other direction (e.g., clockwise) will cause them to come together. As may be noted, the drive transmission is separate and independent of the counterweight transmission. However, the operation of the counterweight or counterbalance transmission is intended substantially to reduce the torque required to move the deck assemblies by taking the weight off the scissor jacks.

Figure 2A:
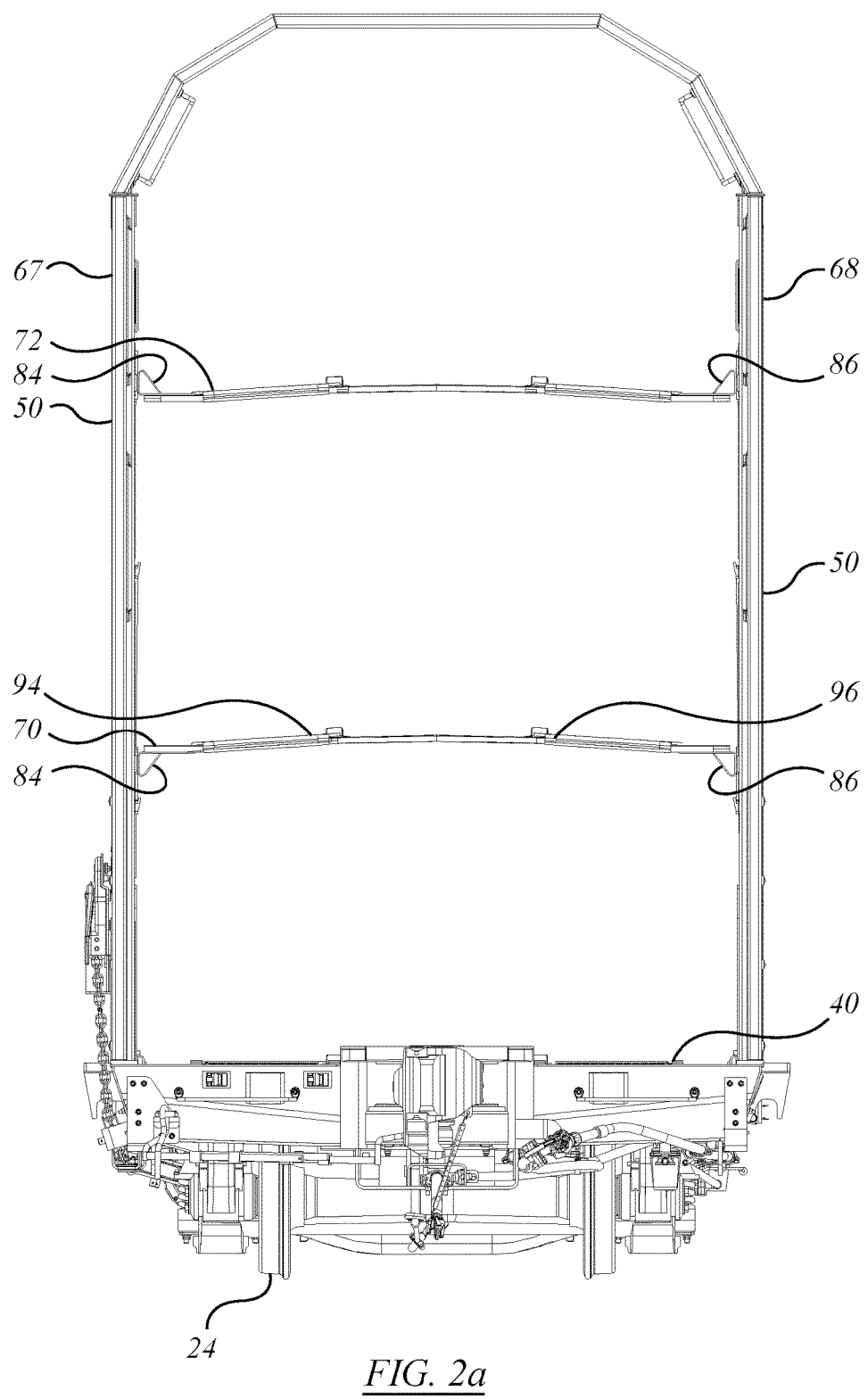
FIG. 2a is an end view of the autorack railroad car of FIG. 1a with decks shown in the tri-level configuration.
Figure 2B:
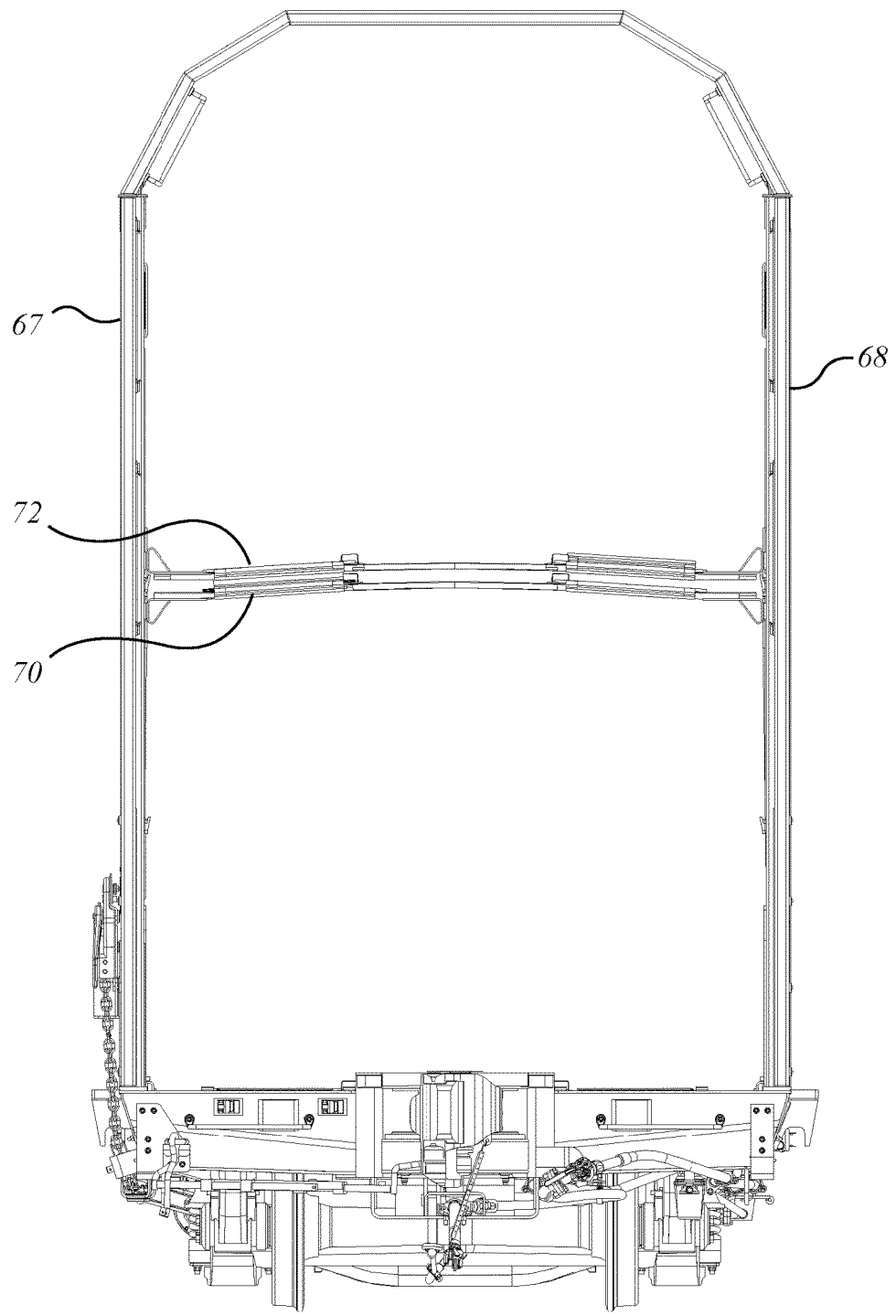
FIG. 2b is an end view of the autorack railroad car of FIG. 1a with decks shown in the bi-level configuration.
Figure 2C:
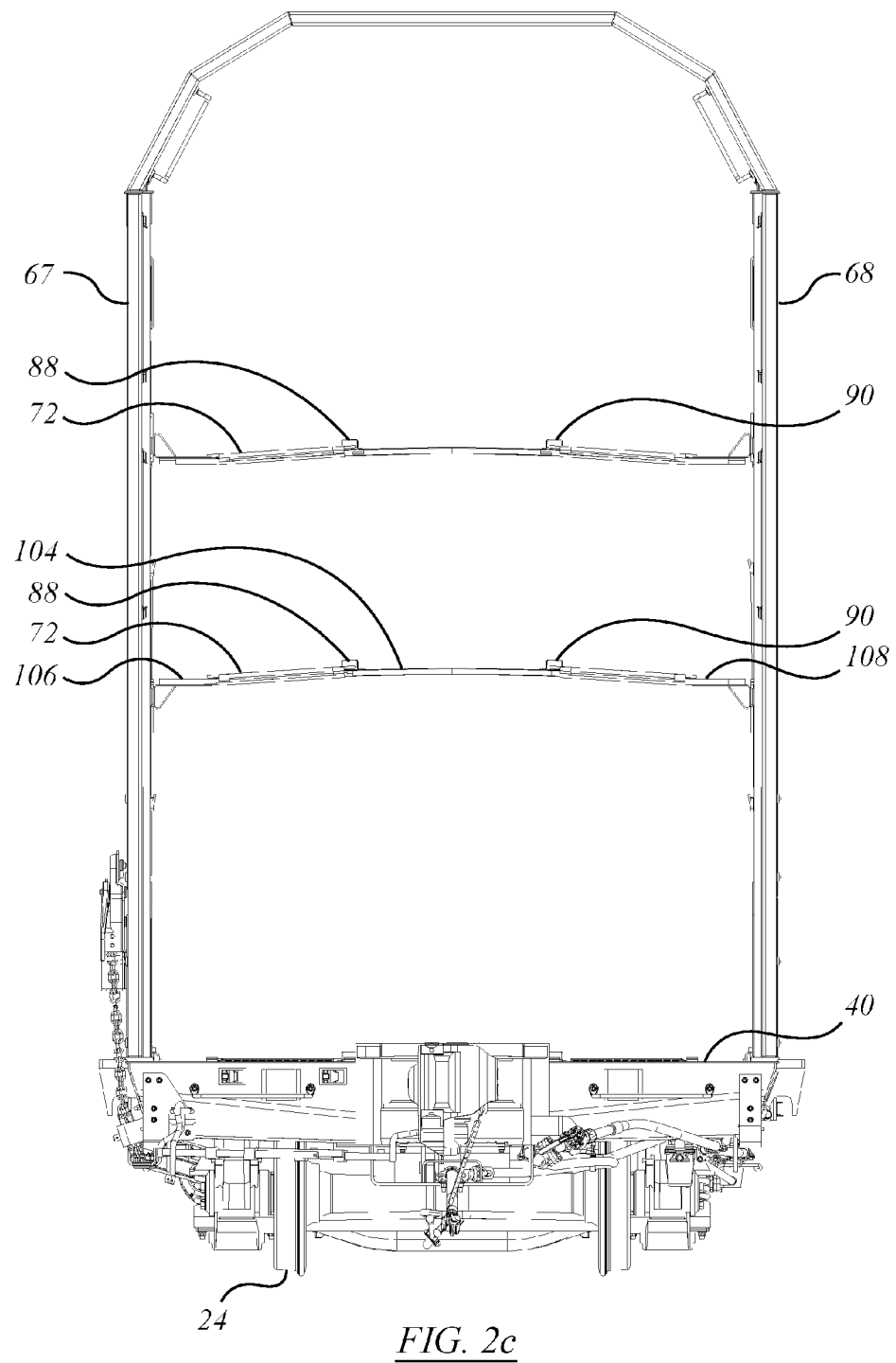
FIG. 2c is an end view of the autorack railroad car of FIG. 1a with decks shown in a configuration for loading or unloading the main deck.
Figure 2D:
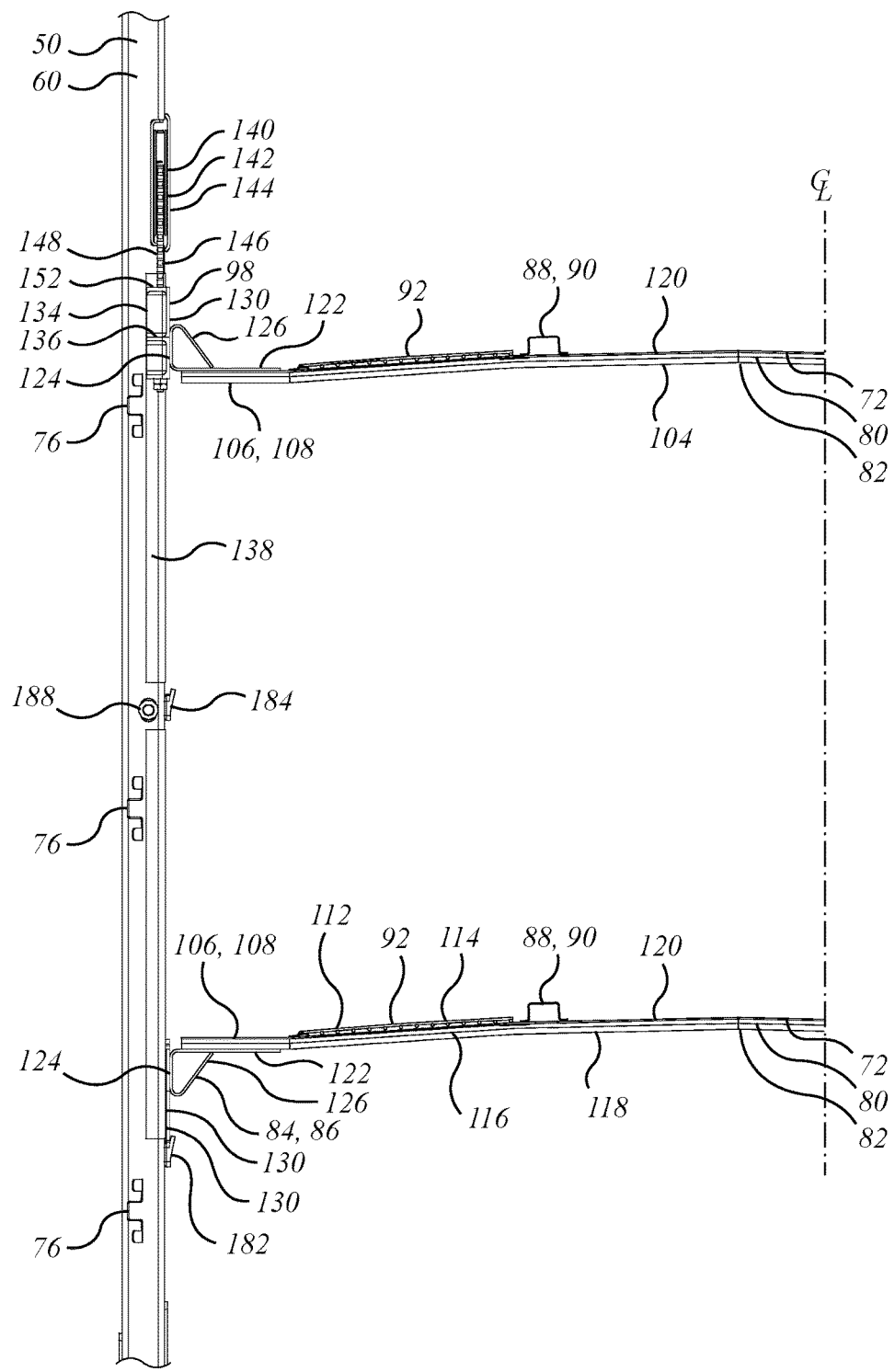
Figure 3A:
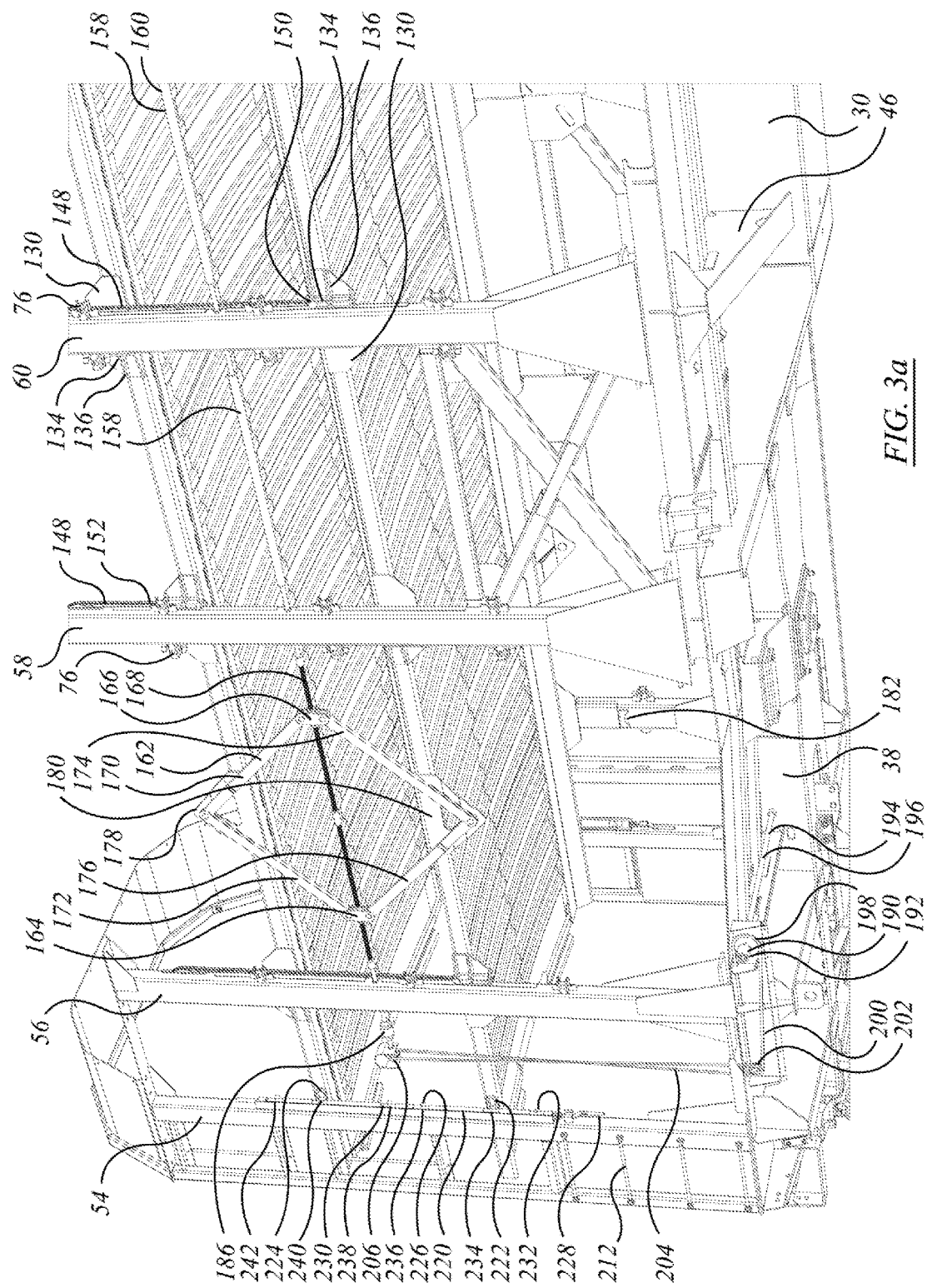
FIG. 3a is a perspective view of a portion of the autorack railroad car of FIG. 1c viewed from the opposite side.
Figure 3B:
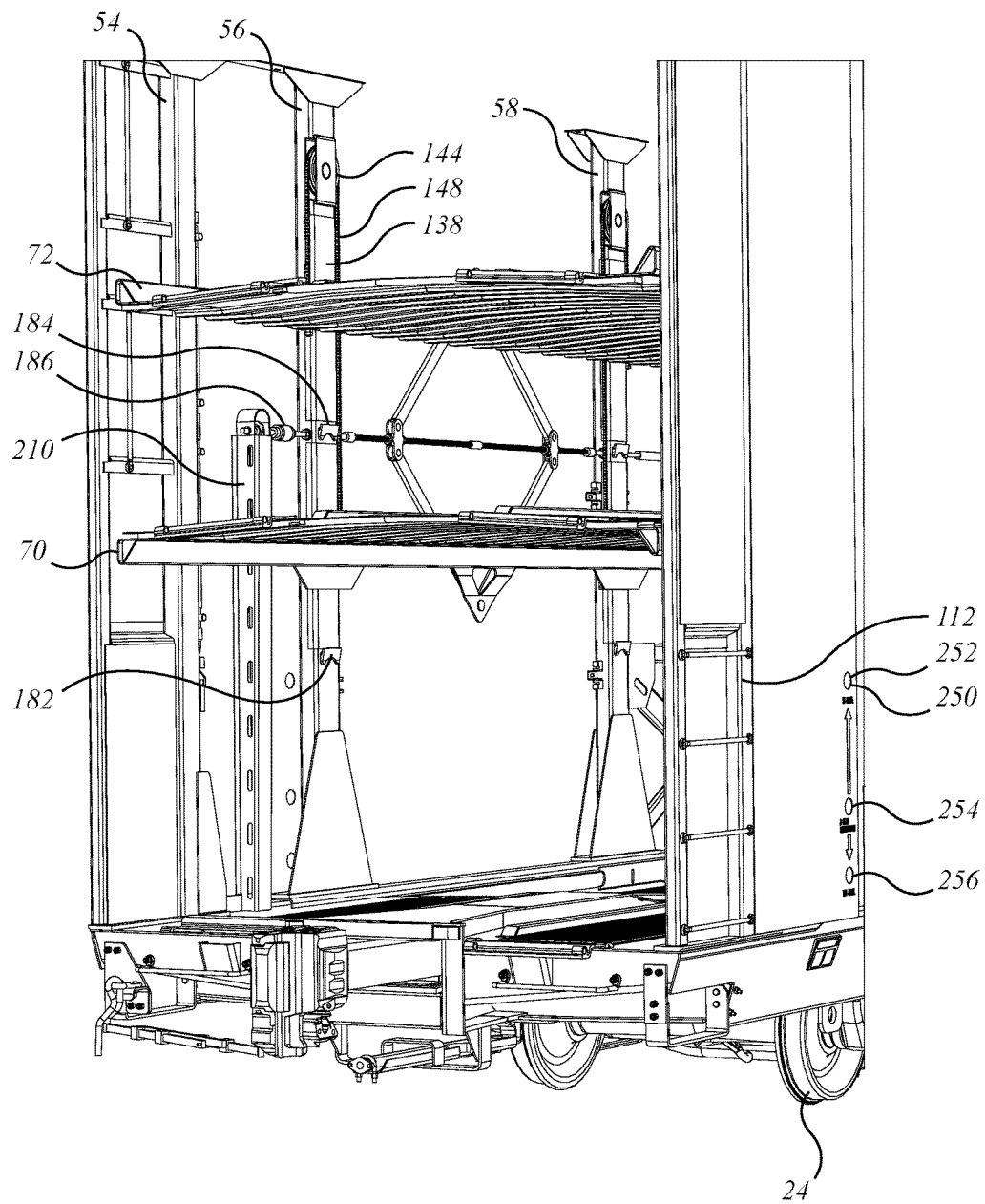
FIG. 3b is a perspective view of the autorack railroad car of FIG. 3a, viewed predominantly from one end.
Figure 3F:
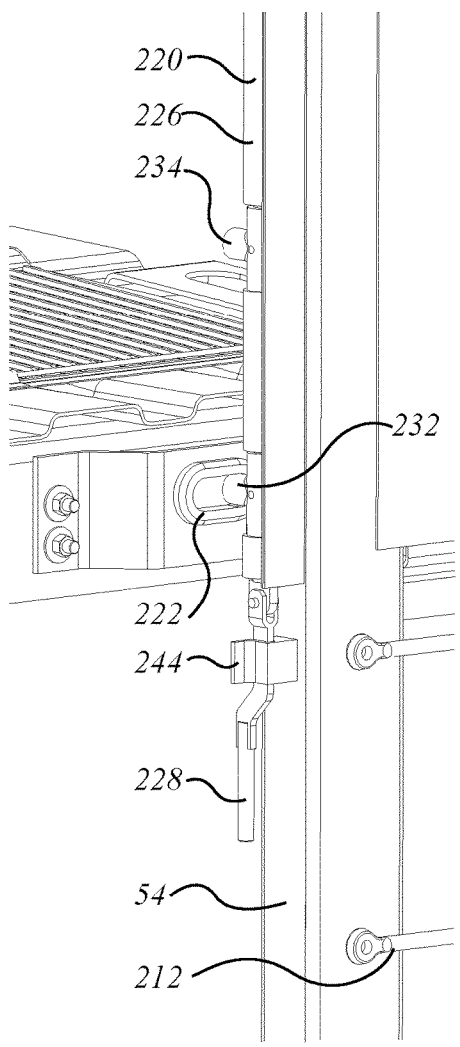
FIG. 3f shows an enlargement of a handle of the securement apparatus of FIG. 3c in a locked position.
Figure 3G:
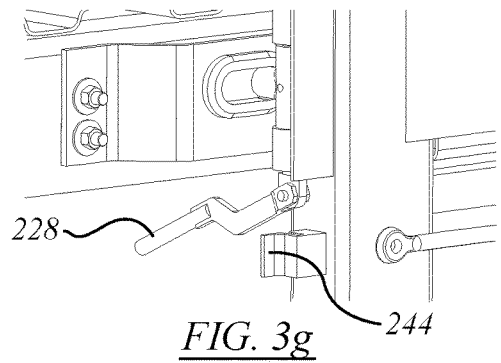
FIG. 3g shows the handle of FIG. 3f in an unlocked position.
Figure 3H:
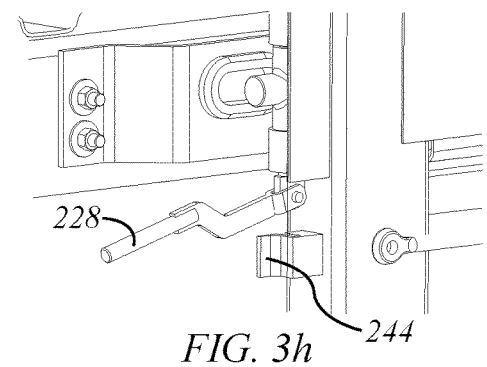
FIG. 3h shows the handle of FIG. 3f turned to disengage the deck securement.
Figure 3I:
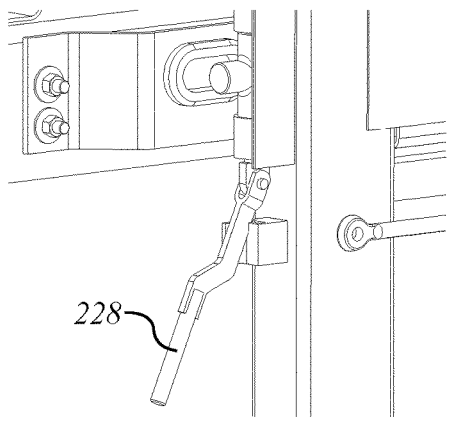
FIG. 3i shows the handle of FIG. 3c in a lowered, temporary securement position with the pins disengaged to permit movement of the decks.
Figure 4:
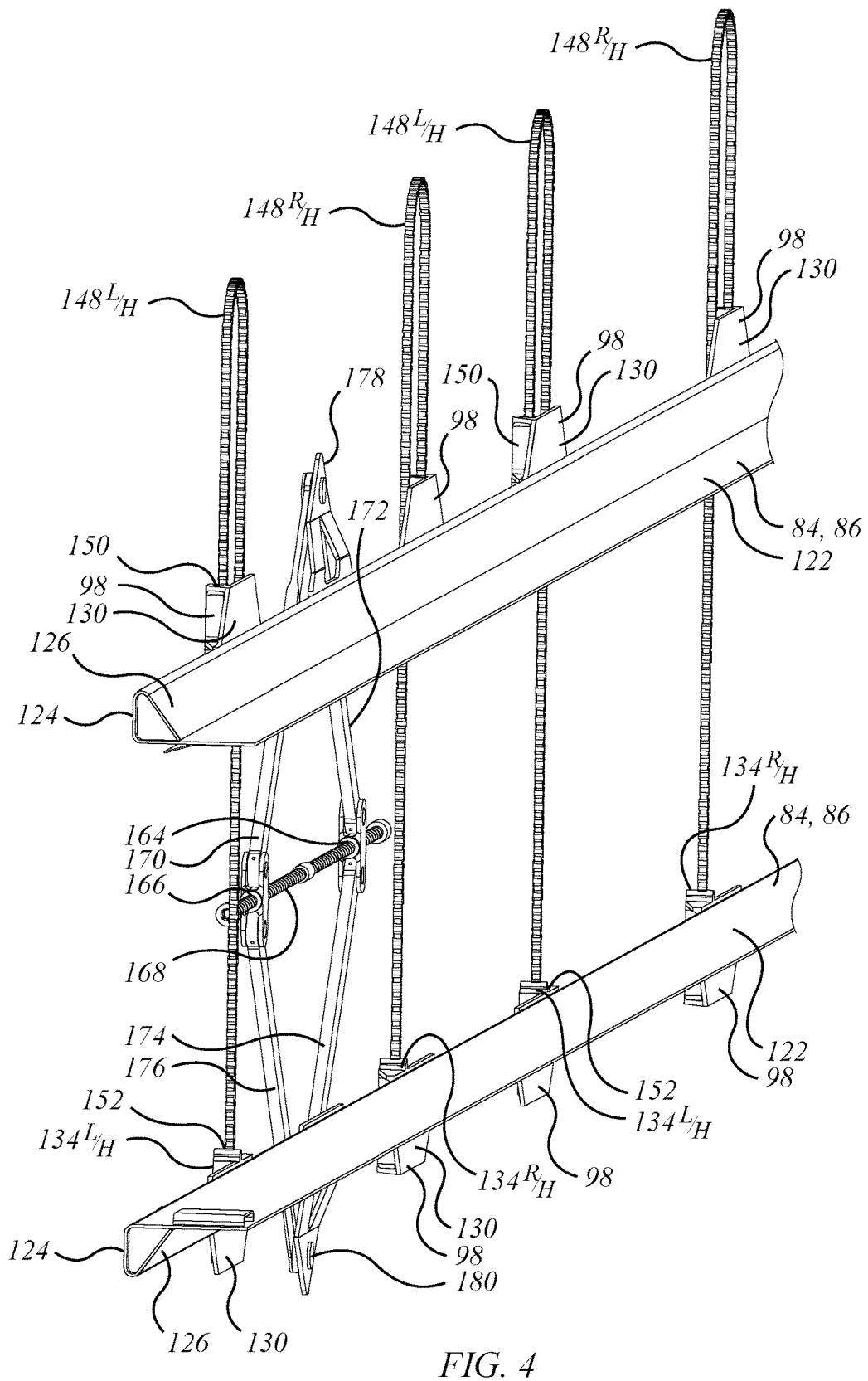

As noted, deck assemblies 70 and 72 are driveable between the tri-level and bi-level positions or conditions, such as shown in FIGS. 2a and 2b. They are also drivable to, and positionable in, an intermediate position, shown in FIG. 2c. As noted above, the main deck level may tend to be higher over trucks 24 than in the middle of the car. That is, the central portion 348 of the main deck inboard of (i.e., between) the truck centers is carried at a lower height on the side sills. Expressed differently, the main deck is lower, or depressed in the center. During loading it may be desirable to increase the clearance height between main deck 40 and mid-level deck 70, to some distance that is greater than the clearance height when the decks are in the tri-level position. Thus car 20 (and 320, below) has the intermediate, loading, position or condition of FIG. 2c. The position of FIG. 2c may tend not to be a position in which decks 70 and 72 remain during motion of the train. The intermediate position of FIG. 2c provides clearance without having the end portion of mid-level deck 70 being hinged to provide temporary clearance, as in the prior art of U.S. Pat. No. 4,252,482 of Naves, issued Feb. 24, 1981, and without the use of springs. When the main, or lowest, deck 40 has been loaded, deck assembly 70 is then placed in the tri-level position, and loaded, followed by loading of deck assembly 72. Unloading occurs in reverse manner, the upper decks being unloaded first, then being moved to increase clearance height over the end portions of main deck 40, then the decks are returned to the correct position. It is, of course, possible to move the car with the upper decks being in an empty condition while the decks are in the position shown in FIG. 2c.

An access ladder 212 may be mounted between the No. 1 post and the end of car 20. On the laterally inboard side of the No. 1 post 54 there is a secondary lock assembly 220. As seen in FIGS. 3f-3i, each of deck assemblies 70 and 72 has a respective first indexing member 222, 224, which may have the form of oval sockets, as illustrated. Secondary lock assembly 220 may include a shaft 226 that is turned by a crank or handle 228 mounted at its lowermost end. At locations corresponding to the respective fully raised or lowered positions of assemblies 70, 72, shaft 226 has protruding indexing members 230 formed to engage with the corresponding indexing members 222, 224 of deck assemblies 70, 72. Members 230 may be stubs or fingers that fit within the oval peripheral walls of members 222, 224. There may be three lower indexing members, 232, 234, 236, corresponding to the positions of mid-level deck 70 in the tri-level, main deck loading or unloading, and bi-level positions respectively. Similarly there may be three upper indexing members 238, 240, 242 corresponding to the positions of upper level deck 72 in the bi-level, main deck loading, and tri-level positions. When the decks are to be moved, crank handle 228 is lifted and turned 90 degrees to disengage secondary lock assembly 220, moving indexing members 230 out of engagement with indexing members 222, 224. The decks are driven to a new position. Then crank handle 228 is turned back to its original position, and those others of indexing members 230 corresponding to the new position of the deck assemblies engage with indexing members 222, 224, inhibiting the decks from moving. Crank handle 228 also has a semi-secured disengaged position. That is, the handle mounting has a tab 244 that protrudes laterally. When handle 228 is disengaged such that the decks can move, it is placed behind (i.e., outboard of) tab 244. This prevents the indexing members from accidentally impeding motion of the decks. Once the decks have been moved to their new position, handle 228 is disengaged from tab 244 and the indexing members are pivoted to engage the decks, as before. Secondary lock assemblies 220 may be mounted at all of the four "points" (i.e., corners) of car 20.

Figure 5A:
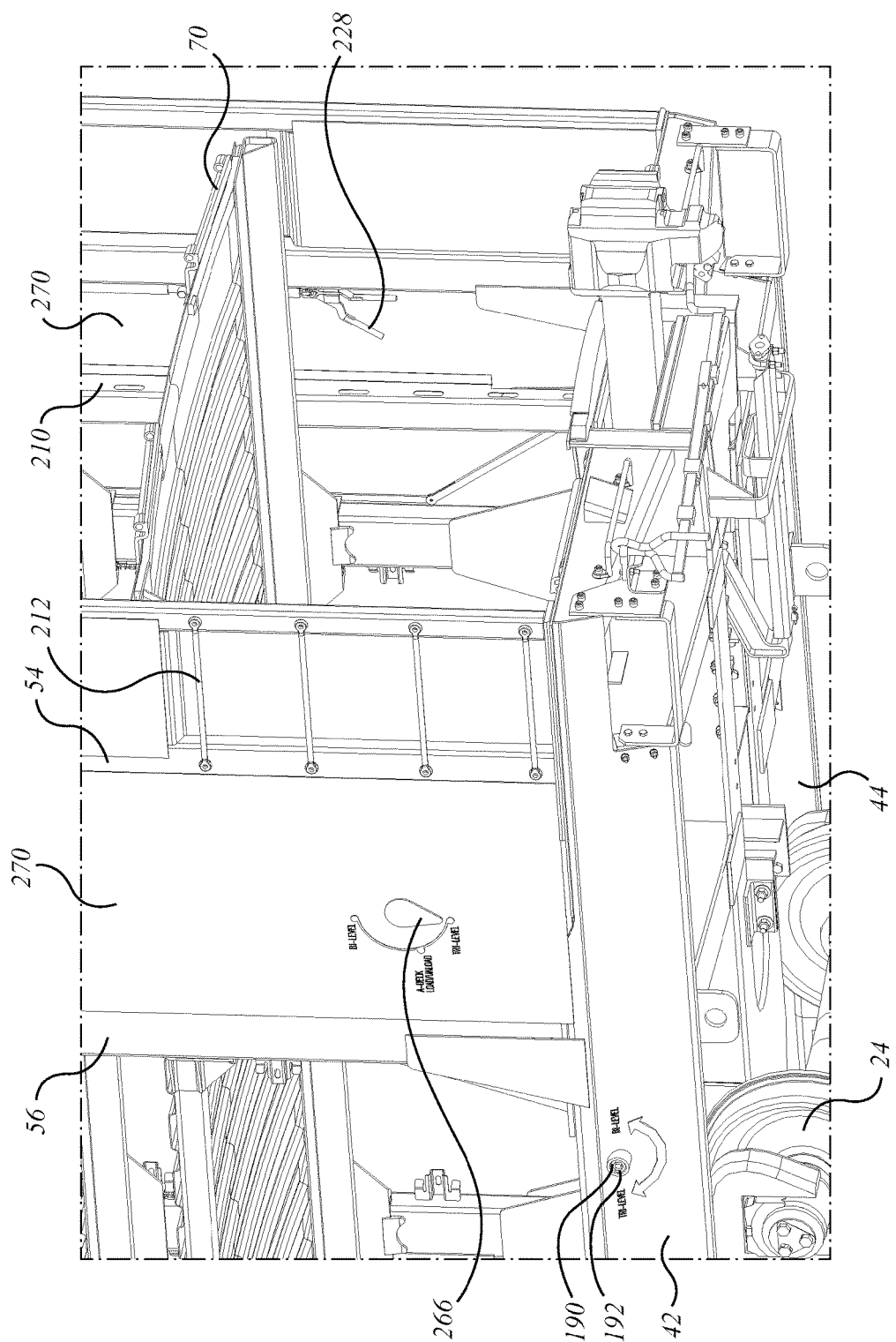
Figure 5B:
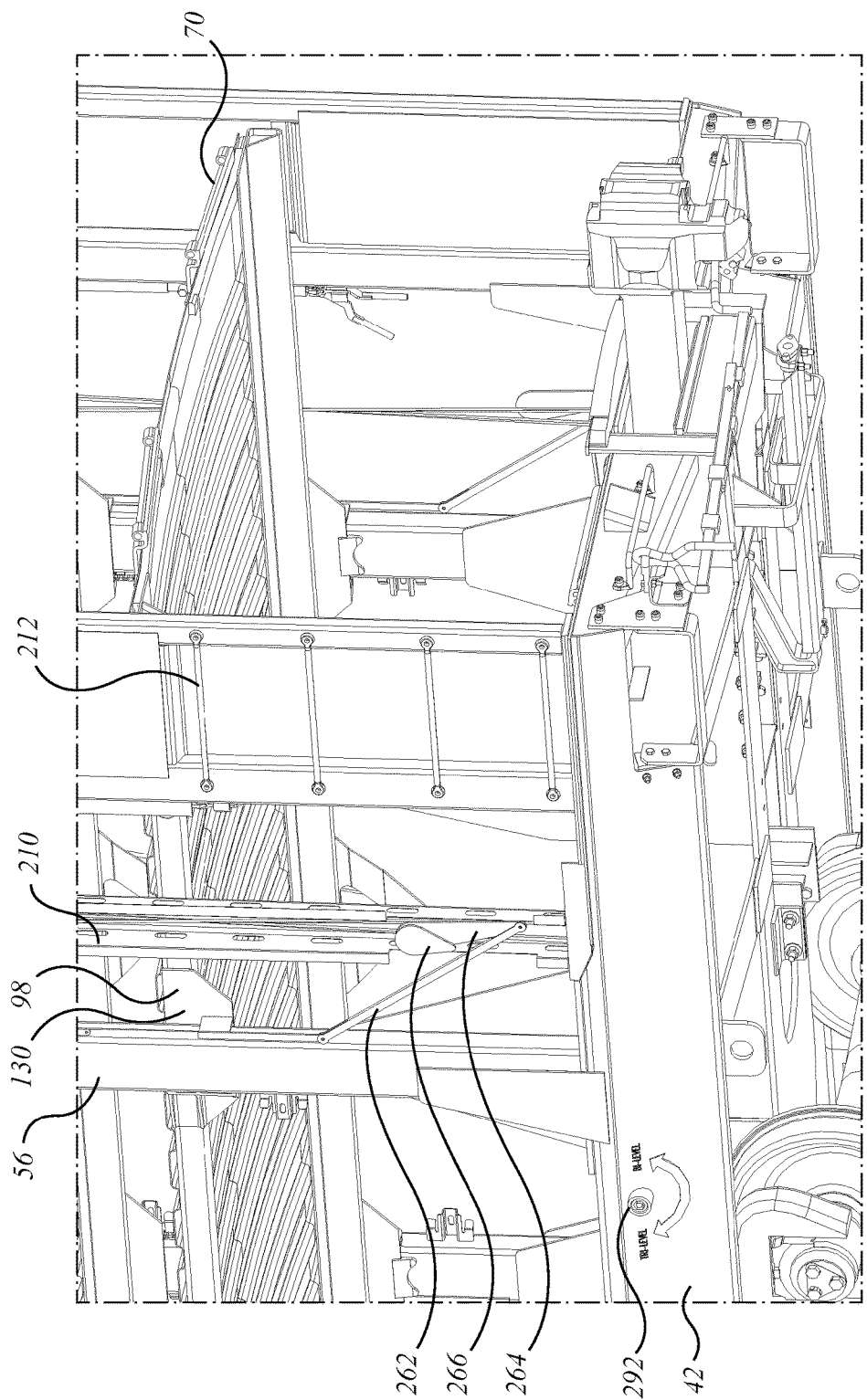
FIG. 5b shows a view of the deck level indicator of FIG. 5a with the cover panel removed to reveal internal details.
Figure 5C:
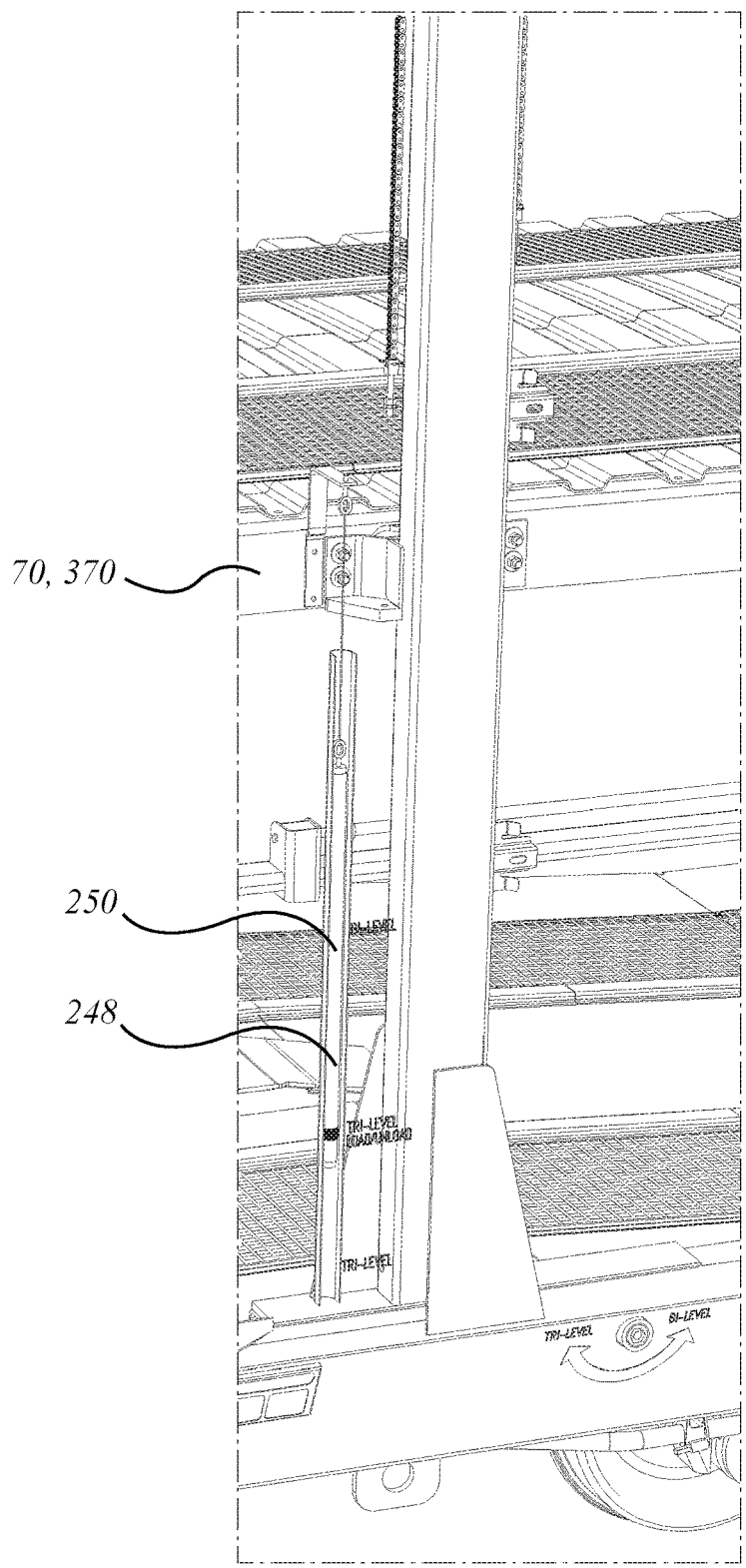
FIG. 5c shows the deck status indicator of FIG. 5b in tri-level low deck loading position, with side panel removed to show internal details.
Figure 5D:
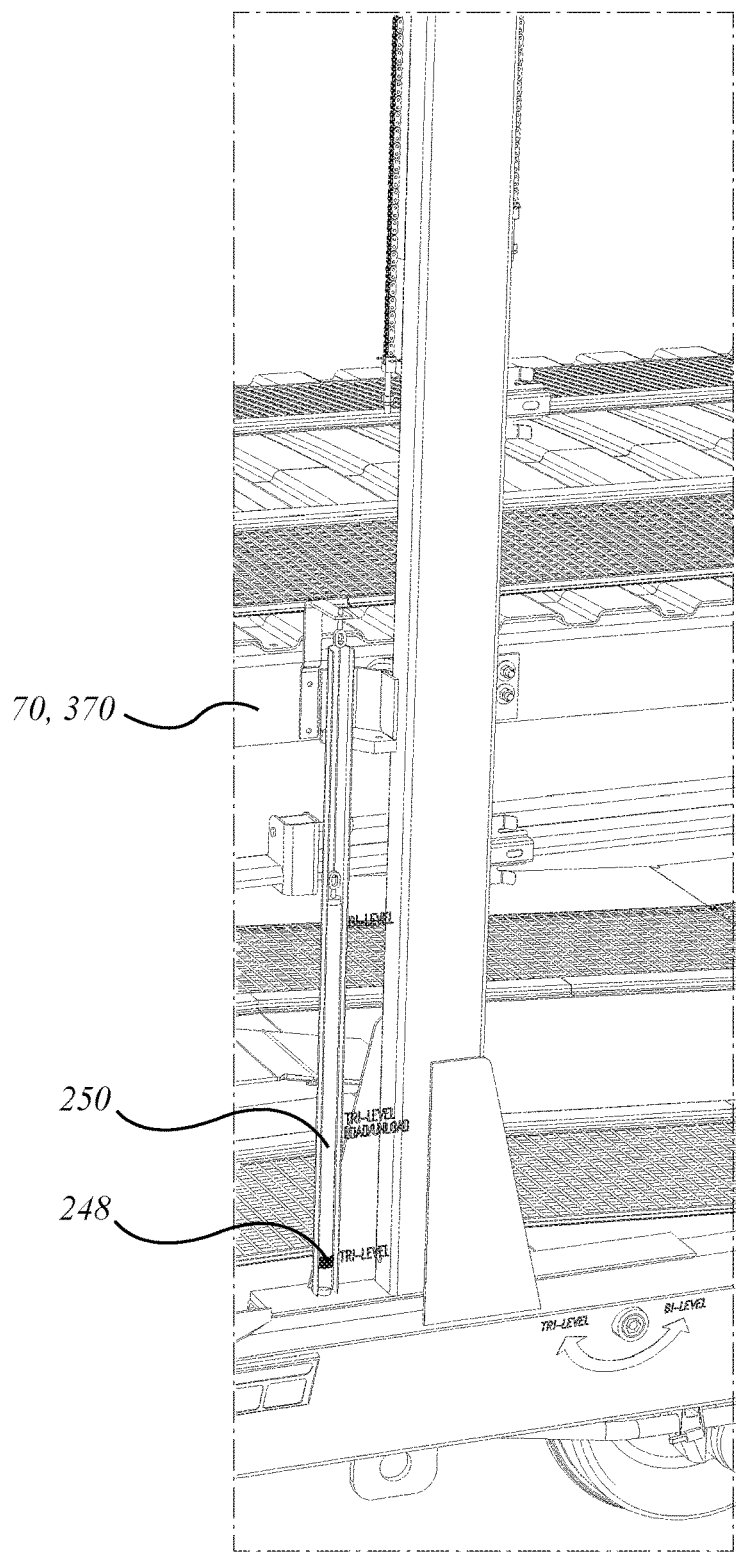
FIG. 5d shows the status indicator of FIG. 5c in tri-level position.

Car 20 may also have a deck position indicator, identified generally as 250. There may also be a deck position indicator at each corner of the car. Deck position indicator 250 may include a hanging annunciator, or bob, 248 that depends from mid-level deck assembly 70, and that is visible to trackside personnel through high, medium, or low level apertures 252, 254, 256. FIGS. 5a and 5b show another embodiment of deck level indicator having a drag link 262 attached as a follower of assembly 98 of mid-level deck 70 on the No. 2 post 56. As deck assembly 70 rises and falls, drag link 262 turns an input crank 264. A co-axially mounted pointer 266 turns when crank 264 turns. High (i.e., bi-level), medium (i.e., loading and unloading), and low (i.e., tri-level) positions are indicated on the outside of shear panel 270. The adjacent left-side drive transmission input interface socket 192 is also seen in FIG. 5a, with corresponding markings indicating the direction of cranking for the respective tri-level and bi-level positions. Position indicator 250 is located adjacent to trackside input fitting or input interface 190, such that an operator moving the decks may also observe their position on indicator 250.

In another embodiment, there may be an autorack railroad car 320, as shown in FIGS. 6a-6b, 7a-7e, 8a-8d, 9a-9d, 10a-10g. Unless otherwise noted, car 320 may be understood to have the same features and structure as autorack car 20. It has an underframe, or underframe assembly, indicated generally as 322, that is carried upon railroad car trucks 24 for rolling motion in a longitudinal or lengthwise direction along railroad tracks. Underframe 322 is surmounted by an overspanning housing structure 326, and which may be referred to as "the rack" or "racks" of the car. The ends of housing structure 326 are open to permit loading and unloading of automotive vehicles. Ingress and egress of those vehicles is governed by a pair of end doors, 328, such as may be multiply-folding movable between open and closed positions.

Underframe 322 has a center sill 330. Center sill 330 is a "straight through" center sill that runs substantially entire length of the car between first and second ends 332, 334 at which strikers 36 are mounted. The main deck 340 extends to either side of the center sill to the sides of the car at side sills 342, 344. In a straight through center sill, the center sill extends from one truck center to the other. The outboard portions of the center sill may be identified as the draft sills 38 in which the draft gear and couplers are mounted. Draft sills 38 are extensions of center sill 30 that extend longitudinally outboard of (and often include) the truck center to the striker 36. Side sills 342, 344 run lengthwise along either side of underframe assembly 322, and are structurally connected to center sill 330 by an array of laterally extending structural members which may include cross-bearers and cross-ties (not shown). The main deck 340 may be carried at a lower level in the mid-car regions and a somewhat higher level over trucks 24, and accordingly is, as before, a depressed center deck.

Figure 5E:
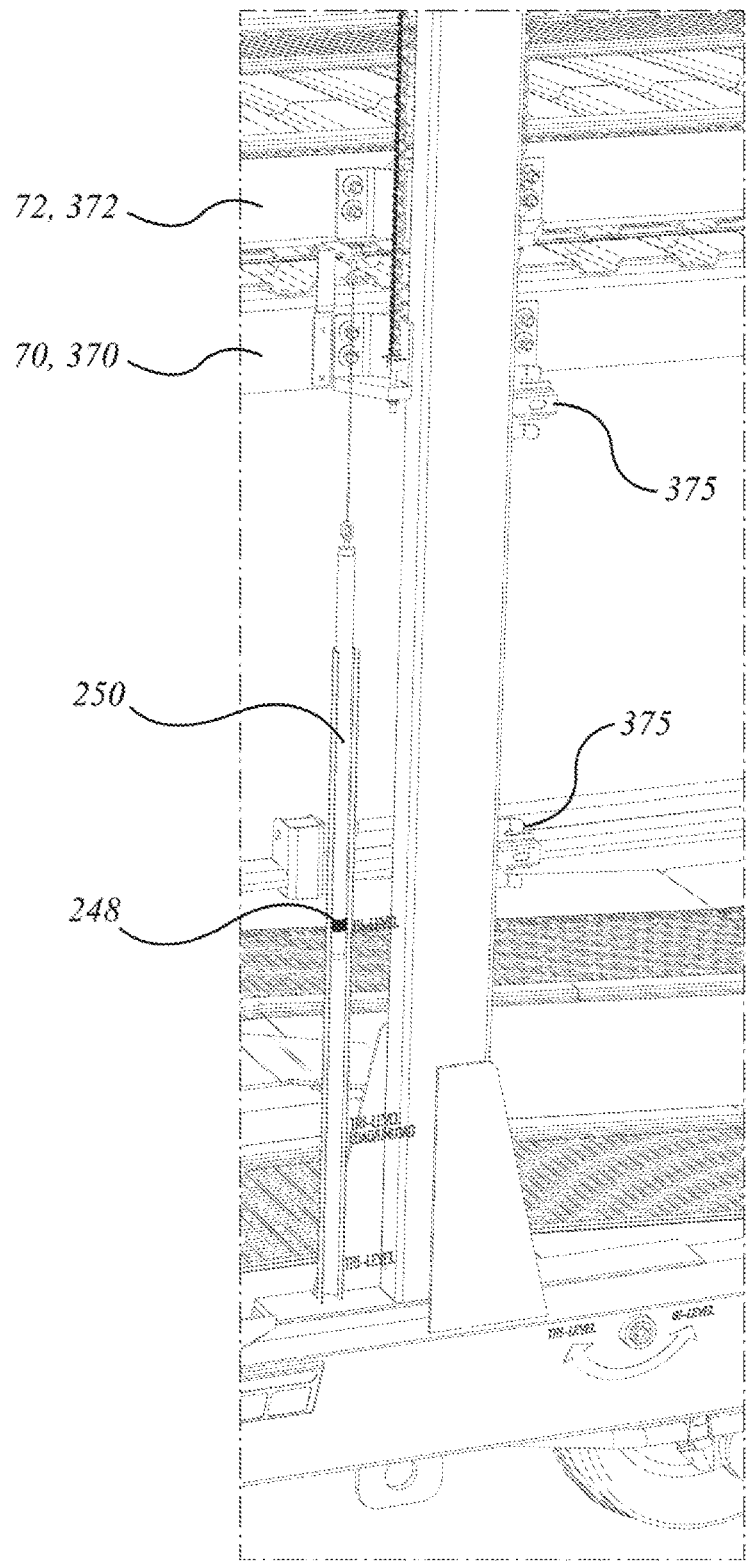
FIG. 5e shows the status indicator of FIG. 5c in the bi-level position.
Figure 6A:
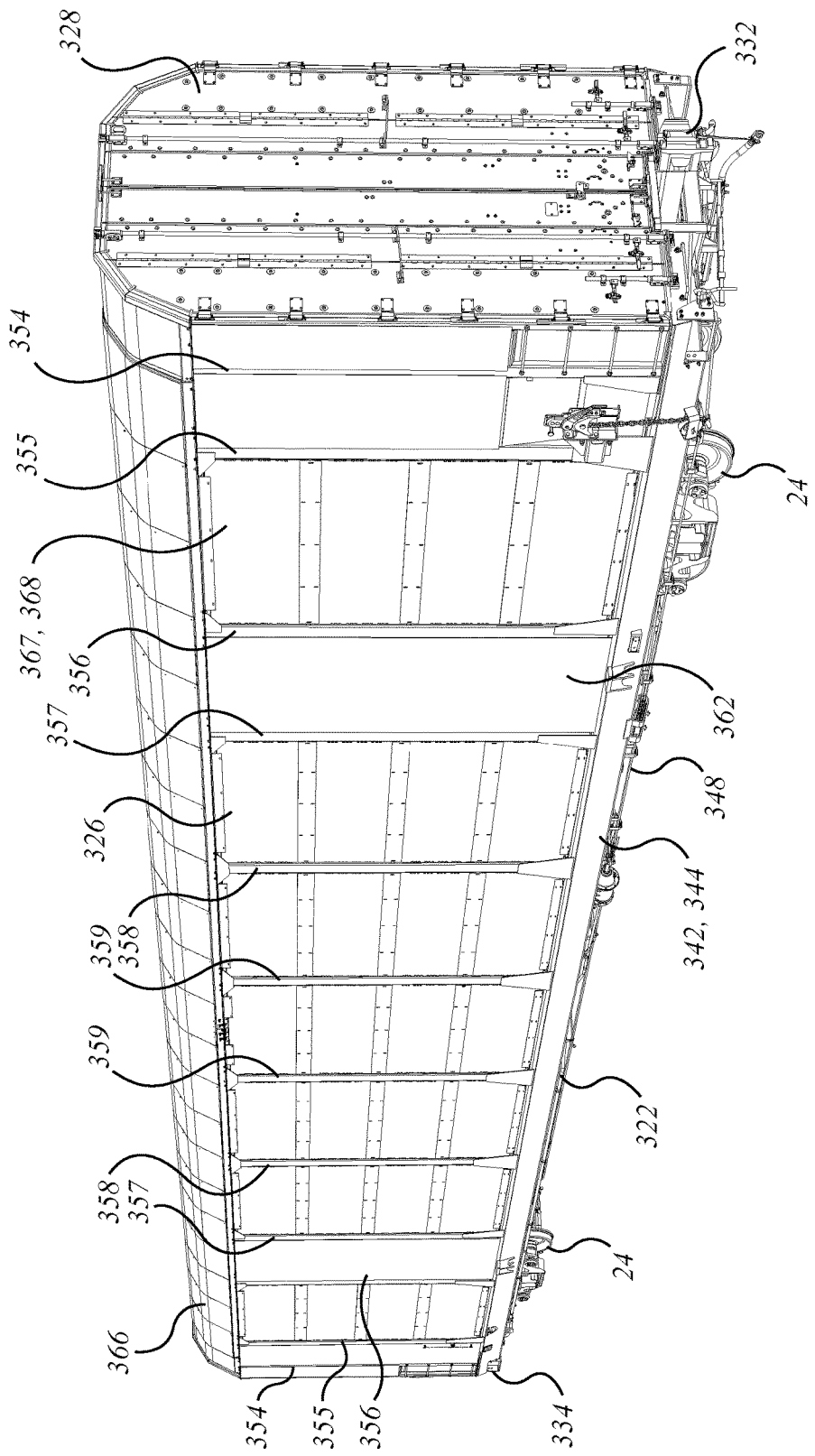
Figure 6B:
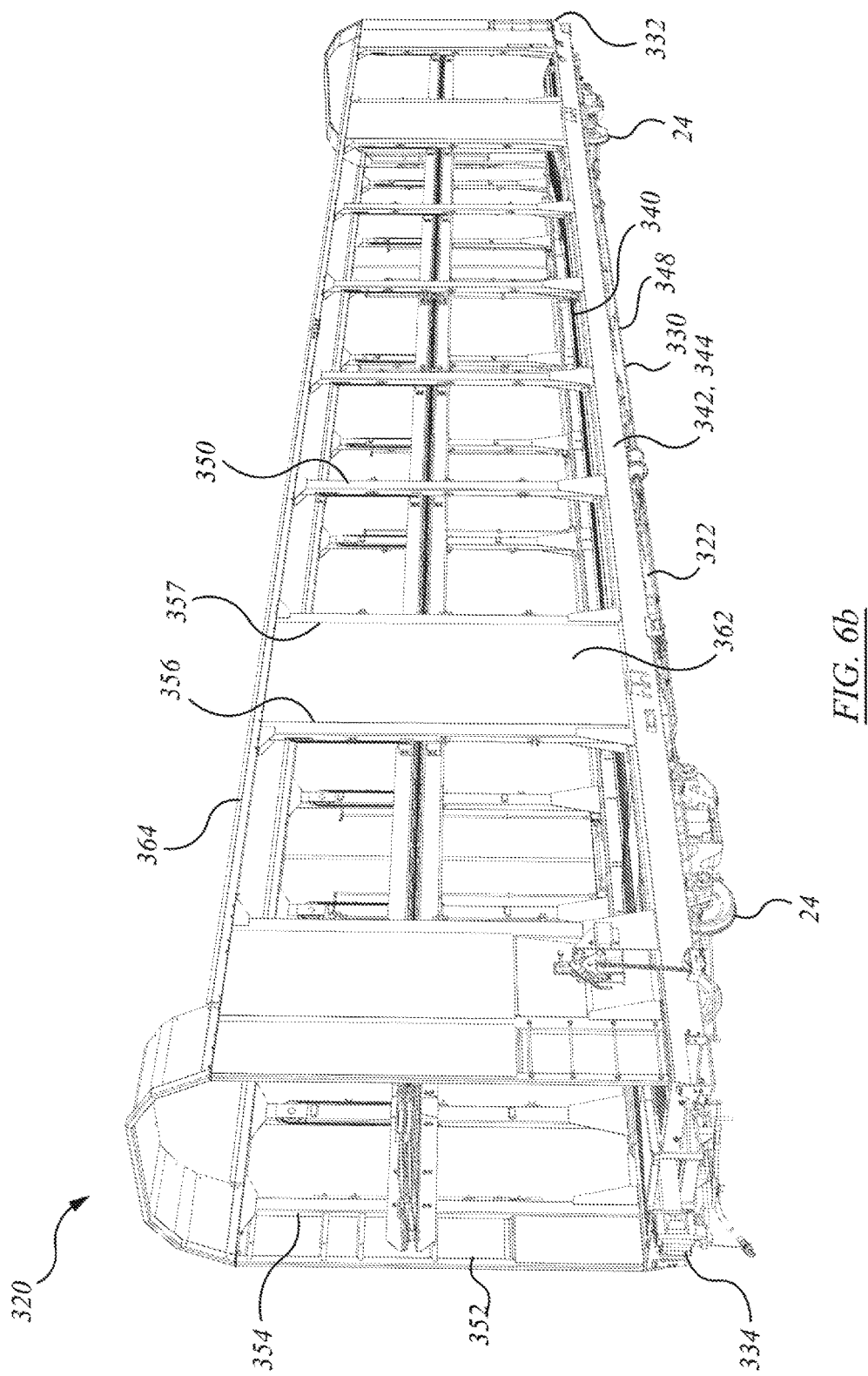
FIG. 6b is an opposite end perspective view of the autorack car of FIG. 6a with doors, side skins, and roof removed to reveal interior structure.

The framework of, or that is defined by, housing structure 326 includes an array, or a series, of upstanding posts 350, that are spaced along the left and right hand sides of the car, that is, along, and standing upwardly of, side sills 342 and 344 respectively. There is an end framing structure, indicated as 352, that extends upwardly from the ends of the end sill, and which defines the shape of the gable end. Next inboard is "the first post" or "No. 1 post", an upright side post 354 that runs between the side sill and the top chord at the station of the first lateral underframe cross-members. Next inboard are posts 355, (the "No. 2 post") mounted at the ends of the next adjacent lateral frame (i.e., next outboard of the truck center), and posts 356, mounted near the ends of the second lateral frame member inboard of the truck center. Several further posts 357, 358, 359 are mounted further inboard at the ends of the respective cross-bearers that extend laterally of center sill 330. The diagonal shear bracing 61, 62 of car 20 is replaced by shear panels 362 between posts 356 and 357. As before, longitudinally running left and right top chords 364 run along, and tie together, the tops of all of posts 354, 356, 357, 358 and 359, as may be. Roof structure 366 is mounted atop top chords 364 and restrains them in the lateral direction, and provides a lateral shear connection between the left and right hand side walls 367, 368 of the car. The roof structure may be taken as being the same as above. The post array supports elevated decks, namely second, or mid-level, deck 370, and a third or upper deck 372. The entire structure includes sidewall panels 374 that are mounted between the various posts, and that may act as screens or shields protecting the lading, yet allowing ventilation. Sidewall panels 374 are mounted on cleats 375 attached to the various posts (FIG. 5e).

The rack structure of the elevated deck or decks includes a set of deck panels, or deck panel assemblies, of which a representative one is indicated as deck panel assembly 380. Other than as noted, assembly 380 may be understood to be the same as deck panel assembly 80 described above, and is symmetrical about the longitudinal vertical (i.e., x-z) centerline plane of the rack, and spans the open space between the left and right hand sidewall support structure of car 320.

Other than the differences described, main decking panel 382 may be understood to be substantially the same as decking panel 82 described above, and may include a central portion 104 and left and right hand edge or margin portions 106, 108. Main decking panel 382 may have an upper surface 112 which defines a roadway, or pathway, or track 114 over which wheeled vehicles may be conducted in the lengthwise direction (or x-direction) in the normal procedure of loading and unloading vehicles in autorack cars. Main decking panel 382 may also have an underside, or downwardly facing surface 116 that faces toward the next lower deck, be it the middle deck (in the case of an upper decking panel) or the railroad car main deck 40 of underframe 322. As installed, main decking panel 382 is spaced upwardly from the next lower deck by a distance commensurate with the carrying of another layer of vehicles on the deck therebelow. Main decking panel 382 may have an undulating form, as described above. The undulations run in the direction generally cross-wise to the lengthwise running direction of main decking panel 382 generally, and also of pathway 114. The undulations may have the form of corrugations 118.

Central portion 104 may be formed as a single section, or may be formed by welding two left and right halves together. In that context, the left and right halves may be identical, but reversed and welded together along a central seam. Central portion 104 may be formed on a curvature such that it has an arcuate crown 120, of which the crest is at, and runs along, the longitudinally running centerline. The downwardly and outwardly sloped margins or edges of central portion 104 meet, and are joined to, left and right hand margin portions 106, 108. The junction of these components may be formed by welding. Margin portions 106 and 108 are oriented horizontally. That is, if decking panel 82 is placed on a flat surface, margin portions 106 and 108 will lie in a common horizontal plane, which central portion 104 deviates convexly arcuately away from that plane.

Side beams, or rails, 384, 386 run in the lengthwise direction along margins 106, 108. Each side beam 384, 386 has a first leg 376 that extends substantially horizontally, and a second leg 378 that extends substantially vertically. Side beams 384 and 386 may have the form of large angles, rather than the roll-formed hollow section of side beams 84 and 86, above. In this way first leg 376 functions as a horizontal flange, and second leg 378 functions as a vertical shear web. First leg 376 overlaps, and is welded to, a respective one of margins 106 or 108. In the case of mid-level deck 370, first leg 376 of beam 384 or 386 is mounted to the underside of margin 106 or 108. In the case of upper level deck 372, first leg 376 (and beam 384 or 386 more generally) is again mounted to the underside of margin 106 or 108 as the case may be, i.e., so that in both cases the deck sheet is carried on top of the supporting flange. The corrugations of margins 106, 108 extend upwardly away from first leg 376. In this embodiment, the vertical leg 378 is substantially longer than leg 124 described above, and corresponds to the vertical depth of plate 410 of chassis 402 of mounting brackets 398. In one embodiment the depth of vertical leg 378 is greater than the crown depth of the decking of deck assemblies 370 or 372. That is, in the case of upper deck 372, when the deck is horizontal, the upper tip of leg 378 is higher than the crest of the central crown of deck 372. That is, the vertical depth of leg 378 is equal to or greater than the vertical extent of the mounting footprint of mounting plate 410 of chassis 402. The horizontal extent of leg 376 is also substantial, being substantially the same as the vertical extent of leg 378 (+/−25%). The ends of margins 106, 108 terminate inboard of second leg 378. Triangular reinforcement gussets 388 are mounted to legs 376 and 378, generally in line with mounting brackets 398, between the groups of mounting hardware.

Figure 10A:
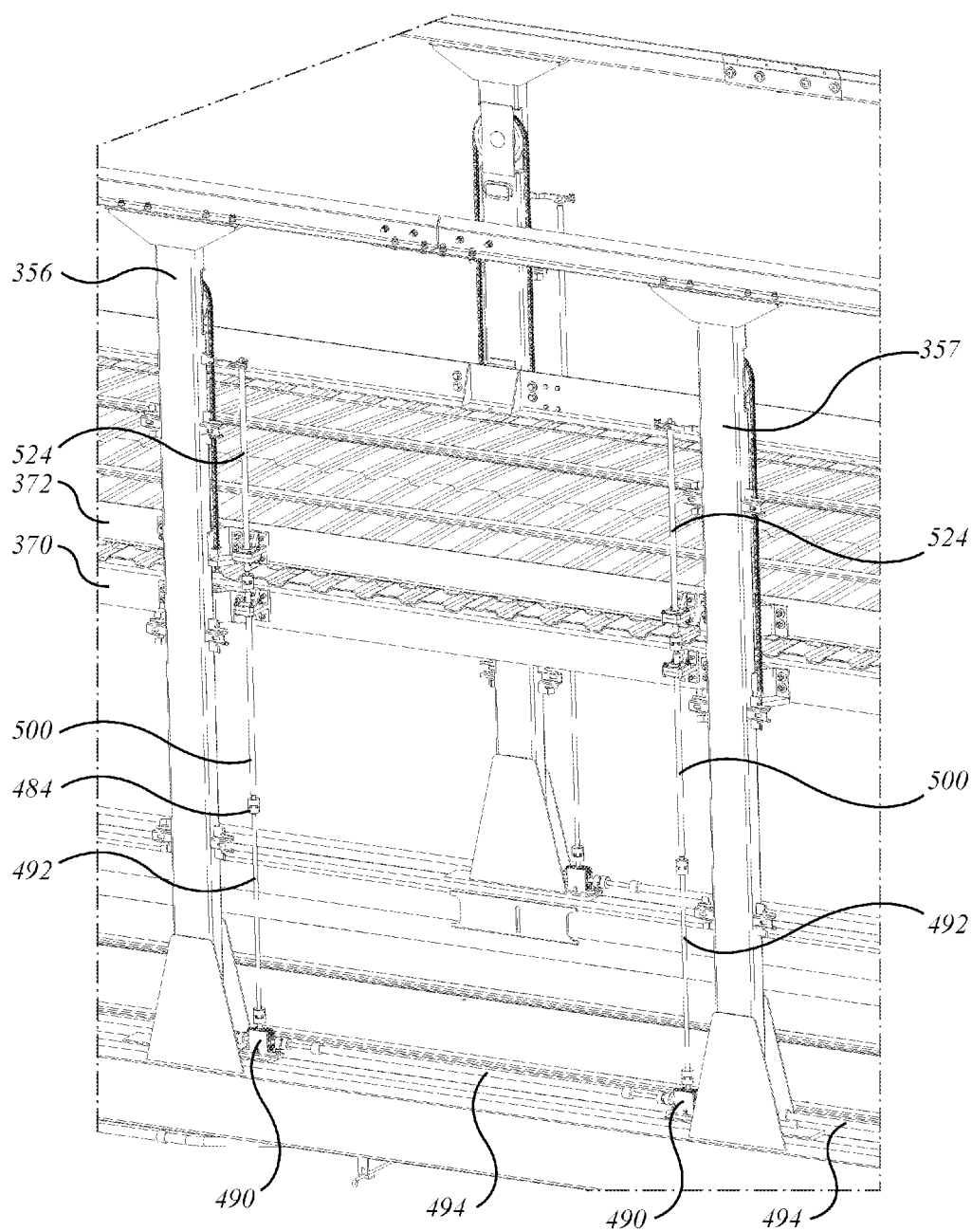
FIG. 10a is a perspective view through the autorack car of FIG. 6a, with side screens removed, to show the drive transmission arrangement.
Figure 10B:
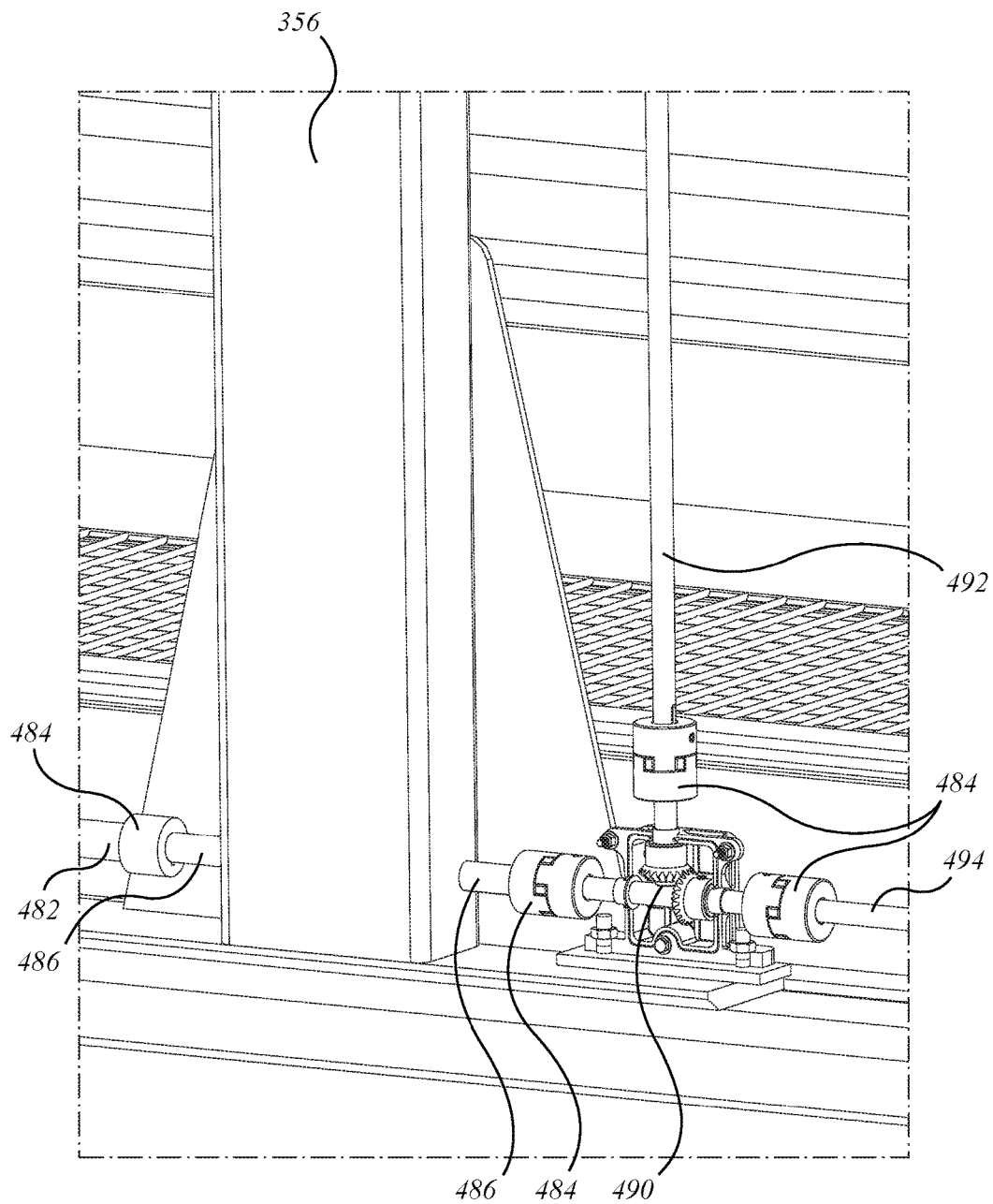
Figure 10C:
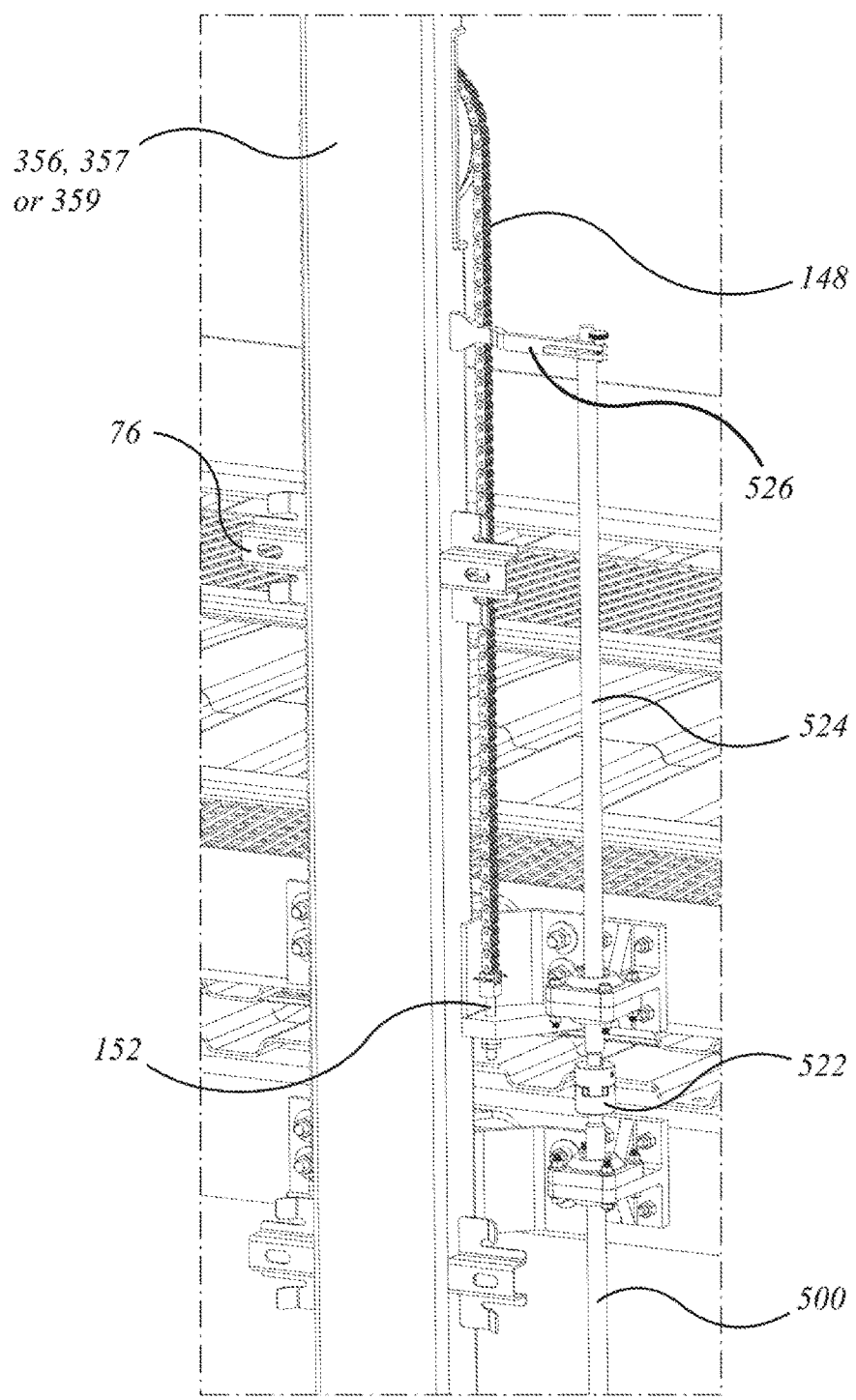
Figure 10D:
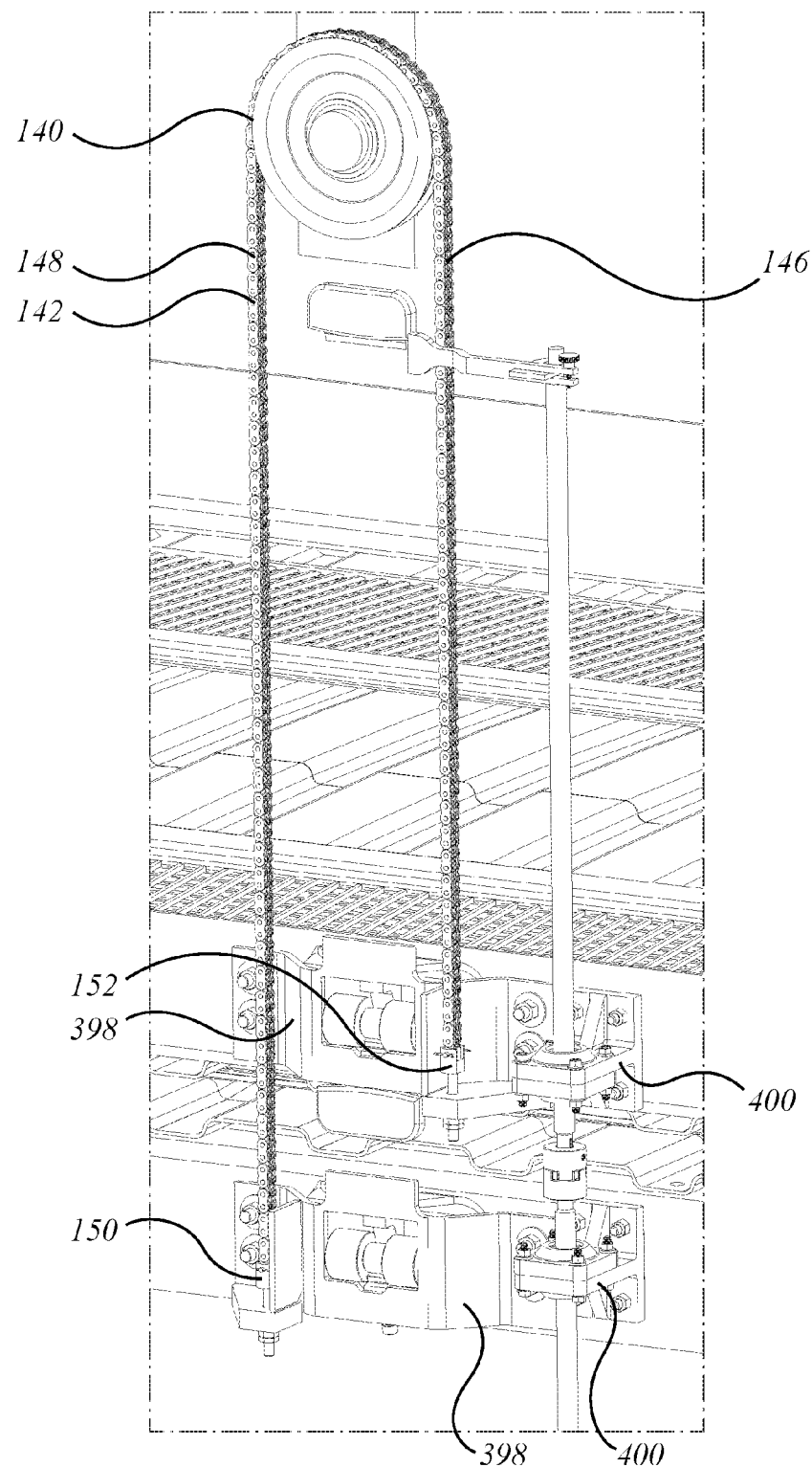
FIG. 10d shows the same detail as FIG. 10c, but with the side post removed to reveal hidden detail.
Figure 10E:
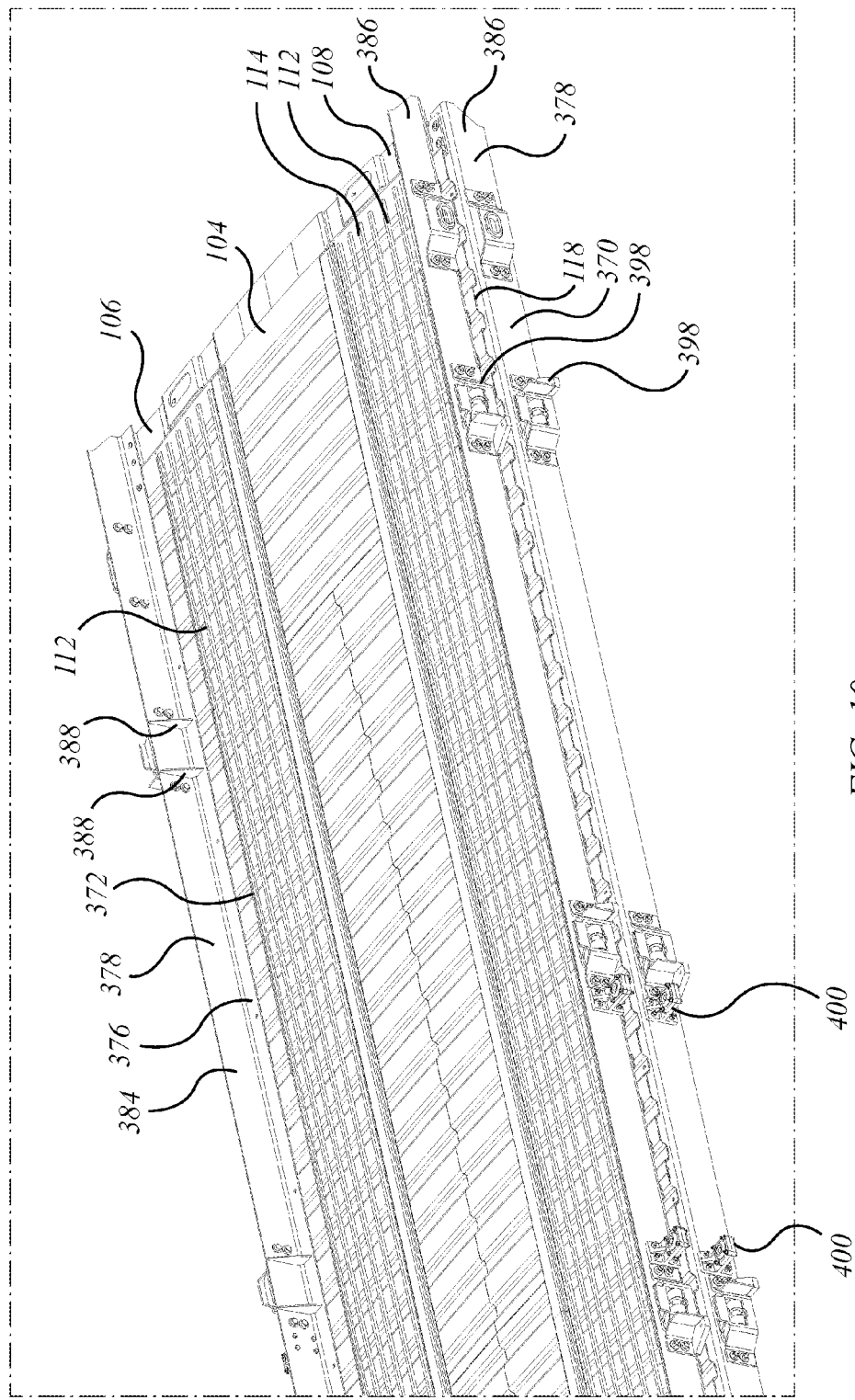
FIG. 10e is a general arrangement view of the decks of the autorack railroad car of FIG. 6a showing the relative location of carriage elements thereof.
Figure 10F:
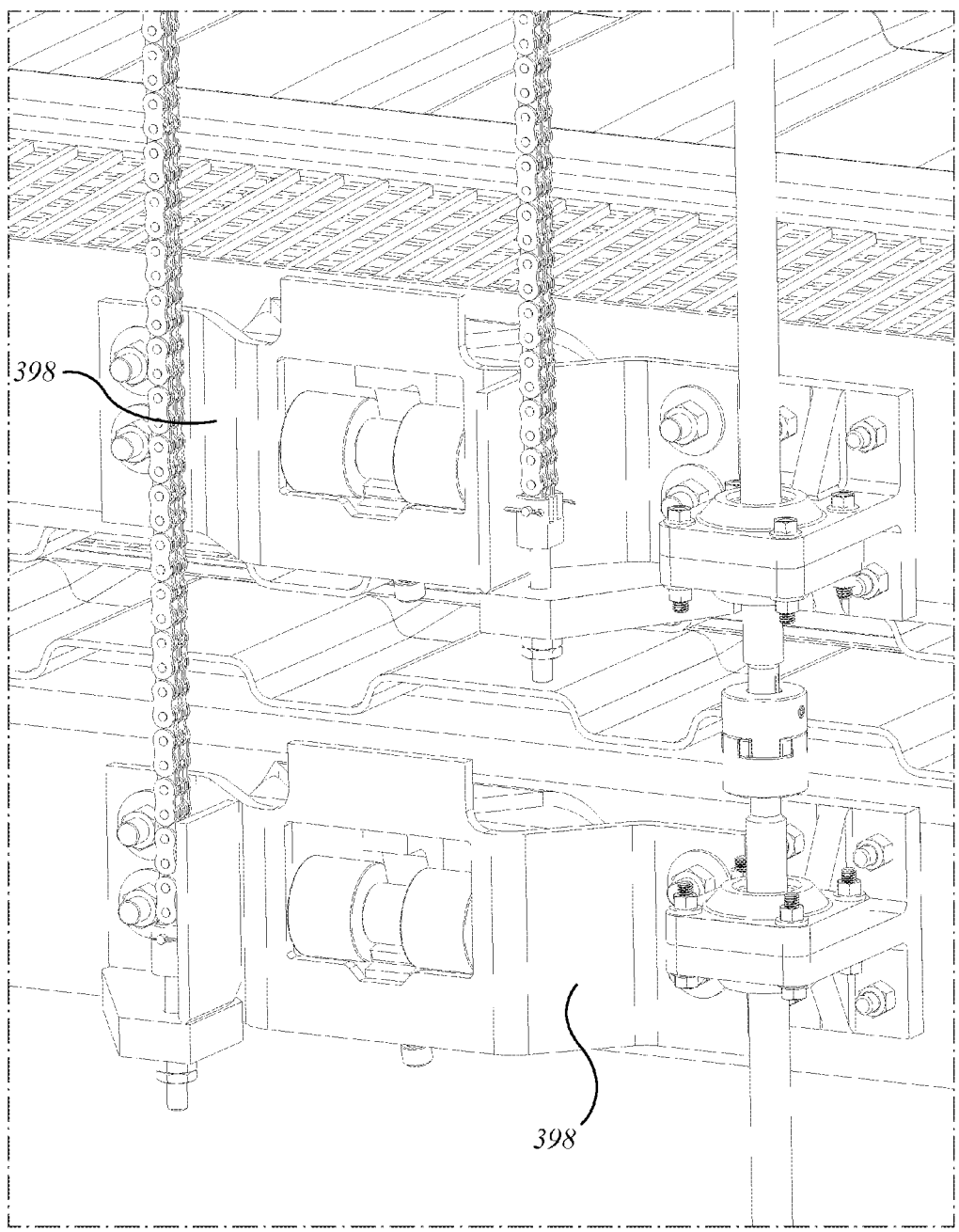
FIG. 10f is an enlarged detail of the carriage elements of FIG. 10e.
Figure 10G:
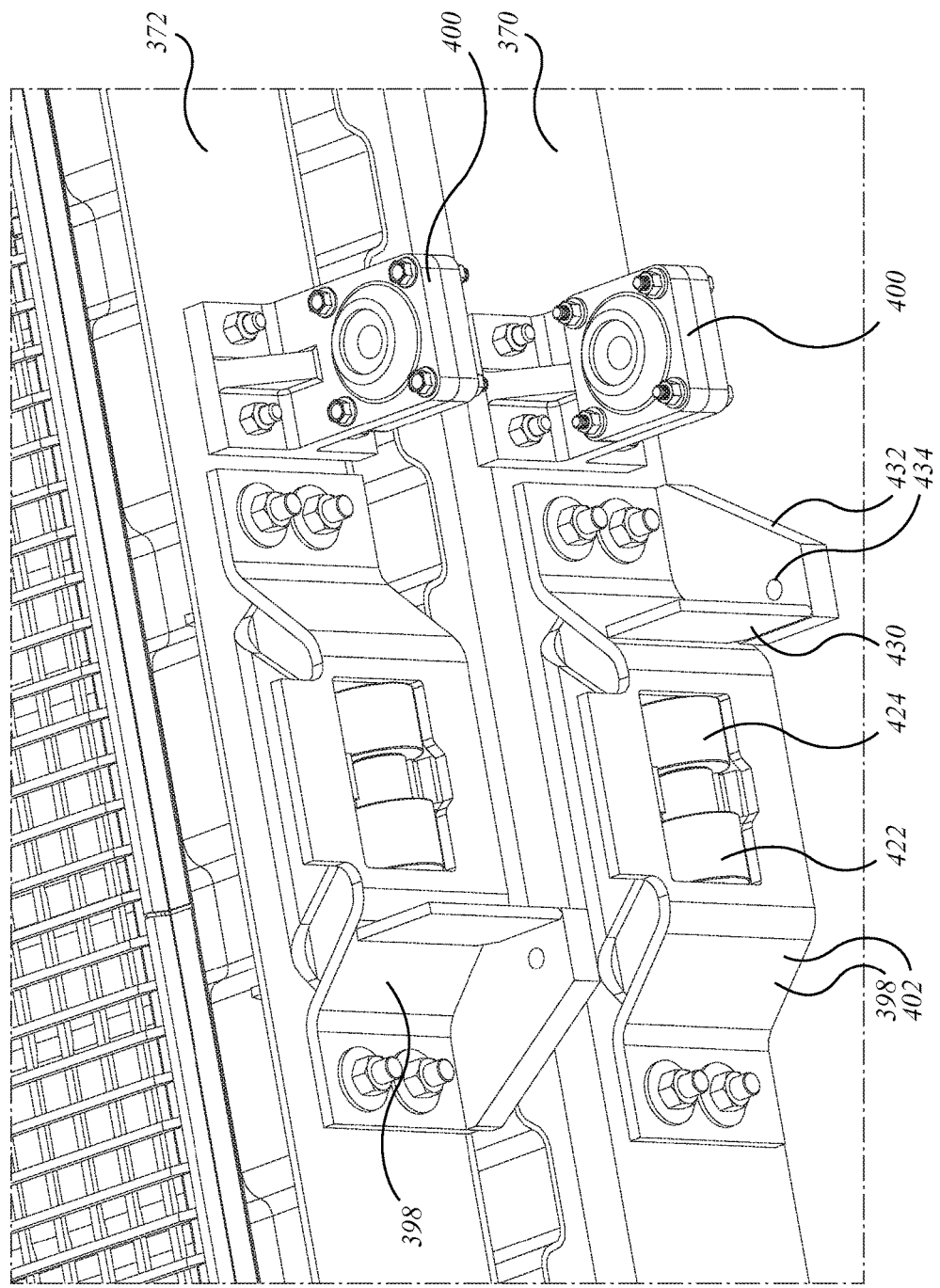
FIG. 10g is an enlarged detail of the carriage elements of FIG. 10e from another perspective and with the counterbalance chain and threaded rods removed.

Movable mounting bracket assemblies 398 are seen in FIG. 10e. They are mounted by threaded fasteners to the outboard faces of the longitudinal side beams 384, 386 of deck assemblies 370 and 372. They are mounted beside respective associated deck drive output fitting assemblies 400, in six instances along each side of each deck 370, 372, described below. Mounting bracket assemblies 398 may also be termed carriages, or shoes, that are formed to mate with their respective mounting posts 354 to 359 in a movable engagement relationship having a single degree of freedom, namely vertical translation, and thereby co-operably defining a motion restraint or motion governor. Mounting bracket assemblies 398 define the mounting interfaces at which deck panel assembly 380 (of deck assembly 370 or 372, as may be) is connected to side post array 350, and thus by which they are suspended in an overhead spanning position relative to any lower deck or decks.

Figure 11A:
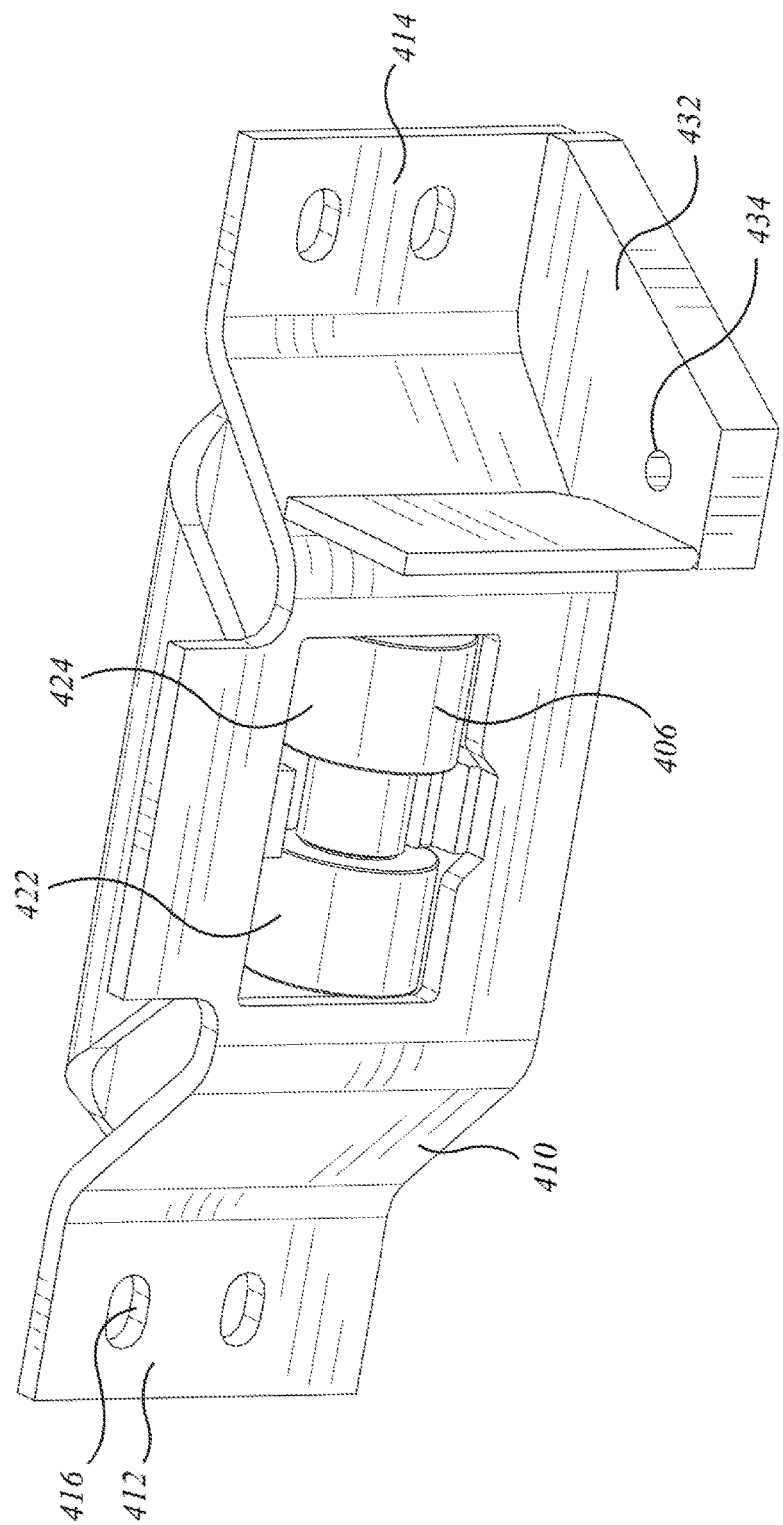
FIG. 11a is a view of a roller assembly of the carriage elements of FIG. 10f.
Figure 11B:
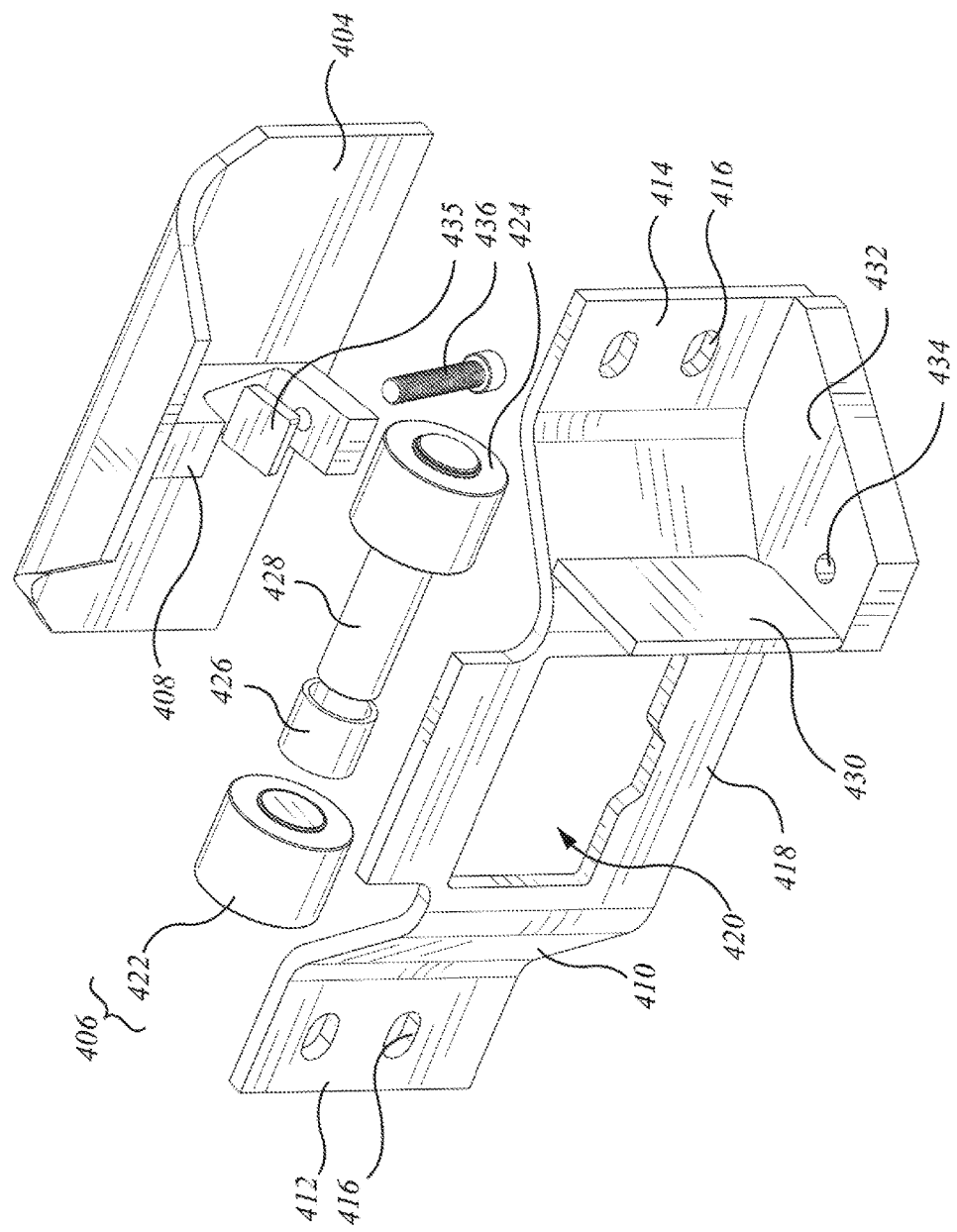

The assembled arrangement of mounting bracket assembly 398 is seen in larger detail in FIGS. 10c and 10d, and in the assembled and exploded component views of FIGS. 11a and 11b, mounting bracket assemblies 398 may include fittings such as a first or main member, or frame, or plate, or base or shell, or chassis 402; a second member such as may be a back shell, or enclosure, or opposed member or opposed wall, or closing member, or housing back plate 404 such as is mated thereto to define a box or chamber in which to accommodate, or house, a roller fitting 406, and a roller adjustment fitting or bracket 408. As seen in FIGS. 11a and 11b, the main plate or chassis 402 may have the form of a formed plate 410 having a generally V-shaped profile when viewed from above, the ends or toes of the V, 412, 414 being flat and co-planar and having apertures 416 for mechanical fasteners. Central portion 418, being the flattened bottom of the V, has a large generally rectangular aperture or accommodation 420 formed therein. Aperture 420 provides a port through which the rolling contact elements, or rollers 422, 424 protrude. Rollers 422, 424 are carried on bushings 426 mounted on opposite ends of a common shaft 428. Roller shaft 428 is captured within adjustment bracket 408 mounted centrally on the inside of housing 404, with an adjustable screw 436 and contact tab 435 that bears against shaft 428. Housing back plate 404 has a main back portion that is flat and that, on assembly (i.e., by welding along the side edges), mounts in a generally co-planar manner with wings or toes 412, 414. The upper portion of housing back plate 404 is bent or curled forwardly, with side edges trimmed on a taper, such that the topmost forward edge picks up on, and is welded to, the back of the central tab of the main chassis. When deck 370 or 372 is installed, screw 436 is adjusted to urge rollers 422,424 into a no-slack softly touching fit against the respective posts. That is, the rollers are in a "constant contact" relationship with the posts. Rollers 422, 424 may be UHMW polymers that have a soft (i.e., non-metallic, non-rattling) mating surface. The rollers can be adjusted to minimize lateral slack as between the left and right hand sides of the car. The various posts may likewise be provided by with a friction reducing coating or low-friction surface or treatment, such an UHMW polymer, such as a Nylon™ surface or skin coating.

On one side or the other (there being left and right hand versions) a lateral restraint guide 430 is welded to one wing or the other of the assembly (there being left handed and right handed versions for use on alternate posts). Lateral restraint guide 430 may have the form of a flat plate welded square to the face of the central portion of the V, thereby defining an abutment face that, as installed, inhibits motion of carriage assembly 398 transverse to the post in the longitudinal direction of the car. The flat plate is backed up by a plate 432. To the extent that a left handed version is mounted to one post, and a right hand version is mounted to the next adjacent post, the deck assembly, be it 370 or 372, is inhibited from motion in either direction longitudinally. That is, as above, each deck has two such guides spaced to seat about the inside face and walls of such pair of the respective posts as may be, yielding a pair of guides restricting motion in the degree of freedom of the +x and −x directions. Since the width of the deck assembly is bracketed laterally by posts on either side of the car, motion in the horizontal degree of freedom in the +y and −y-directions is also constrained, leaving deck assemblies 370 and 372 with only a single translational degree of freedom, namely in the z-direction. In any event, the side posts 355-359 then each function as a guide, or track, or path, or rail, and the carriages each function as followers.

Plate 432 has a mounting fitting, such as a hole 434, for engagement or attachment, to one end of the counterbalance chain 148 of counterbalance transmission 140, as described above. This fitting defines a motion attachment interface, and carries the vertical load of the deck section, and, accordingly, plate 432 may be of substantial robustness. As above, decks 370, 372 may have a counterbalance transmission, indicated above as generally as 140. The description provided above applies equally to car 320.

Car 320 may also be provided with a second transmission 450, such as may be in the nature of a deck drive train, or drive transmission, indicated generally as 460. Drive transmission 460 is an active, or positively driven, transmission. However, rather than employing the scissor jack, or scissor jacks, 162 as above, car 320 employs a system of torque shafts such as may be mounted along the sides of car 20.

Figure 9B:
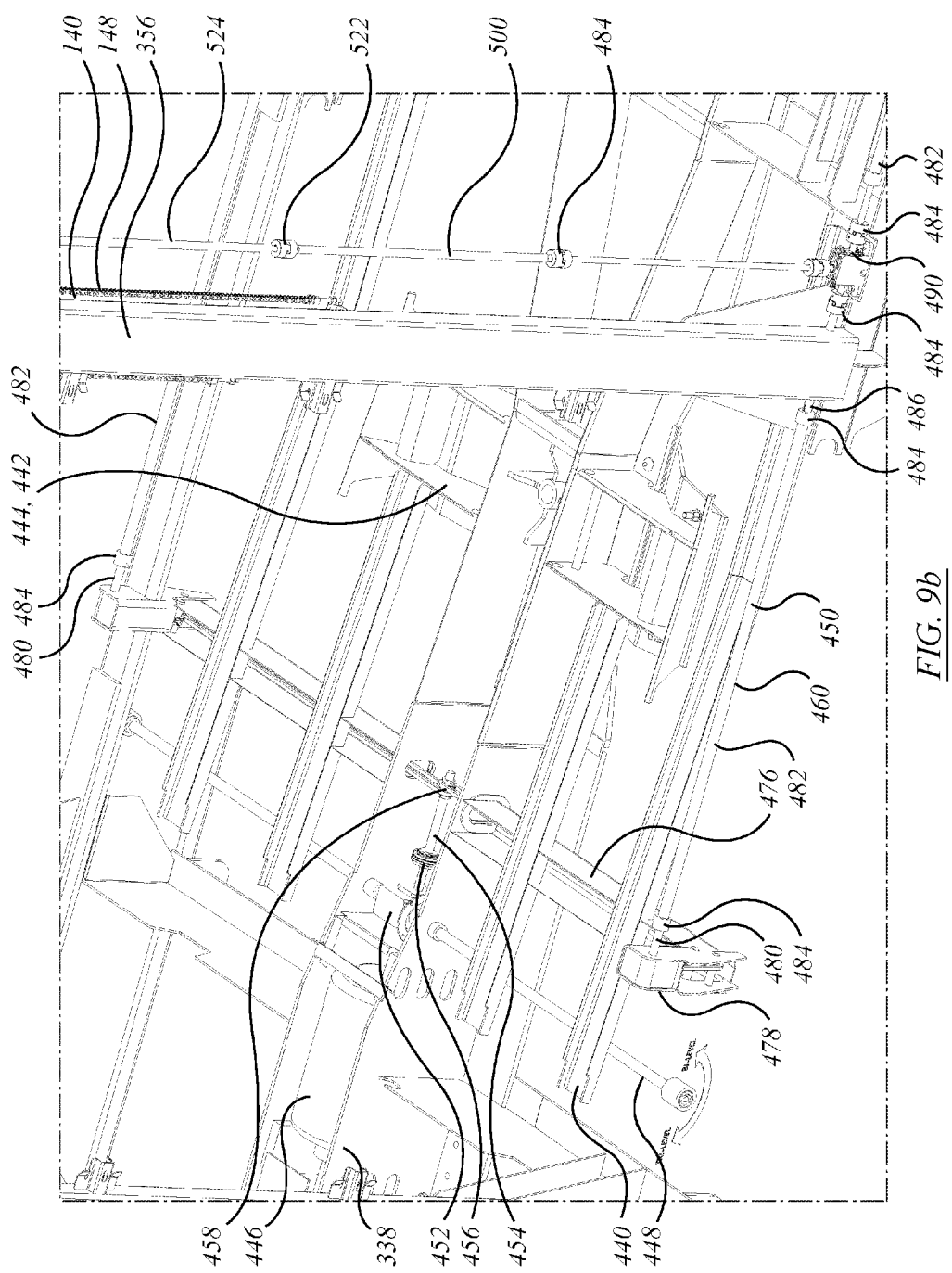
FIG. 9b shows an enlarged detail of the autorack railroad car of FIG. 9a with decking removed to reveal details of underfloor structure and deck drive transmission features.
Figure 9C:
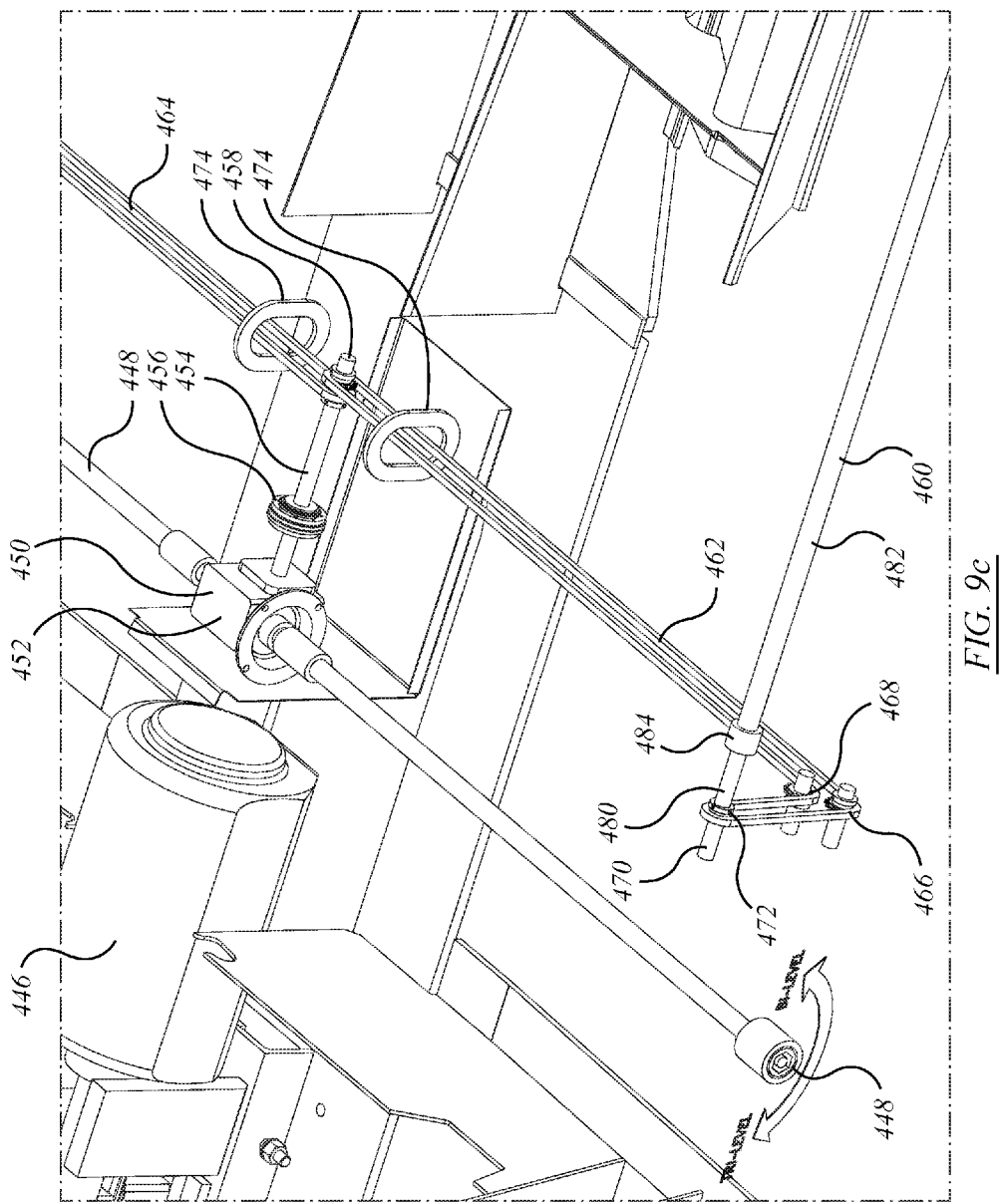
FIG. 9c is a further enlarged detail view as FIG. 9b, but with longitudinal floor stringers, draft sill webs, and transmission housing members removed to reveal the moving parts of the transmission.

FIGS. 9b and 9c show the transition region of the underframe of car 320 with the near side sill, and sloped deck plates removed to reveal the longitudinal stingers 440. The cover plate of the center sill is also removed to reveal the main bolster webs 442 and the truck center fitting 444 at the right center. The draft sill top cover plate is removed also to reveal the long-travel cushioning draft gear 446. As before, there is, or are, track level accessible input drive shafts 448, either of which can be driven. The input shafts run to a gearbox 452 which is mounted between the draft sill webs, inboard of the draft gear and outboard of the truck center. A torque limiting clutch, or torque limiter, 456, is mounted between gearbox 452 and output shaft 454. The gearbox output shaft 454 extends along the draft sill toward the truck center to an output drive splitter 458, in the nature of two sets of pinions for driving left hand and right hand output drive chains 462, 464. The drive chains are carried laterally outboard to the side sills where they pass over lead and return idler sprockets 466, 468, and pass over an output pinion 472 mounted to a longitudinally extending outputs shaft, or torque tube 470. Clearly, the terms "lead" and "return" are arbitrary, given that the chain can run in either direction. The lateral run chain drive run from the center sill to the side sill is carried though grommetted penetrations 474 (only the grommet being shown in FIG. 9c) through the center sill webs 438, and within a housing, or chase, or raceway, or channel-shaped conduit 476 out to the side sills. One of the other of idlers 466, 468 is adjustable to maintain appropriate tension, or appropriate slack, in chains 462, 464. It is arbitrary which idler is adjustable.

Output shaft 470 is carried above the side sill, inside of the screens 374 and shear panels 362. Output shaft 470 is multi-segmented. It has a stub shaft 480 to which output pinion 472 is directly mounted. Stub shaft 480 is mounted in a sheet-metal dog-house 478, or dog-leg, formed at the outboard end of conduit 476. Stub shaft 480 is connected to an intermediate shaft 482 through a releasable universal coupling 484. Another such coupling 484 is found at the far end of intermediate shaft 482, and is the means by which shaft 482 is connected to a further stub shaft 486 that passes through the next post 356. On the far side of post 356 is a drive-splitting set of bevel gears 490 (FIG. 10b), with an output riser torque shaft 492, and a straight-through main shaft 494 that carries on to the next post, 357. In each case, the successive elements are connected though a releasable coupling 484. At the next post, the riser shaft 492 is on the near side of the post, such that symmetry is maintained. The drive is thus carried through the successive posts down the length of the car. Further paired drives are found in the centermost spacing between paired centermost posts 359. Accordingly there are three pairs of double vertical shaft drives (i.e., six torque shaft off-takes) on each side of the car, for a total of six sets, or twelve driven shafts. A different number could be employed, and they need not be symmetrically arranged. However, it is nonetheless convenient that they be symmetrical such that forces may tend to be balanced and evenly distributed.

The riser shaft terminates at yet another releasable coupling 484, where it connects with a threaded rod 500. It is arbitrary whether this rod is a left hand thread or a right hand thread. As noted above, a deck drive output fitting 400 is mounted to the outside face of intermediate deck 370. Threaded rod 500 passes through, and engages, deck drive output fitting 400.

Figure 12A:
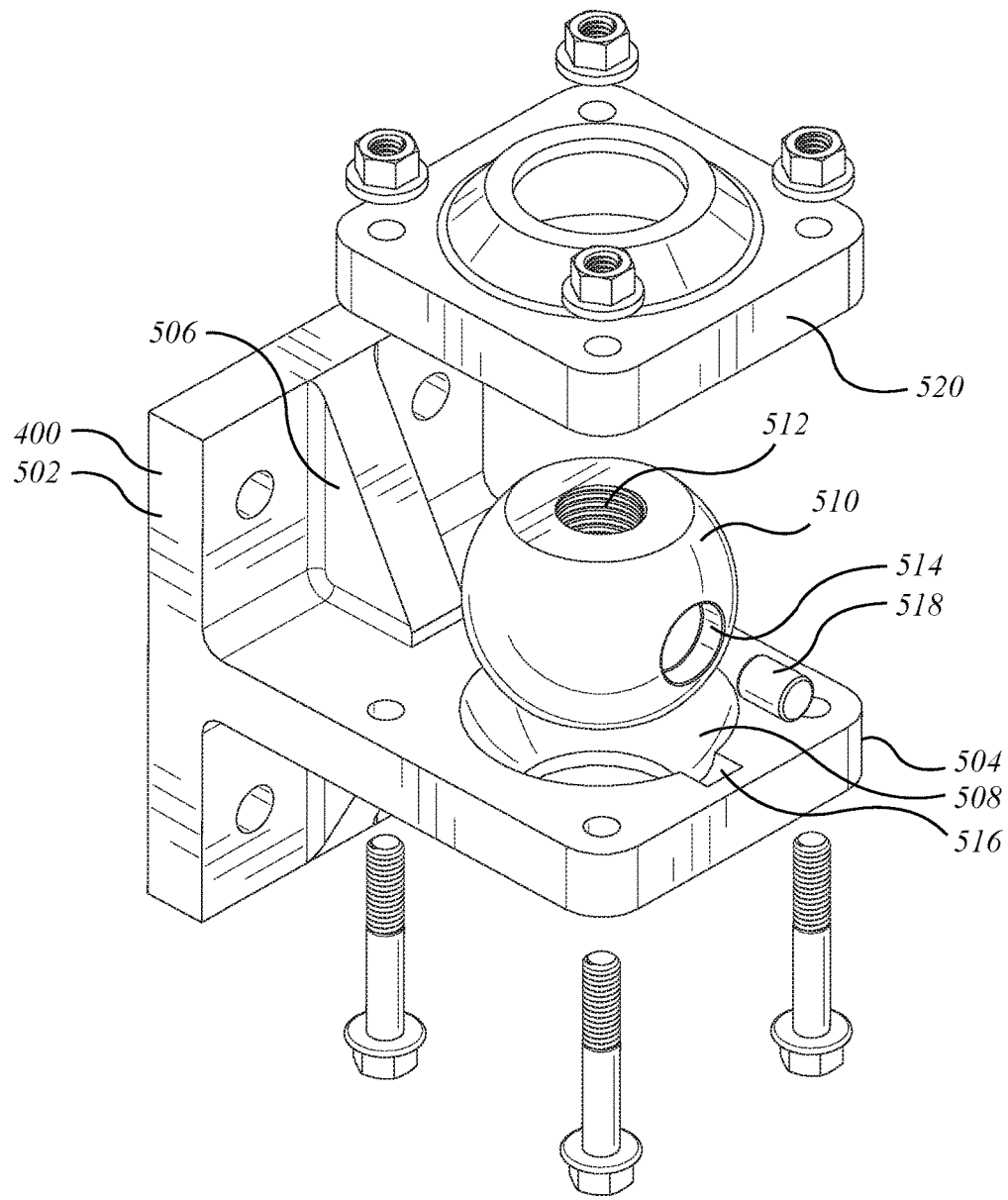
FIG. 12a is an exploded view of the universal threaded bronze ball of the deck drive transmission of the carriage elements of FIG. 10f.
Figure 12B:
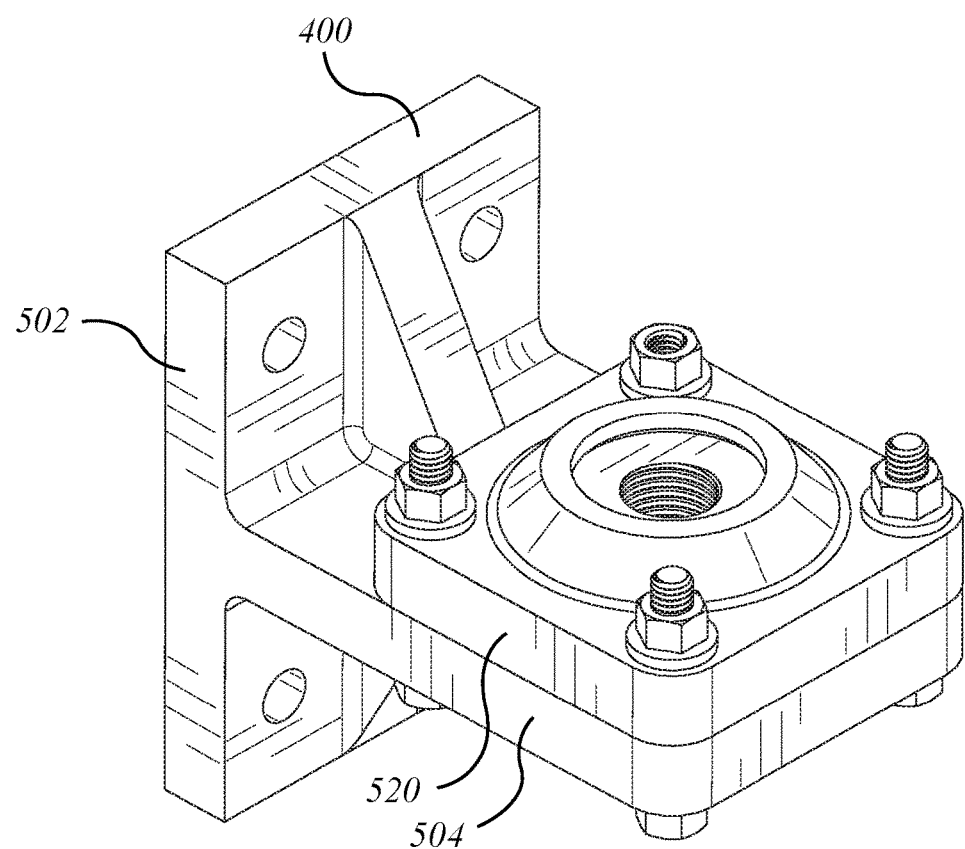

As seen in FIGS. 12a and 12b, deck drive fitting 400 has a base or foundation plate 502 that bolts to the side of the deck assembly. It also has an input arm, or input plate, 504 that is rooted to foundation plate 502, including stiffeners or reinforcements in the nature of diagonal stem gussets 506. Input plate 504 has a socket 508 defined therein for receiving a threaded bronze ball 510. Ball 510 has an internally threaded bore 512 that is oriented substantially vertical on installation, and that is of the same hand for engagement with the threads of threaded rod 500. Ball 510 also has a cross-bore 514 formed in the outside wall. There is a corresponding accommodation 516 in the periphery of socket 508. A torque transfer member, or indexing member in the nature of a stub, of finger, or pin 518, seats commonly in cross-bore 514 and accommodation 516, and, as so installed prevents ball 510 from rotating within socket 508. A top plate or cover plate 520 has the negative form, or opposite half, of socket 508 formed therein such that when installed it forms a cap on the cavity, capturing bronze ball 510. Note that bronze ball 510 has a float, or tolerance inside the socket cavity permitting self-adjustment. As installed, the ball transmits upward and downward motion to input plate 504, and therefore to the deck assembly to which it is mounted. Given the counterbalancing, the force required is intended to be low as compared to the weight of the deck.

Threaded rod 500 terminates at a height corresponding to the neutral mid-height of the decks, i.e., the mid-point between the decks when they are in the bi-level position. There is a further releasable connector 522 at that height, followed by a further threaded rod 524 that engages the input drive fitting 400 of upper deck 372. Threaded rod 524, and the associated bronze ball of the upper fitting 400, are of the opposite hand to threaded rod 500. Thus rotation of rods 500 and 524 in one direction will drive deck 370 and 372 further apart, and rotation in the other direction will drive them closer together. At the upper end of post 356, 357 or 359, as may be, there is a guide, or keeper, or retainer arm 526. It has a bushing that captures the upper end of rod 524 and permits it to turn.

Figure 7A:
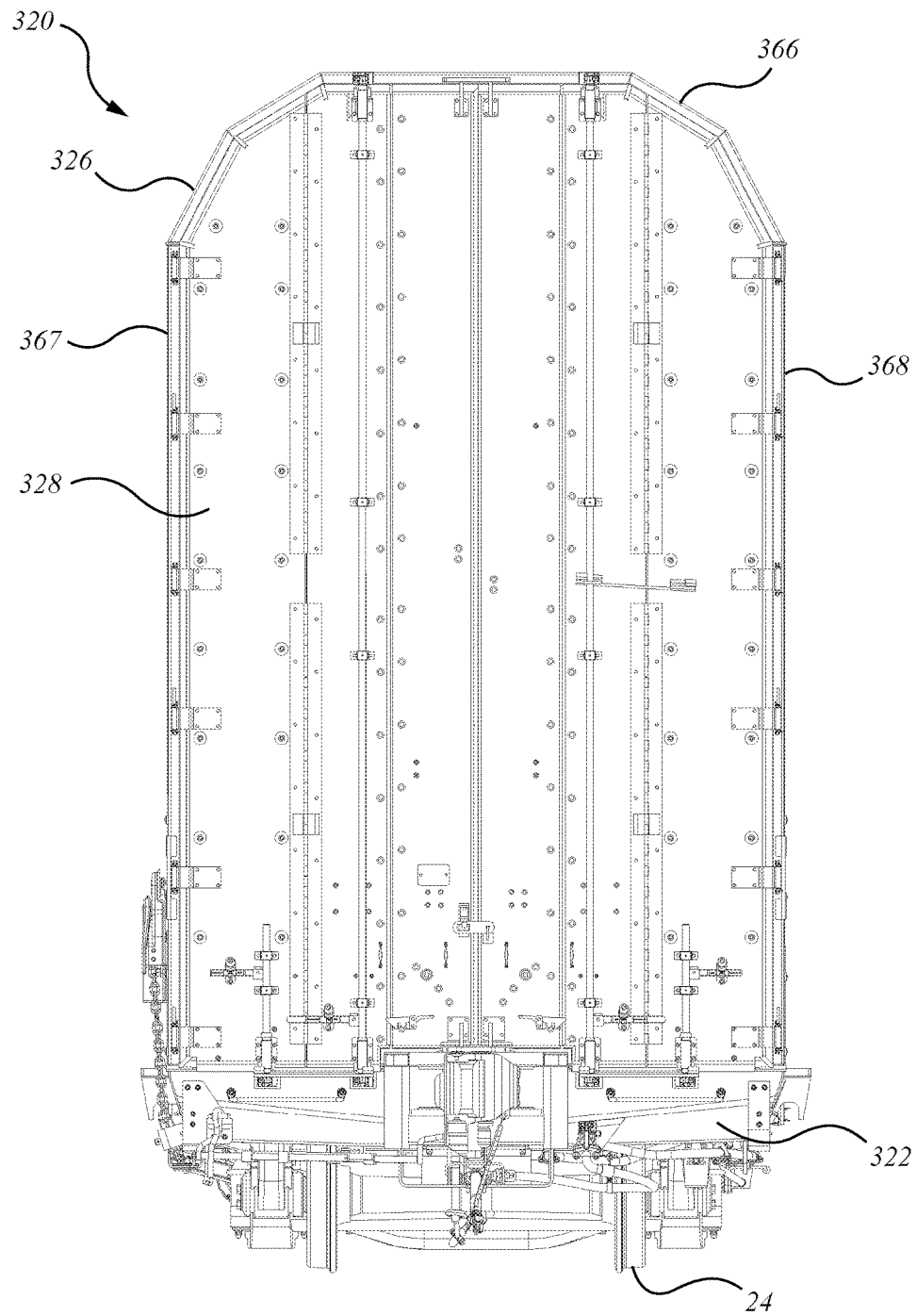
Figure 7B:
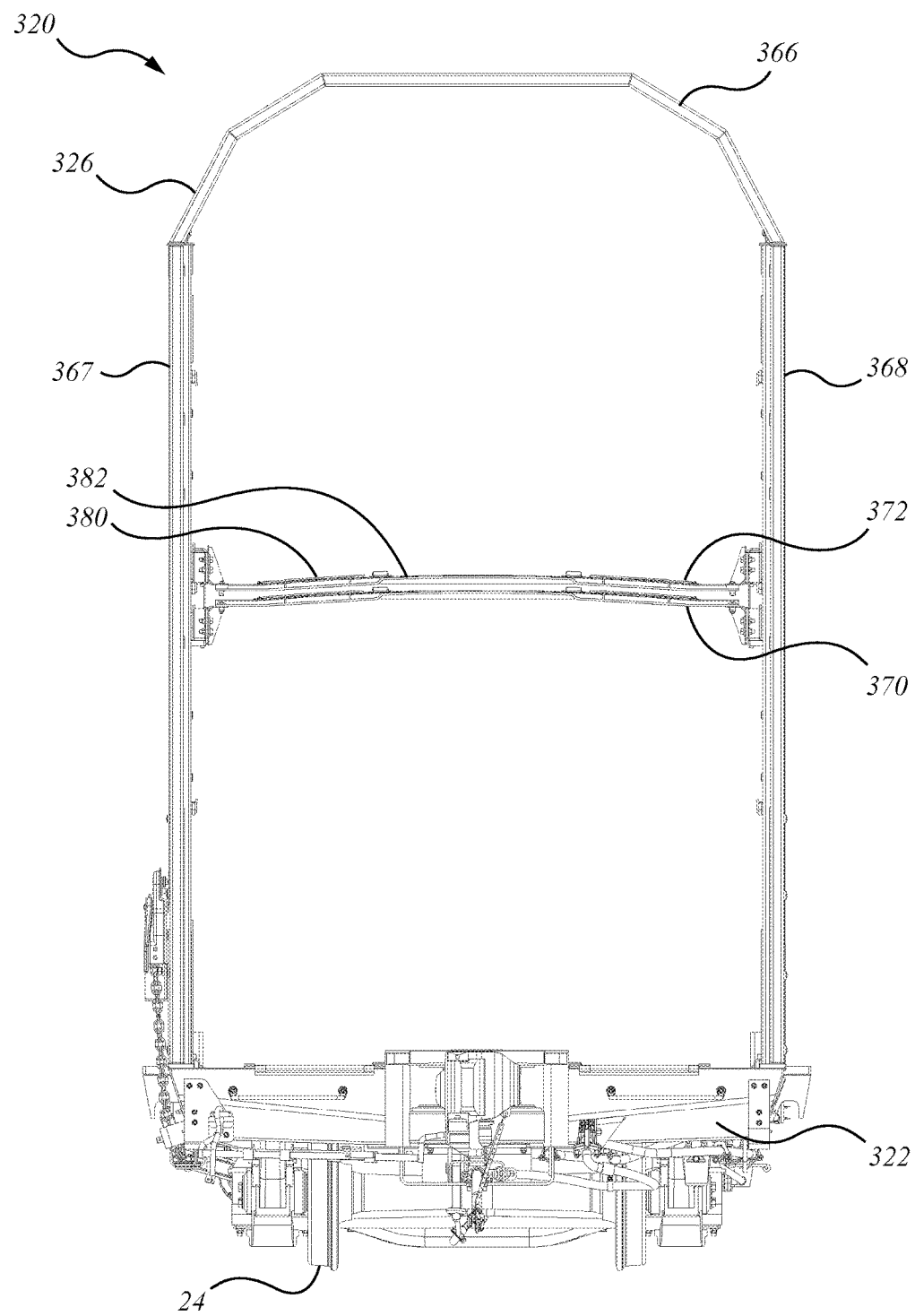
FIG. 7b is an end view of the autorack railroad car of FIG. 7a with doors removed, shown in bi-level configuration.
Figure 7C:
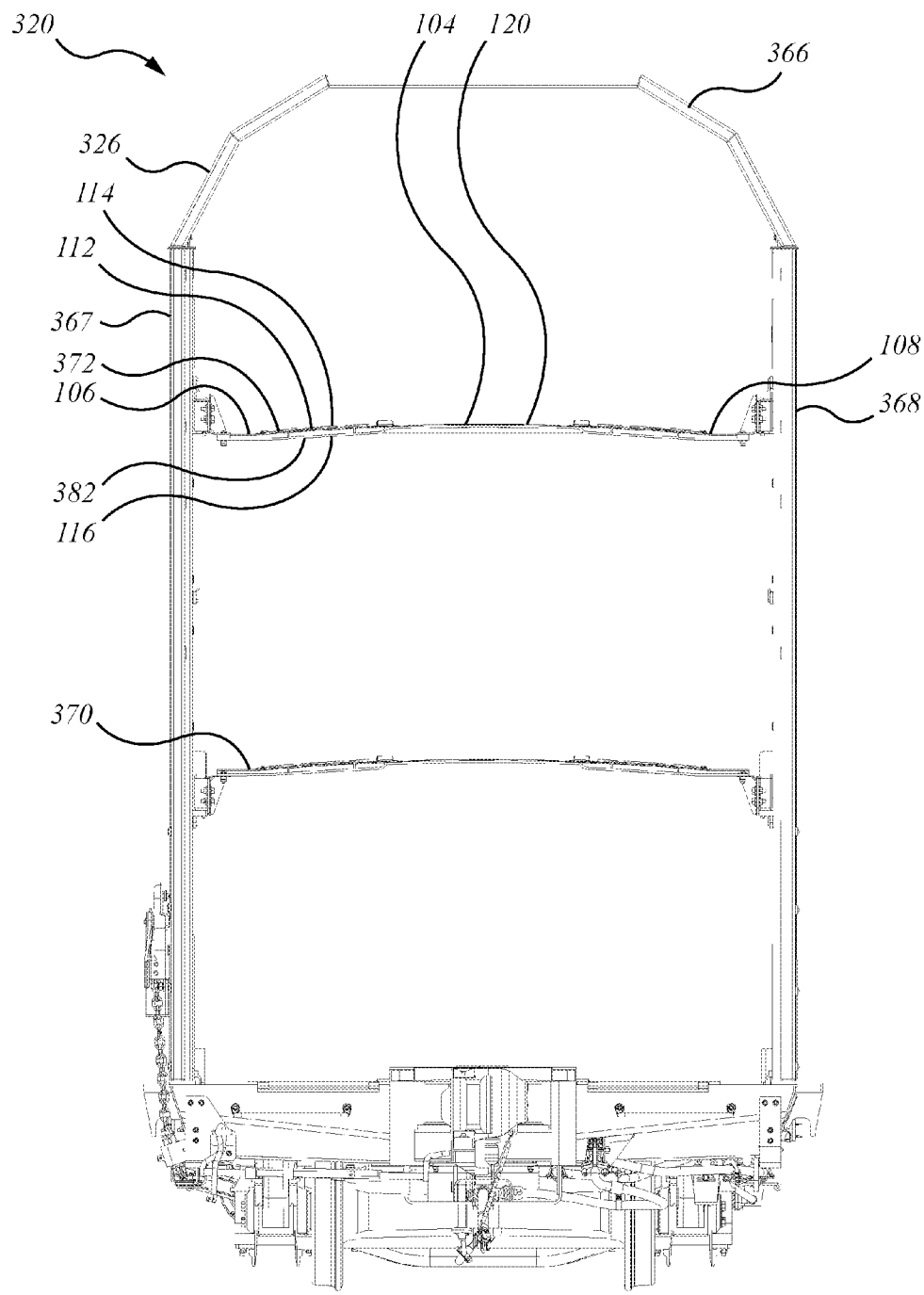
FIG. 7c shows the autorack car of FIG. 7a in tri-level configuration.
Figure 7D:
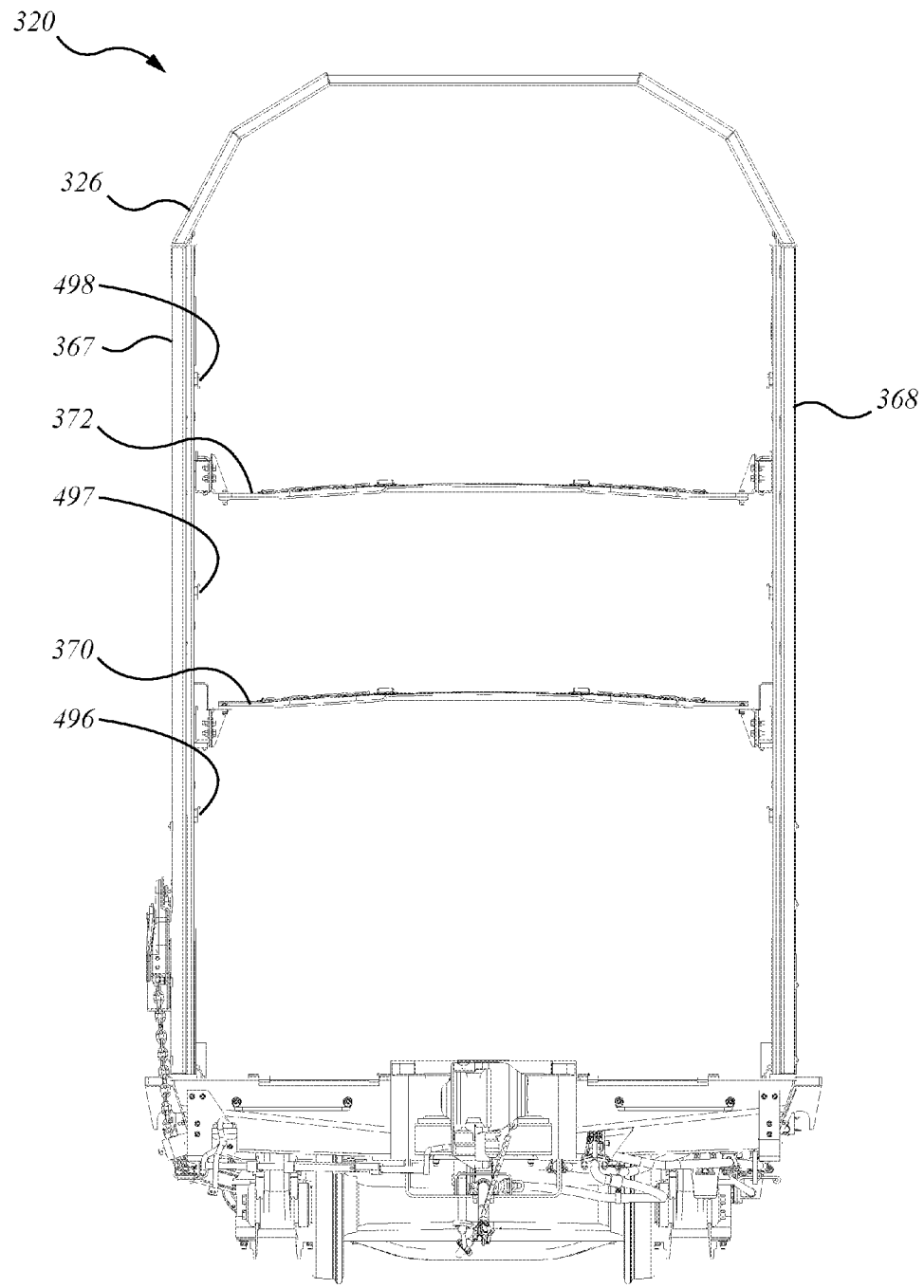
FIG. 7d shows the autorack railroad car of FIG. 7a in lower deck loading configuration.

As above, the range of motion of the movable decks in the vertical direction is limited by stops or abutments at the end-of-travel heights of the ranges. The stops are mounted to the various posts at the correct heights corresponding, for example, to the bi-level and tri-level deck height positions. In this case there is a lower stop 496, a middle stop, 497, and an upper stop 498 (FIG. 7d). Deck assembly 370 moves between lower stop 496 and middle stop 497; deck assembly 372 moves between middle stop 497 and upper stop 498. When the movable decks are in the bi-level position, lower deck 370 bottoms out on lower stop 496; and the range of upward displacement of upper deck assembly ends at upper stop 498. In the bi-level position, upper deck 372 bottoms out on middle stop 497, and the range of upward displacement of lower deck assembly 370 likewise ends at middle stop 497. The decks cannot be over-driven in view of torque limiter 456.

As above, like transmission 160, transmission 460 has an input section that includes a track level input interface 190, which may have the form of a key or socket 192 such as may be engaged by a powered external drive (not shown) such as a drill or rotating shaft. Alternatively, as the need may arise, the external drive may be driven by a hand crank or wheel or other apparatus mounted to engage socket 192. Interface 190 may be located near the No. 2 post, and may be accessible from trackside by yard personnel. The deck drive assembly, and the decks themselves, have the same ability to move between bi-level, tri-level, and lower deck loading positions as described above, and the operator may observe the deck level indicator at the same time while standing at trackside.

Figure 7E:
FIG. 7e is a partial perspective view of a portion of the inside of the autorack railroad car of FIG. 7a showing a storage space for equipment.

As may be noted, and in contrast to the scissor jack installation of autorack car 20, the vertical torque shaft installation of autorack car 320 leaves an envelope bounded by two adjacent posts, the outside screen, and the vertical plane defined by the clearance line of the moving decks. This alcove, or accommodation or spatial envelope is roughly the same depth as the side posts. As seen in FIG. 7e, that space provides a location in which to store wheel chock apparatus 360 when the wheel chocks are not in use.

As above, autorack car 320 has a secondary lock assembly 220, and each of deck assemblies 370 and 372 has the same first indexing members 222, 224, as described above in the context of autorack railroad car 20.

Drive transmission 160 is used to place the decks in position, and then the decks are locked in place for loading in such configuration as may be. When the doors are opened, bridge plates can be put in place to permit circus loading. The bridge plates have a set of movable pins at one end, by which the bridge plate is hingedly mounted to one carbody. The opposite end of the bridge plate is a free end that lies on the deck surface of the next adjacent car body deck. The free end is sized to overlap the next deck at the maximum extension of the long travel draft gear. When the railcars are ready, the bridge plates are installed.

To permit bridge plates to be installed, the decks of the cars have bridge plate engagement fittings, or bridge plate anchor fittings, on each of the decks. The bridge plate engagement fittings, or anchor fittings generally have the form of a pair of axially spaced apart short pipes that accept the pins of the ends of the bridge plates. That is, the end of the bridge plate has a tube. Inside the tube are two pins. When the bridge plate is in place, the pins extend out of the tube and into the pipe fittings of the deck. Since the pins are axially aligned in the tube, they act as hinges, or trunnions, and the short pipes act as the stationary members of the hinge. The engagement fittings stand lengthwise proud of the respective decks. This space must be allowed when the doors are closed. In one type of installation, the doors have cut-outs or accommodations into which the deck end fittings sit. In the view of the inventors, these cut-outs tend not to be desirable. They weaken the overall door structure, and may provide a further unintended access opening.

Figure 8A:
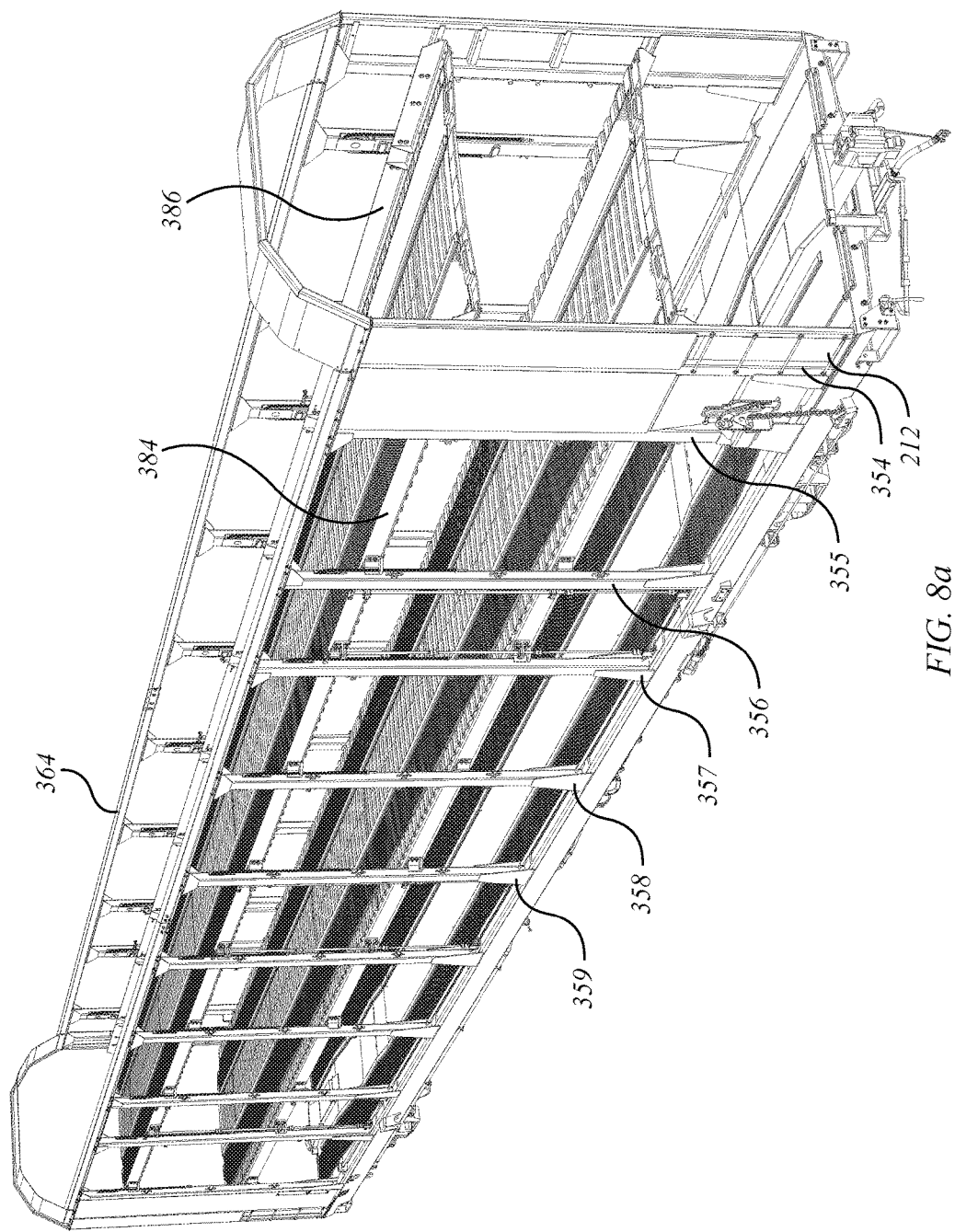
FIG. 8a shows the autorack railroad car of FIG. 6a stripped to its frame, showing the location of the deck-drive gearboxes.
Figure 8B:
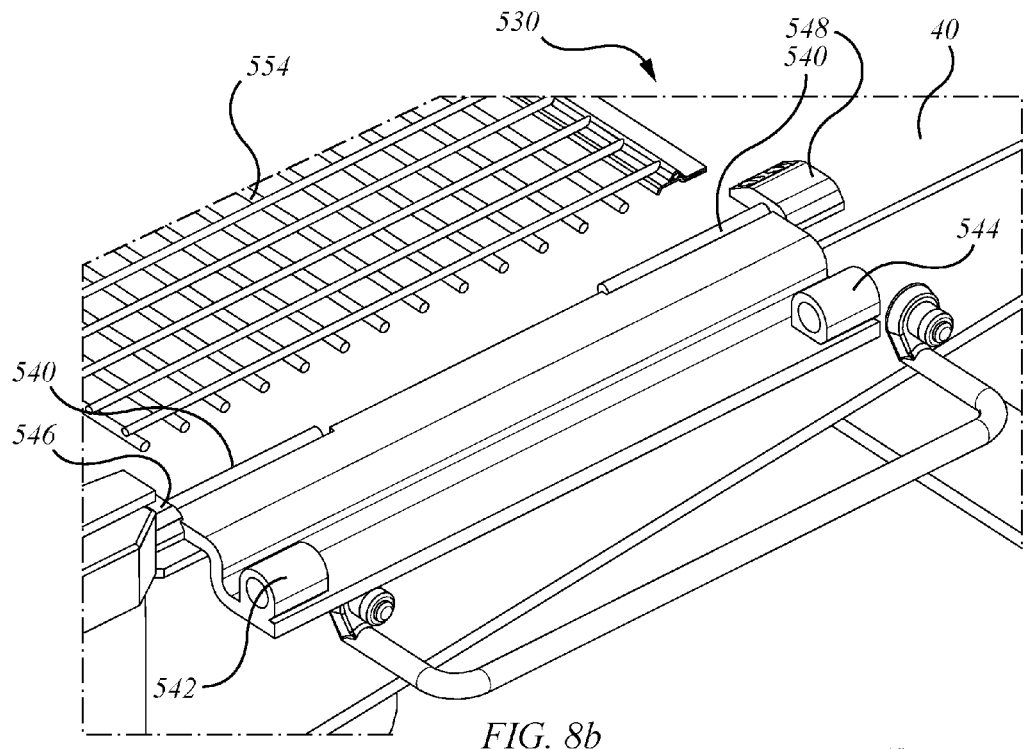
FIG. 8b shows a main deck bridge plate fitting of the autorack railroad car of FIG. 8a in a deployed position.
Figure 8C:
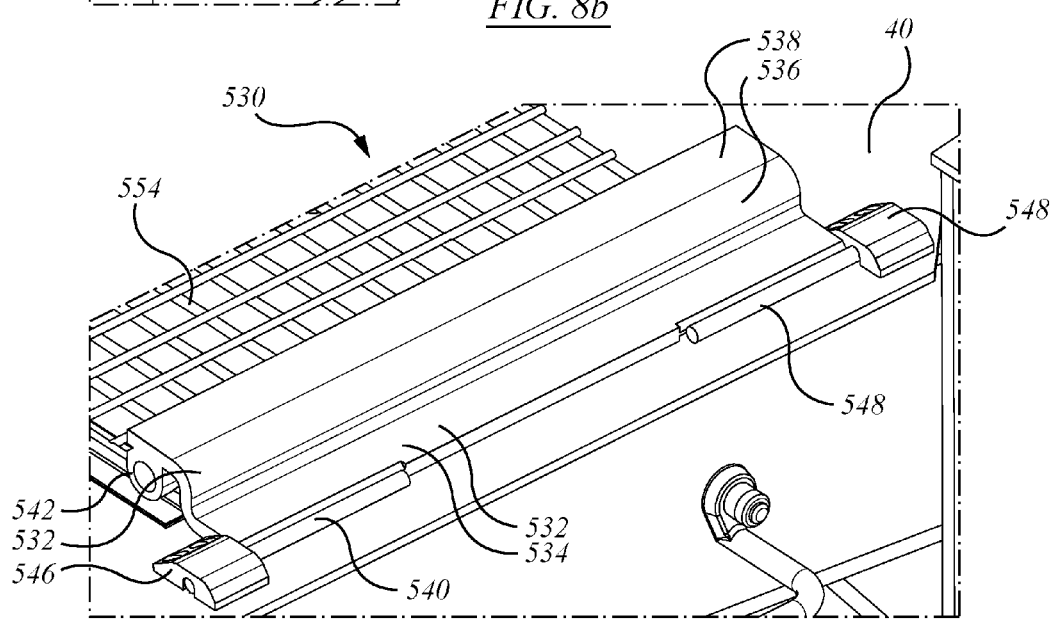
FIG. 8c shows the bridge plate fitting of FIG. 8b in a storage position.
Figure 8D:
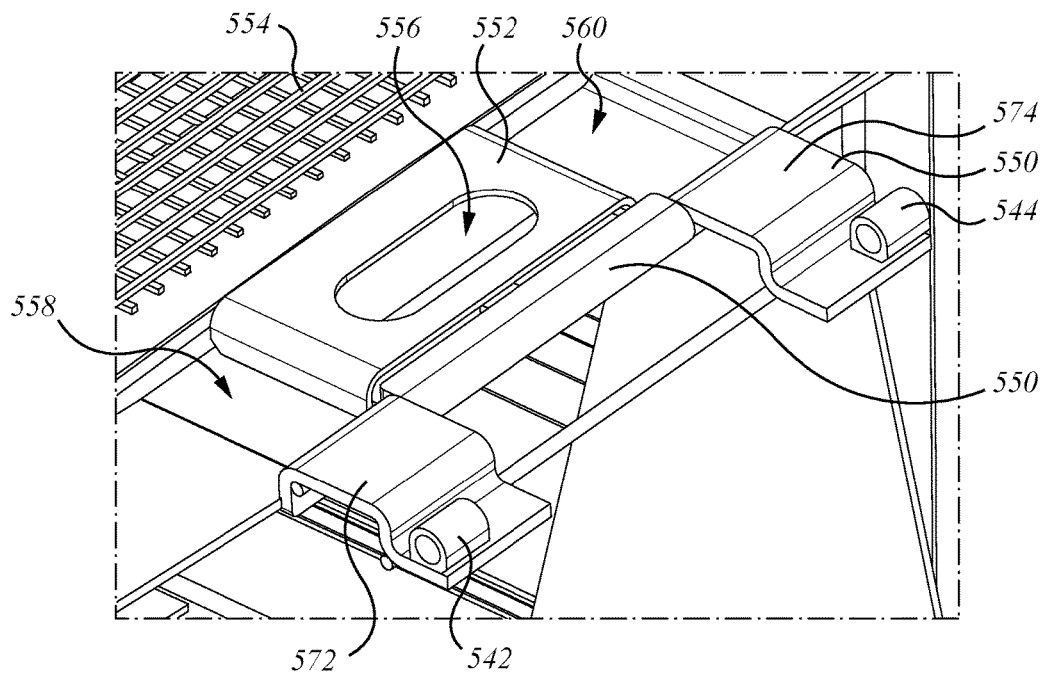
FIG. 8d shows an upper deck bridge plate fitting of the autorack railroad car of FIG. 8a in a deployed position.
Figure 8E:
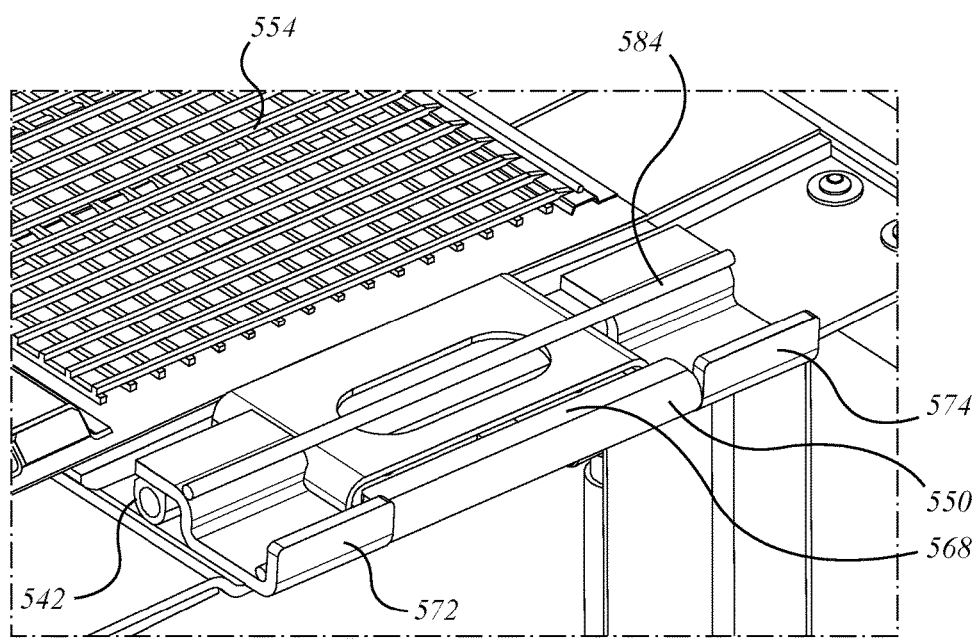
FIG. 8e shows the fitting of FIG. 8d in isolation.

In the embodiment of FIGS. 8a-8g, car 20, or car 320, may have main deck bridge plate engagement fittings, or anchor fittings 530, and upper deck bridge plate engagement fittings, or anchor fittings 550 that are movable between a first, or deployed, position in which to matingly engage with a bridge plate, as in FIGS. 8b and 8d; and a second, or retracted or storage position, in which to sit when not in use, as when the doors are closed, as in FIGS. 8c and 8d.

Looking at these figures, and looking at main deck anchor fitting assembly 530 first, there is a first member, or main member 532 that, in end view has a Z-shape or S-shape. That is, it has a first portion or leg 534, a second portion or leg 536, and a third portion or leg 538. First leg 534 and third leg 538 may each be substantially planar plates or plate portions, that lie in parallel offset planes. Second portion or leg 536 is an intermediate leg that joins a margin of first leg 534 and a margin of third leg 538 together to form the crooked-leg shape. Second leg 536 may be a short leg that is substantially perpendicular to legs 534 and 538. At the near edge or margin of first leg 534, assembly 530 has a pivot fitting or hinge fitting that may have the form of a rod, or rods, 540, welded along the end and having axially extending pins. Along the distal edge of third leg 538 assembly 530 has bridge plate anchor fittings, in the form of short sections of cut pipe, or pipe nipples 542, 544, that are axially spaced apart to accept the retractable pins of the bridge plates. Assembly 530 is secured to main deck 40 by left and right hand cleats 546, 548 that define accommodations or sockets for male and female engagement of the hinge pin ends defined by welded rods 540.

In the deployed position, shown in FIG. 8b, assembly 530 has been moved in a first degree of freedom, namely pivoting rotational movement fully clockwise about the axis of rods 540, to a first or deployed or extended or active position in which first leg 534 lies substantially flat upon the upper surface of main deck 40 outboard of cleats 544, 546, and leg 532 hangs down over the end of the deck, with the axis of rotation of pipe nipples 542, 544 either flush with, or shy of, the plane of deck 40. This may tend to result in the bridge plate surface also being flush with, or close to flush with, deck 40 when installed, thereby perhaps reducing the tendency of vehicles driven thereover to bounce when they hit the transition. As may also be noted, in the deployed position cut pipes 542, 544 are fully and easily exposed, thereby tending to facilitate mounting of bridge plates thereto. It does not matter which adjacent car body is used, since the far end (i.e., the free end) of the bridge plate overlaps the end of deck 40 of the next car body, and, in the process lies flat upon the upturned face of first leg 534, and therefore, since it lies generally flush with or slightly shy of the plane of the wheeled track-way gratings of deck 40, substantially flat on deck 40.

In the retracted, or storage, or passive position, shown in FIG. 8c, assembly 530 has been moved in that single degree of freedom fully counter-clockwise, 180 degrees of arc away from the first position. In this position the other side of first leg 534 lies against deck 40, inboard of cleats 546, 548 with the cut pipes 542, 544 lying on top of the deck gratings. In this position, assembly 530 is effectively drawn backward, or inboard, permitting the car doors to be closed closely against the ends of the deck, without obstruction by the bridge platen anchor fittings.

Considering now the upper deck bridge plate anchor fitting assembly 550 of FIGS. 8d, 8e, 8f and 8g, upper decks 70, 72, 370 and 372, the upper decks may have a central track plate 552 aligned with the track gratings 554. Track plate 552 seats generally centrally in an accommodation, or well, 556 formed in the end of the deck, for example as the down-turn in the last corrugation of the deck. Track plate 552 may have the form of a U-shaped inverted channel, placed toes-down in the well. The top, or back of the U, is generally substantially flush with the deck surface, or with the surface of the wheel-path gratings, to give a relatively smooth roadway. The center of the back may have an accommodation or depression or aperture 556 formed therein. When track plate 552 is in place, it leaves two smaller depressions or accommodations, or wells, 558, 560 to either side thereof.

Assembly 550 may include a first member 562, and a second member 564 movably connected thereto, as by a motion permitting connector, such as hinge 566. First member 562 may be a base, or stationary, member that is rigidly mounted (e.g., welded) to the deck assembly (be it 70, 72, 370 or 372 as may be), such as in the hollow defined underneath plate 552. First member 562 has an engagement fitting, which could be a welded pipe, but, in the embodiment shown is a folded over margin 568, with a central stop block 570 that creates a passage for hinge 566. At either end of hinge 566, second member 564 includes left and right hand wings or bridge plate anchor fittings 572, 574. Each anchor fitting 572, 574 has a main member or plate, which may be bent into a first portion 576, a second portion 578, a third portion 580, and a fourth portion 582. Second portion 578, third portion 580 and fourth portion 582 may be substantially the same as first leg 534, second leg 536, and third leg 538 described above. Cut pipe sections 542, 544 are mounted to fourth portion 582 as before, and function to mate with the pins of bridge plates as previously described. First portion 576 defines a leg or stop that, when assembly 550 is rotated fully clockwise, bears against the end face of the deck, against which it stops. In this position, the deployed or extended position of assembly 550, the sections 542 and 544 are positioned to receive the bridge plate. When assembly 550 is moved to the second position, i.e., rotated fully counter-clockwise, the body of wings 572, 574 and pipe sections 542, 544 sit in wells 558, 560. A second rod 584 is welded across the back of wings 572, 574, and, in the closed position crosses accommodation 556, thereby serving as a grip or hand-hold.

The foregoing text describes an autorack car having adjustable height decks. Unlike some previous types of adjustable height decks, the decks do not swing-out longitudinally during repositioning, but rather are restricted to a single degree of freedom of motion, that motion being translational motion in the vertical or z-direction. Moreover, the decks are counterbalanced, the counterbalancing being derived from the weight of the decks working against each other. Accordingly, the motive drive to move the decks from one position to another does not have to fight against the weight of the decks. In the embodiments shown and described, the passive counterbalance transmission is entirely separate from the drive transmission that imparts translation to the decks. The drive transmission is mounted to, and works directly against, the movable deck structure. Further, the apparatus described above eliminates the hinged end deck portions previously used, and, instead, may employ full-length decks that run from end-to-end of the car. When using vertical threaded rods, the deck drive transmission itself occupies a constant space envelope, permitting the alcove between the posts to be used as a storage space, e.g., for wheel chocks.

Various embodiments have been described in detail. Since changes in and or additions to the above-described examples may be made without departing from the nature, spirit or scope of the invention, the invention is not to be limited to those details but only in by a purposive construction of the claims as required by law.

We claim:

1. An autorack railroad car, comprising:
a first height-adjustable deck and a second height-adjustable deck;
said second height-adjustable deck overlying said first height-adjustable deck;
an height adjustment drive transmission having
a first array of threaded output shafts mounted to drive motion of the first height-adjustable deck; and
a second array of threaded output shafts mounted to drive motion of the second height-adjustable deck;
said transmission has a track level accessible input;
said track level input includes first and second input ports, said first input port being mounted on one side of the autorack railroad car, and said second input port being mounted on a second, opposite, side of the autorack railroad car, each of the input ports being accessible for operation by trackside personnel; and
each of said ports being independently operable to drive said transmission.

2. The autorack railroad car of claim 1 wherein said first and second input ports are linked by shafting to a common gearbox, said gearbox having an output connected to drive said first and second arrays of output shafts, and said gearbox has an output torque limiter.

3. The autorack railroad car of claim 1 wherein ones of said output shafts of said first array are mounted in series with corresponding ones of said output shafts of said second array, whereby the first and second decks are driven at the same time.

4. The autorack railroad car of claim 1 wherein said threaded output shafts of said first array are of opposite hand to said threaded output shafts of said second array.

5. The autorack railroad car of claim 1 further comprising a deck counterbalance apparatus, said counterbalance apparatus being mounted to react the weight of the height-adjustable decks, and the deck height adjustment transmission being free of deck weight static loading.

6. The autorack railroad car of claim 5 wherein said counterbalance apparatus links said first height-adjustable deck to said second height-adjustable deck, the weight of said first height-adjustable deck being opposed to the weight of said second height-adjustable deck, whereby said decks counterbalance each other.

7. The autorack railroad car of claim 6 wherein said counterbalance apparatus includes a set of chains, said set of chains including at least first, second, third, and fourth chains, each of said chains having first and second ends; each of said chains passing over a respective idler; and said first end of each chain being mounted to said first height-adjustable deck and said second end of each chain being mounted to said second height-adjustable deck.

8. The autorack railroad car of claim 1 wherein said drive transmission includes an array of riser shafts mounted to drive said first array of threaded output shafts.

9. The autorack railroad car of claim 8 wherein each riser shaft of said array of riser shafts is mounted to drive a corresponding one of said first output shafts and one of said second output shafts, said input shaft and said output shaft being of opposite hand, and said respective ones of said riser shafts, said first output shafts, and said second output shafts are mounted in series.

10. The autorack railroad car of claim 1 wherein said transmission has at least one distribution shaft running along said car, said distribution shaft having an array of off-takes spaced apart along said car to drive members of said first and second arrays of output shafting.

11. The autorack railroad car of claim 1, comprising:
a main deck;
said first height-adjustable deck and said second height-adjustable deck overlying said main deck;

said main deck being a depressed-center deck;
an array of posts mounted along left and right hand sides of, and standing upwardly of, said main deck;
said first height-adjustable deck and said second height-adjustable deck being supported by said posts; and
said first and second height-adjustable decks being counterbalanced against each other.

12. The autorack railroad car of claim 11 wherein said first and second height-adjustable decks are constrained to a single degree of freedom of motion, that degree of freedom being up-and-down translation.

13. The autorack railroad car of claim 1 wherein one of said first and second height adjustable decks is a roller-mounted deck.

14. The autorack railroad car of claim 13 wherein said roller-mounted deck has a decking array extending cross-wise between first and second lengthwise extending margins, there being deck carriages spaced along said lengthwise extending margins, said carriages having rollers mounted thereto.

15. The autorack railroad car of claim 14 wherein said carriage has a lengthwise motion inhibitor as well as at least one roller-mounted to inhibit cross-wise motion of said first and second height adjustable decks.

16. The autorack railroad car of claim 14 having first and second lengthwise extending side beams running along said first and second margins, each of said first and second side beams having a first leg underlying said decking array, and a second leg defining a vertical leg extending away from said first leg to form an angle.

17. The autorack railroad car of claim 16 wherein said deck carriages are mounted to said vertical leg.

18. The autorack railroad car of claim 16 wherein said decking array has a raised central crown, and a vertical height rise measured from said margins thereof to said crown; and said vertical leg has a greater vertical extent than said vertical height rise.

19. An autorack railroad car, comprising:
a first height-adjustable deck and a second height-adjustable deck;
said second height-adjustable deck overlying said first height-adjustable deck;
an height adjustment drive transmission having
a first array of threaded output shafts mounted to drive motion of the first height-adjustable deck; and
a second array of threaded output shafts mounted to drive motion of the second height-adjustable deck; and
said threaded output shafts of said first array are of opposite hand to said threaded output shafts of said second array.

20. The autorack railroad car of claim 19 wherein said transmission has a track level accessible input.

21. The autorack railroad car of claim 19 wherein:
said output shafts of said first array are mounted in series with corresponding ones of said output shafts of said second array, whereby the first and second decks are driven at the same time;
there is a deck counterbalance apparatus mounted to react the weight of the height-adjustable decks, and the deck height adjustment transmission being free of deck weight static loading; and
said counterbalance apparatus links said first height-adjustable deck to said second height-adjustable deck, the weight of said first height-adjustable deck being opposed to the weight of said second height-adjustable deck, whereby said decks counterbalance each other.

22. The autorack railroad car of claim 21 wherein said counterbalance apparatus includes a set of chains, said set of chains including at least first, second, third, and fourth chains, each of said chains having first and second ends; each of said chains passing over a respective idler; and said first end of each chain being mounted to said first height-adjustable deck and said second end of each chain being mounted to said second height-adjustable deck.

23. The autorack railroad car of claim 19 wherein said drive transmission includes an array of riser shafts mounted to drive said first array of threaded output shafts.

24. The autorack railroad car of claim 23 wherein each riser shaft of said array of riser shafts is mounted to drive a corresponding one of said first output shafts and one of said second output shafts; and said respective ones of said riser shafts, said first output shafts, and said second output shafts are mounted in series.

25. The autorack railroad car of claim 19 wherein said transmission has at least one distribution shaft running along said car, said distribution shaft having an array of off-takes spaced apart along said car to drive members of said first and second arrays of output shafting.

26. The autorack railroad car of claim 19 wherein said first and second height-adjustable decks are constrained to a single degree of freedom of motion, that degree of freedom being up-and-down translation.

27. The autorack railroad car of claim 19 wherein one of said first and second height-adjustable decks is a roller-mounted deck; and said roller-mounted deck has a decking array extending cross-wise between first and second lengthwise extending margins, there being deck carriages spaced along said lengthwise extending margins, said carriages having rollers mounted thereto.

28. The autorack railroad car of claim 27 wherein said carriage has a lengthwise motion inhibitor as well as at least one roller-mounted to inhibit cross-wise motion of said first and second height-adjustable decks.

29. A roller-mounted adjustable-height deck for an autorack railroad car, said deck having a decking array extending cross-wise between first and second lengthwise extending margins; there being deck carriages spaced along said lengthwise extending margins, said carriages having rollers mounted thereto; and said carriages have a lengthwise motion inhibitor as well as at least one roller-mounted to inhibit cross-wise motion of said first and second height-adjustable deck.

30. The roller-mounted adjustable-height deck of claim 29 wherein said carriage has a vertical height drive input.

31. The roller-mounted adjustable-height deck of claim 29 having first and second lengthwise extending side beams running along said first and second margins, each of said first and second side beams having a first leg underlying said decking array, and a second leg defining a vertical leg extending away from said first leg to form an angle.

32. The roller-mounted adjustable-height deck of claim 31 wherein said deck carriages are mounted to said vertical leg.

33. An autorack railroad car having two of the roller-mounted adjustable-height decks of claim 29 wherein:
said roller-mounted adjustable-height decks are a first height-adjustable deck and a second height-adjustable deck;
said second height-adjustable deck overlies said first height-adjustable deck;
there is an height adjustment drive transmission having
a first array of threaded output shafts mounted to drive motion of the first height-adjustable deck; and a second array of threaded output shafts mounted to drive motion of the second height-adjustable deck.

34. The autorack railroad car of claim 33 wherein said transmission has a track level accessible input.

35. The autorack railroad car of claim 33 wherein:
said output shafts of said first array are mounted in series with corresponding ones of said output shafts of said second array, whereby the first and second decks are driven at the same time;
there is a deck counterbalance apparatus mounted to react the weight of the height-adjustable decks, and the deck height adjustment transmission being free of deck weight static loading; and
said counterbalance apparatus links said first height-adjustable deck to said second height-adjustable deck, the weight of said first height-adjustable deck being opposed to the weight of said second height-adjustable deck, whereby said decks counterbalance each other.

36. The autorack railroad car of claim 35 wherein said counterbalance apparatus includes a set of chains, said set of chains including at least first, second, third, and fourth chains, each of said chains having first and second ends; each of said chains passing over a respective idler; and said first end of each chain being mounted to said first height-adjustable deck and said second end of each chain being mounted to said second height-adjustable deck.

37. An autorack railroad car having two of the roller-mounted adjustable-height decks of claim 29 wherein:
there is a main deck, said main deck being a depressed-center deck;
said roller-mounted adjustable-height decks are first and second height-adjustable decks;
said second height-adjustable deck overlies said first height-adjustable deck;
said first and second height-adjustable decks both overlie said main deck;
an array of posts is mounted along left and right hand sides of, and stand upwardly of, said main deck;
said first and second height-adjustable decks are supported by said posts; and
said first and second height-adjustable decks are counterbalanced against each other;
there is a deck drive transmission, said deck drive transmission including upstanding drive shafts, said upstanding drive shafts including threaded rod portions operably connected to impose displacement upon at least one of said first and second height-adjustable decks.

38. The autorack railroad car of claim 37 wherein said decks are constrained to a single degree of freedom of motion, that degree of freedom being up-and-down translation.

39. A roller-mounted adjustable-height deck for an autorack railroad car, said deck comprising:
a decking array extending cross-wise between first and second lengthwise extending margins, there being deck carriages spaced along said lengthwise extending margins, said carriages having rollers mounted thereto;
first and second lengthwise extending side beams running along said first and second margins, each of said first and second side beams having a first leg underlying said decking array, and a second leg defining a vertical leg extending away from said first leg to form an angle; and
said decking array having a raised central crown, and a vertical height rise measured from said margins thereof to said crown; and said vertical leg has a greater vertical extent than said vertical height rise.

40. The roller-mounted adjustable-height deck of claim 39 wherein said carriage has a lengthwise motion inhibitor as well as at least one roller-mounted to inhibit cross-wise motion of said adjustable-height deck.

41. The roller-mounted adjustable-height deck of claim 39 wherein said deck carriages are mounted to said vertical leg.

42. An autorack railroad car having two said roller-mounted adjustable-height decks of claim 39, wherein:
said roller-mounted adjustable-height decks are first and second adjustable-height decks;
said second adjustable-height deck overlies said first adjustable-height deck;
there is an height adjustment drive transmission having
a first array of threaded output shafts mounted to drive motion of said first adjustable-height deck; and
a second array of threaded output shafts mounted to drive motion of the second adjustable-height deck.

43. The autorack railroad car of claim 42 wherein said transmission has a track level accessible input.

44. The autorack railroad car of claim 42 wherein:
said output shafts of said first array are mounted in series with corresponding ones of said output shafts of said second array, whereby the first and second decks are driven at the same time;
there is a deck counterbalance apparatus mounted to react the weight of the height-adjustable decks, and the deck height adjustment transmission being free of deck weight static loading; and
said counterbalance apparatus links said first height-adjustable deck to said second height-adjustable deck, the weight of said first height-adjustable deck being opposed to the weight of said second height-adjustable deck, whereby said decks counterbalance each other.

45. The autorack railroad car of claim 44 wherein said counterbalance apparatus includes a set of chains, said set of chains including at least first, second, third, and fourth chains, each of said chains having first and second ends; each of said chains passing over a respective idler; said first end of each chain being mounted to said first height-adjustable deck and said second end of each chain being mounted to said second height-adjustable deck.

46. The autorack railroad car of claim 42 wherein:
said drive transmission includes an array of riser shafts mounted to drive said first array of threaded output shafts;
each riser shaft of said array of riser shafts is mounted to drive a corresponding one of said first output shafts and one of said second output shafts, said input shaft and said output shaft being of opposite hand; and
said respective ones of said riser shafts, said first output shafts, and said second output shafts are mounted in series.

47. The autorack railroad car of claim 42 wherein said transmission has at least one distribution shaft running along said car, said distribution shaft having an array of off-takes spaced apart along said car to drive members of said first and second arrays of output shafting.

48. The autorack railroad car of claim 42 wherein said first and second height-adjustable decks are constrained to a single degree of freedom of motion, that degree of freedom being up-and-down translation.

* * * * *

UNITED STATES PATENT AND TRADEMARK OFFICE
CERTIFICATE OF CORRECTION

PATENT NO. : 10,377,392 B2
APPLICATION NO. : 15/209436
DATED : August 13, 2019
INVENTOR(S) : Tomasz Bis and James Wilfred Forbes Page 1 of 1

It is certified that error appears in the above-identified patent and that said Letters Patent is hereby corrected as shown below:

In the Claims

Claim 3, at Column 26, Line 22 – delete "ones" and insert --one--

Signed and Sealed this
Twenty-second Day of October, 2019

Andrei Iancu
*Director of the United States Patent and Trademark Office*